United States Patent
Morino et al.

(10) Patent No.: US 10,781,059 B2
(45) Date of Patent: Sep. 22, 2020

(54) BAG CONVEYANCE METHOD AND BAG CONVEYANCE APPARATUS

(71) Applicant: TOYO JIDOKI CO., LTD., Tokyo (JP)

(72) Inventors: Manabu Morino, Yamaguchi-ken (JP); Akihiro Yamagata, Yamaguchi-ken (JP); Kazuo Fukunaga, Yamaguchi-ken (JP); Yasuyuki Honda, Yamaguchi-ken (JP)

(73) Assignee: TOYO JIDOKI CO., LTD., Tokyo (JP)

( * ) Notice: Subject to any disclaimer, the term of this patent is extended or adjusted under 35 U.S.C. 154(b) by 0 days.

(21) Appl. No.: 16/415,594

(22) Filed: May 17, 2019

(65) Prior Publication Data

US 2019/0352109 A1   Nov. 21, 2019

(30) Foreign Application Priority Data

May 18, 2018   (JP) .................. 2018-096388

(51) Int. Cl.
   *B65G 65/00*   (2006.01)
   *B65G 47/244*  (2006.01)
   (Continued)

(52) U.S. Cl.
   CPC .......... *B65G 65/005* (2013.01); *B65B 43/465* (2013.01); *B65G 47/244* (2013.01);
   (Continued)

(58) Field of Classification Search
   CPC ............................. B65G 47/28; B65G 47/61; B65G 2201/0238; B65G 43/465; B65G 65/005; B65G 47/244; B65G 2203/0233; B65G 2203/0225; B65B 43/46; B65B 43/26; B65B 43/30; B65B 43/28; B65B 43/42; B65B 43/465; B65B 5/045
   (Continued)

(56) References Cited

U.S. PATENT DOCUMENTS 2,941,676 A * 6/1960 Harker .................. B65B 35/50
                                                      414/798.5
3,246,816 A * 4/1966 Dexter .................. D06H 7/025
                                                      226/4

(Continued)

FOREIGN PATENT DOCUMENTS

JP   2002-308224 A   10/2002
JP   2013-244967 A   12/2013

*Primary Examiner* — James R Bidwell
(74) *Attorney, Agent, or Firm* — Pillsbury Winthrop Shaw Pittman, LLP

(57) ABSTRACT

A bag in which a content is put and of which a mouth portion is not sealed, is disposed in a substantially horizontal attitude in a takeoff area. A height direction position of an expected hold part of the bag and a height direction position of a hold member are caused to correspond to each other. The hold member is caused to hold the expected hold part of the bag disposed in the takeoff area in a state where the height direction position of the expected hold part of the bag and the height direction position of the hold member correspond to each other. The hold member is moved to transfer the bag from the takeoff area to a delivery area after the hold member holds the expected hold part of the bag disposed in the takeoff area.

12 Claims, 42 Drawing Sheets

(51) Int. Cl.
  *B65G 47/28* (2006.01)
  *B65B 43/46* (2006.01)
  *B65G 47/61* (2006.01)

(52) U.S. Cl.
  CPC .............. *B65G 47/28* (2013.01); *B65G 47/61* (2013.01); *B65G 2201/0238* (2013.01); *B65G 2203/0225* (2013.01); *B65G 2203/0233* (2013.01)

(58) Field of Classification Search
  USPC ........................................ 53/562, 570, 384.1
  See application file for complete search history.

(56) References Cited

U.S. PATENT DOCUMENTS

| | | | | |
|---|---|---|---|---|
| 4,108,300 | A * | 8/1978 | Hayase | B65B 43/26 198/470.1 |
| 4,423,583 | A * | 1/1984 | Carey | B65B 43/465 493/206 |
| 4,616,472 | A * | 10/1986 | Owensby | B65B 43/36 53/459 |
| 6,516,587 | B1 * | 2/2003 | Chikatani | B65B 43/26 53/384.1 |
| 8,122,684 | B2 * | 2/2012 | Kurz | B65B 59/005 53/284.7 |
| 8,151,543 | B2 * | 4/2012 | Veix | B65B 43/26 141/166 |
| 2005/0229547 | A1 * | 10/2005 | Koke | B65B 25/065 53/468 |
| 2015/0217889 | A1 * | 8/2015 | Nakamoto | B65B 43/465 198/678.1 |
| 2018/0215486 | A1 * | 8/2018 | Franzaroli | B65B 51/146 |

* cited by examiner

BAG CONVEYANCE METHOD AND BAG CONVEYANCE APPARATUS

CROSS-REFERENCE TO RELATED APPLICATIONS

This application is based upon and claims the benefit of priority from Japanese Patent Application No. 2018-96388, filed on May 18, 2018; the entire contents of which are incorporated herein by reference.

TECHNICAL FIELD

The present invention relates to a bag conveyance method and a bag conveyance apparatus.

BACKGROUND ART

Japanese patent application publication No. 2002-308224 discloses a supply method and a supply apparatus for package bags which have been filled with solid matters. According to the method and apparatus of Japanese patent application publication No. 2002-308224, by bringing guide members into contact with both side edge portions (side seal portions) of a solid-filled package bag in a takeoff position, the positions of the both side edge portions of the package bag are corrected in such a manner that positioning of the package bag is performed. Also, after the package bag is positioned, the package bag is transferred to the delivery position while its both side edge portions are gripped by grip members.

SUMMARY OF INVENTION

Technical Problem

According to the method and the apparatus disclosed in Japanese patent application publication No. 2002-308224, since the positions of the both side edge portions of a solid-filled package bag are corrected, the both side edge portions of the package bag can be gripped reliably and stably by the grip members.

However, when the size or the number of solid matters contained in a package bag change, the thickness in the height direction of the package bag changes, and when the thickness of a package bag changes, the positions of the both side edge portions of the package bag change in the height direction. In this case, a gap occurs between the height direction position of the grip members and the height direction position of the both side edge portions of the package bag. Due to this gap, the areas of the both side edge portions of the package bag which are actually gripped by the grip members are smaller than expected, and the package bag may not be gripped reliably and stably by the grip members. In this situation, there is a concern that the package bag may drop out of the grip members during transfer of the package bag, and also there is a concern that the package bag may drop out of the grip members when the packaging member is tensioned in the width direction by the grip members.

The present invention has been contrived in view of the above-described circumstances, and provides an apparatus and a method which enable a bag to be stably held with a hold member even when the position in the height direction of the portion of the bag which is held by the hold member can change.

Solution to Problem

One aspect of the present invention is directed to a bag conveyance method comprising the steps of: disposing a bag in a substantially horizontal attitude in a takeoff area, a content being put in the bag, a mouth portion of the bag being not sealed; causing a height direction position of an expected hold part of the bag and a height direction position of a hold member to correspond to each other; causing the hold member to hold the expected hold part of the bag disposed in the takeoff area in a state where the height direction position of the expected hold part of the bag and the height direction position of the hold member correspond to each other; and moving the hold member to transfer the bag from the takeoff area to a delivery area after the hold member holds the expected hold part of the bag disposed in the takeoff area.

By moving the bag in the height direction, the height direction position of the expected hold part of the bag and the height direction position of the hold member may be caused to correspond to each other.

Another aspect of the present invention is directed to a bag conveyance apparatus comprising: a first conveyance unit which disposes a bag in a substantially horizontal attitude in a takeoff area, a content being put in the bag, a mouth portion of the bag being not sealed; a hold member which holds an expected hold part of the bag arranged in the takeoff area; a lifting-lowering mechanism which adjusts a relative position in a height direction between the expected hold part of the bag and the hold member before the hold member holds the expected hold part of the bag; and a transfer mechanism which moves the hold member to transfer the bag from the takeoff area to a delivery area after the hold member holds the expected hold part of the bag disposed in the takeoff area, wherein the lifting-lowering mechanism adjusts the relative position in such a manner that the bag is positioned in the takeoff area in a state where a height direction position of the expected hold part of the bag and a height direction position of the hold member correspond to each other.

The first conveyance unit may have a placement surface on which the bag disposed in the takeoff area is to be placed; and the lifting-lowering mechanism may adjust a height direction position of the placement surface.

The first conveyance unit may include a first conveyance belt having the placement surface; and the lifting-lowering mechanism may locally apply a force to the first conveyance belt to move the first conveyance belt in the height direction.

The bag conveyance may further comprises a second conveyance unit which is provided on an upstream side from the first conveyance unit and conveys the bag, wherein: the second conveyance unit may include a second conveyance belt on which the bag is to be placed; the bag may be delivered from an outlet side end of the second conveyance belt to an inlet side end of the first conveyance belt; and the lifting-lowering mechanism may locally move the first conveyance belt in the height direction in such a manner that, while the outlet side end of the second conveyance belt and the inlet side end of the first conveyance belt are arranged in positions which correspond to each other in the height direction, the height direction position of the expected hold part of the bag and the height direction position of the hold member correspond to each other.

According to the present invention, an apparatus and a method can be provided which enable a bag to be stably held with a hold member even when the position in the height direction of the portion of the bag which is held by the hold member may change.

DESCRIPTION OF EMBODIMENTS

[First Mode]

Referring now to FIGS. 1-27, bag supply methods and bag supply apparatuses according to several embodiments of the present invention will be described in detail.

[Example Where a Conveyance Unit (Conveyance Means) is an Intermittent Conveyance Type]

Figure 1:
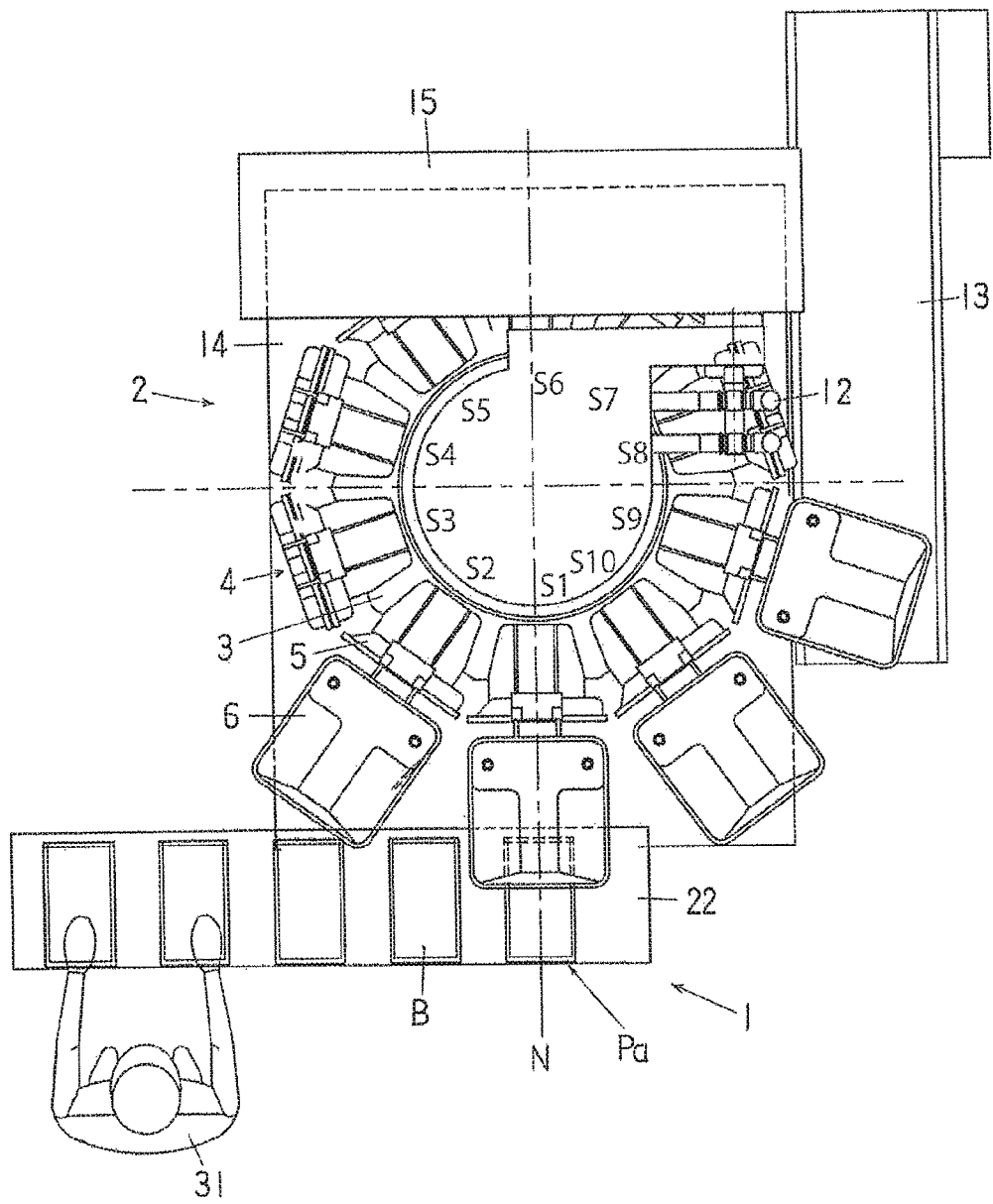
FIG. 1 is a top view of a bag supply apparatus and a package machine according to an embodiment of the present invention.
Figure 2:
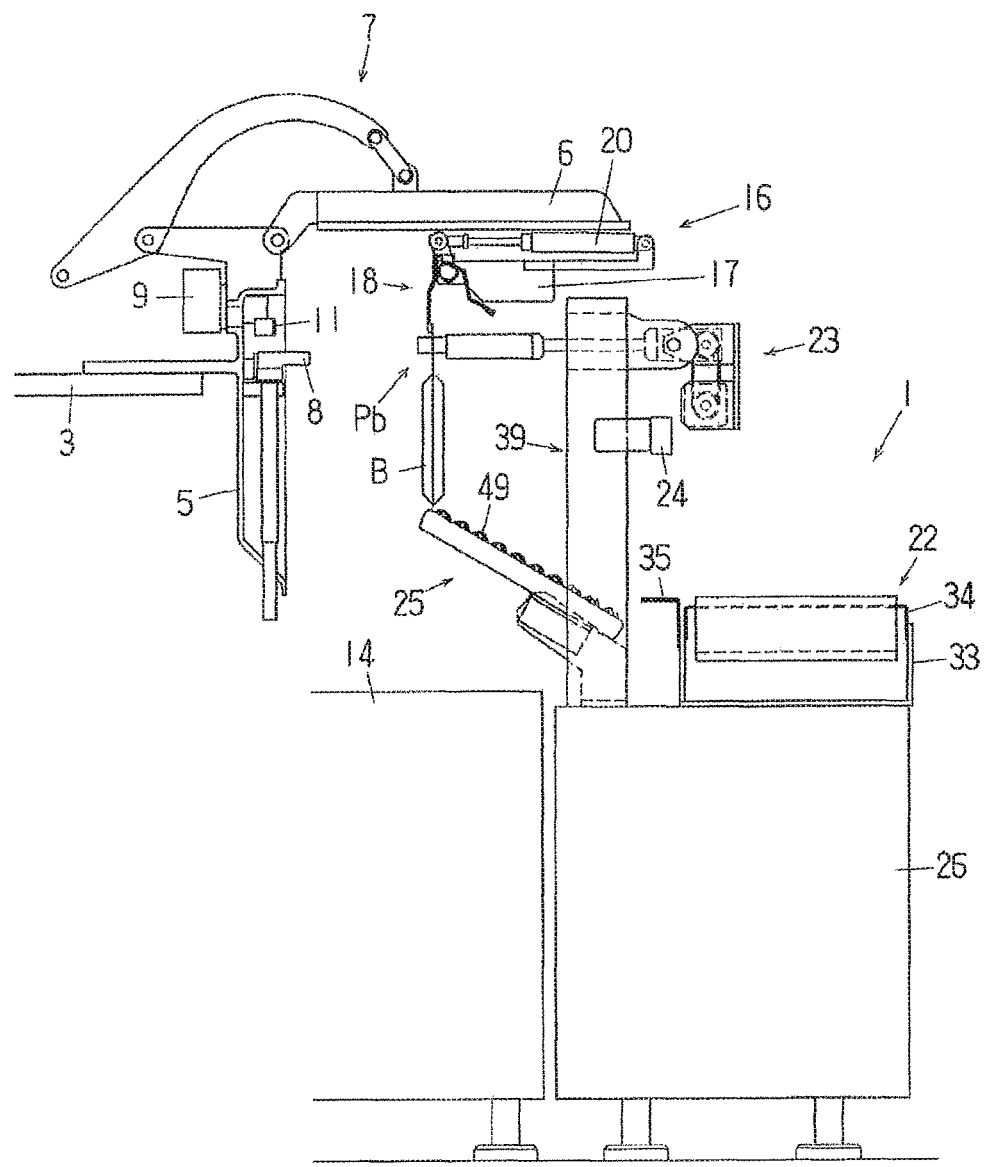
FIG. 2 is a side view of the supply apparatus and the package machine shown in FIG. 1.

FIGS. 1 to 11 show a bag supply method and a bag supply apparatus according to an embodiment (intermittent conveyance type) of the present invention. As shown in FIGS. 1 and 2, a bag supply apparatus 1 is installed in the vicinity of a vacuum package machine 2.

The vacuum package machine 2, which is similar to that described in Japanese patent application publication No. 2013-244967, comprises: a table 3 which rotates intermittently (in the clockwise direction in FIG. 1) so as to repeat rotation and stop at a constant pace; and a plurality of (ten (10) in this example) vacuum chambers 4 installed at equal angular intervals at the periphery of the table 3. Each vacuum chamber 4 includes: a chamber body 5 fixed to the table 3; and a chamber lid 6 installed so as to be able to open and close with respect to the chamber body 5.

The chamber bodies 5 are attached to the periphery of the table 3 at equal intervals in a radial manner while the opening sections of the chamber bodies 5 are directed outward. As described in Japanese patent application publication No. 2013-244967, a chamber lid 6 is opened and closed with respect to the opening section of a chamber body 5 by means of an opening-closing mechanism 7 (see FIG. 2), and when the chamber lid 6 is closed, the chamber lid 6 is brought into close contact with the chamber body 5 at its opening section peripheral portion to form a vacuum chamber 4. As shown in FIG. 2, a gripper 8 and a sealing device are installed in the vacuum chamber 4, the gripper 8 grips a portion of a bag B which is located slightly below an expected seal portion of the bag B (for details, see Japanese Patent No. 2538473 for example), and the sealing device is configured by a heater (not illustrated; provided on the chamber lid 6 side) and a receiving pad 11 (provided on the chamber body 5 side) which is moved forward and backward by an air cylinder 9. A vacuum pipe (a part of which is shown by reference numeral "12" in FIG. 1) connected to a vacuum pump and a switching valve, which function as a pressure reduction mechanism, is connected to the chamber body 5, and a packing (not illustrated) is installed in the close contact portion between the chamber body 5 and the chamber lid 6 (i.e., in the peripheral portion of the opening section of the chamber lid 6) over its entire perimeter.

A vacuum chamber 4 intermittently moves on a horizontal circular transfer path along with the intermittent rotation of the table 3 (in FIG. 1, reference signs S1 to S10 described on the table 3 indicate stop positions), and while the table 3 rotates one revolution, various package process steps, such as receiving a bag B into which a solid substance is filled and the bag mouth portion of which is not sealed (gripping a bag B with a gripper 8), closing a chamber lid 6, performing a depressurization processing in the vacuum chamber 4, and sealing the bag mouth portion, are sequentially performed. After the bag mouth portion is sealed, the inside of the vacuum chamber 4 is returned to the atmospheric pressure, the chamber lid 6 is opened, the gripper 8 is opened, and the bag B falls onto a conveyor 13 and is carried out of the machine. In FIGS. 1 and 2, reference sign "14" indicates a stand of the vacuum package machine 2, and reference sign "15" indicates a control device that controls the operation of the bag supply apparatus 1 and the vacuum package machine 2 and the like.

As shown in FIG. 2, a bag delivery device 16 is disposed between the vacuum package machine 2 and the supply apparatus 1. The delivery device 16 receives a bag B from the supply apparatus 1 and moves the bag B horizontally to deliver the bag B to the gripper 8 of the vacuum package machine 2, and includes a slide member 17 which linearly reciprocates a predetermined distance in a horizontal plane by a drive source (not illustrated) and a chuck 18 installed on the slide member 17. The chuck 18 comprises: a fixed side chuck 18a fixed to the slide member 17; and a movable side chuck 18b fixed to a shaft 19 which is rotatably supported by the slide member 17 (see FIG. 5). The delivery device 16 further includes an air cylinder 20 installed on the slide member 17, and the tip of the piston rod 20a of the air cylinder 20 is connected to a lever 21 fixed to the shaft 19. When the air cylinder 20 is activated (the piston rod 20a advances and retreats), the chuck 18 opens and closes, and when the slide member 17 reciprocates, the chuck 18 reciprocates along a horizontal linear transfer path (which is also a transfer path for a bag B gripped by the chuck 18) between a standby position (shown by a solid line in FIG. 11) and a forward position (shown by a two-dot chain line in FIG. 11).

The supply apparatus 1 includes a conveyance unit (a conveyance means; a belt conveyor 22), a bag transfer unit (a bag moving means) 23, a detection unit (a detection means; a sensor 24), a bag guide unit (a bag guide means) 25, and the control apparatus 15.

Figure 3:
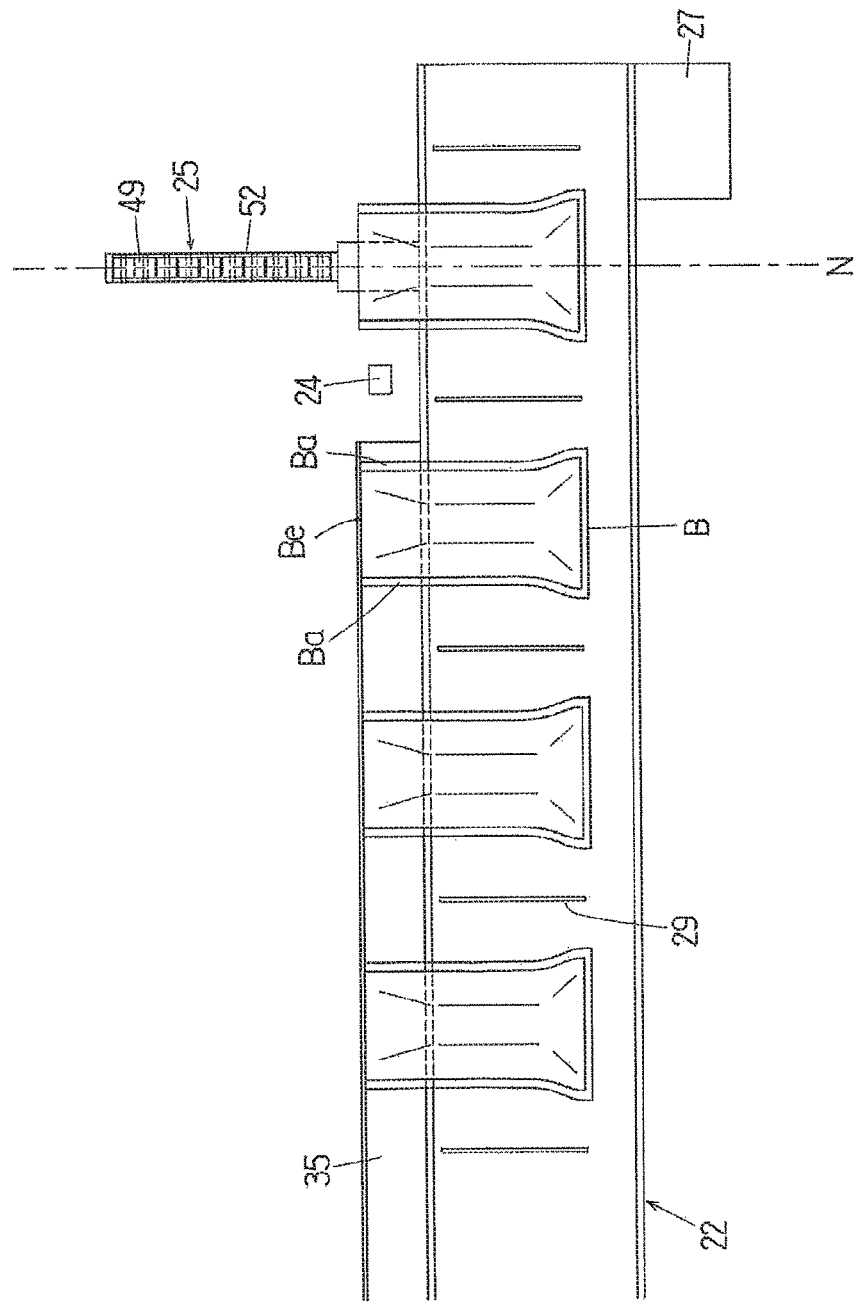
FIG. 3 is a top view of a belt conveyor and a bag guide means in the supply apparatus shown in FIG. 1.

The belt conveyor 22 is installed on a table 26, has a horizontal conveyance surface, and intermittently conveys an object to be conveyed (a bag B) along the linear conveyance path by a drive source (first servomotor 27) shown in FIG. 3. Partition plates 29 (see FIGS. 3 and 4) are fixed to the surface of the belt 28 of the belt conveyor 22 at equal intervals (each of which is basically equivalent to the distance of one intermittent conveyance). In FIG. 1, the belt conveyor 22 is in a stopped state, and bags B are placed on the belt conveyor 22 at substantially equal intervals. An operator 31 fills an empty bag with a solid substance 32 (see FIG. 4) and places it (i.e., the bag B) on the belt conveyor 22, and partition plates 29 are used as a guide for the position where the bag B is placed. The bag mouth portion of each bag B placed on the belt conveyor 22 is not sealed, the bag mouth portion is directed to the side of the vacuum package machine 2, the width direction (the direction which is along the bag mouth edge Be or is a direction perpendicular to the side edges of the bag) is substantially parallel to the conveyance direction of the belt conveyor 22, and as shown in FIG. 3, the tip portion (in the vicinity of the bag mouth portion) protrudes out of the belt 28. In this example, the last stop position of a bag B on the belt conveyor 22 is set as a bag takeoff position (which is a position where the both side edge portions Ba, Ba of a bag B are gripped by a pair of grip members 37, 37 of the bag transfer unit 23 described later). The takeoff position for bags B is indicated by reference sign Pa in FIG. 1. A receiving pad 34 for keeping the belt 28 (the upper surface side) horizontal and a support plate 35 for supporting the tip portion of a bag B (in the vicinity of the bag mouth portion) which protrudes from the belt 28 are installed on a frame 33 of the belt conveyor 22.

In the supply apparatus 1, one vertical plane is set as a reference plane N (see FIG. 1), and the conveyance path of the belt conveyor 22 is perpendicular to the reference plane N.

Figure 4:
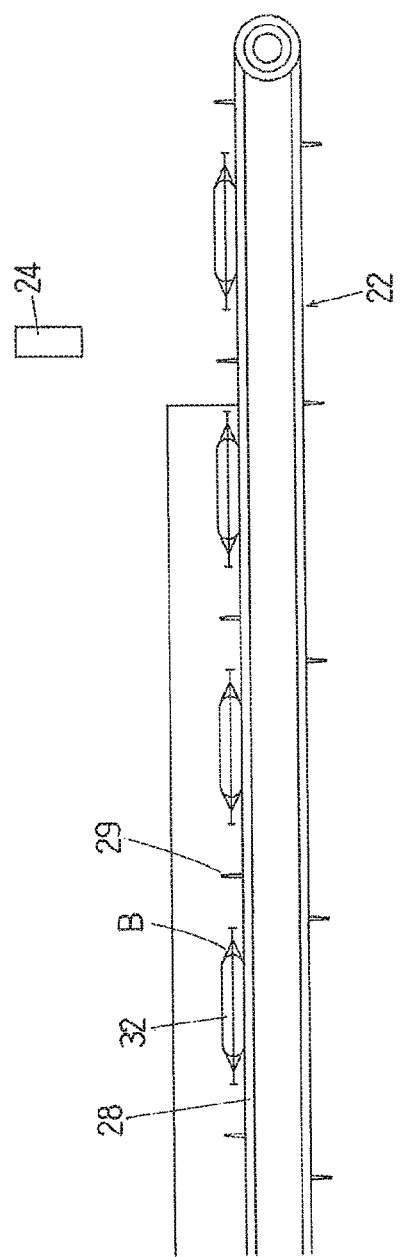
FIG. 4 is a front view of the belt conveyor of the supply apparatus shown in FIG. 1.

In this example, as shown in FIGS. 3 and 4 in particular, the sensor 24 is provided, above the conveyance path, between the last stop position (bag takeoff position Pa) and the previous stop position before the last stop position, and has a function of detecting the bag width in the vicinity of the mouth portion of a conveyed bag B and the position information of the center thereof. More specifically, the sensor 24 detects the fact that the side edge portion Ba on the front side of a bag B has entered a detection position (a position directly below the sensor 24) (detection signal ON) and the fact that the side edge portion Ba on the rear side of a bag B has passed the detection position (detection signal OFF), and the control apparatus 15 calculates (determines) the bag width and the position information of the center thereof according to the detection signals and the rotation positions of the first servomotor 27 at the detection signal ON/OFF times. The width of a bag B detected by the sensor 24 is hereinafter referred to as a detected bag width.

The detected bag width of a bag B is the apparent bag width (i.e., the bag width when the bag B is viewed from the directly above), and similarly, the center of the detected bag width is the center of the apparent bag width. A bag B filled with a solid substance 32 expands in the thickness direction, the apparent bag width is smaller than the nominal width (i.e., the nominal width of a bag not filled with a solid substance) and often varies from bag to bag, and therefore, the apparent bag width of a bag B and the position information of the center thereof are required to be detected with respect to each bag.

The control apparatus 15 calculates the distance from the center to the reference plane N according to the position information of the center of the detected bag width of a bag B (the bag width measured in a direction parallel to the conveyance path), controls the first servomotor 27 according to the calculated distance to adjust the intermittent conveyance distance of the belt conveyor 22 in such a manner that the center of the detected bag width of a bag B which stops at the takeoff position Pa is positioned on the reference plane N. For example, a photoelectric sensor or a CCD (Charge-Coupled Device) image sensor can be used as the sensor 24.

Figure 5:
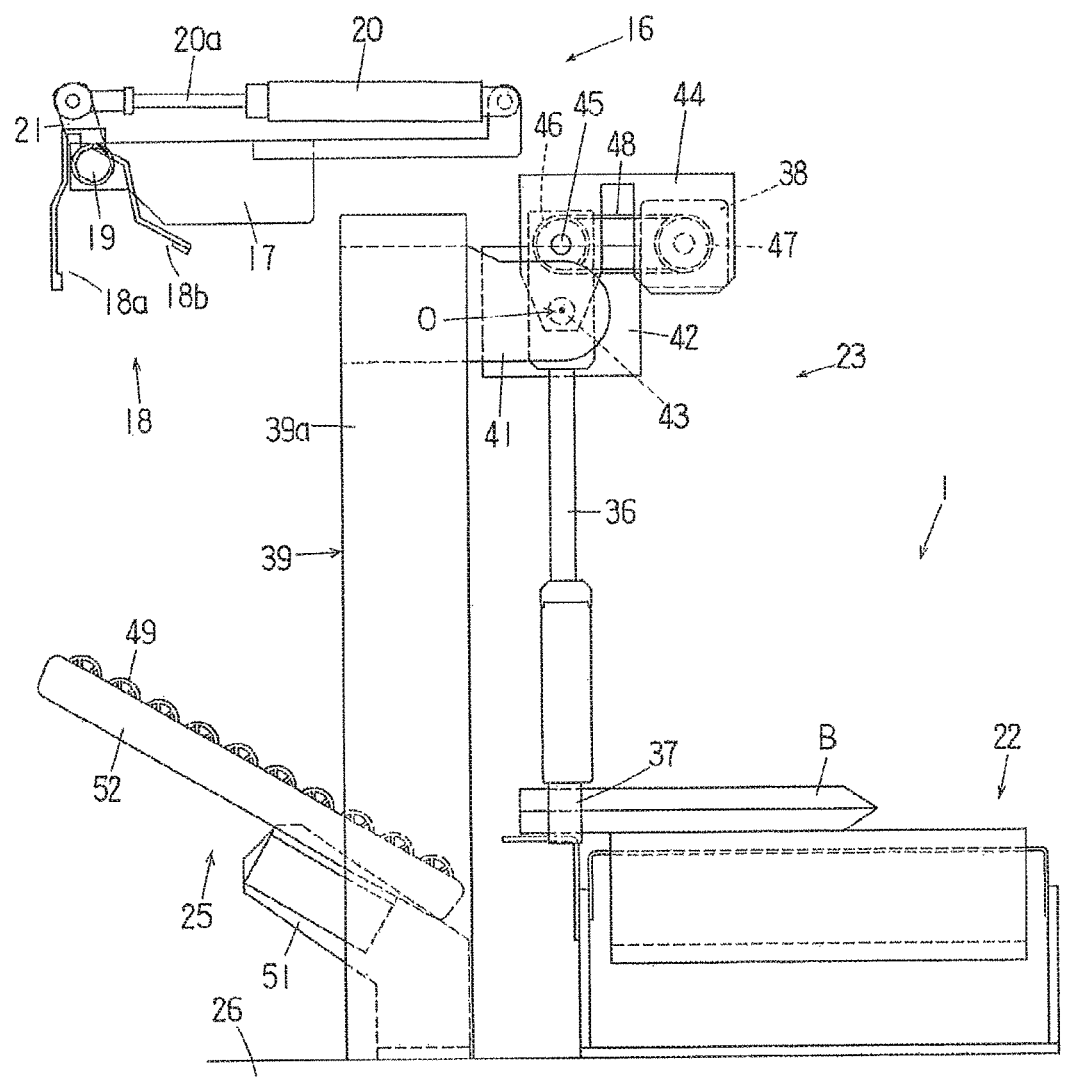
FIG. 5 is a side view of the supply apparatus shown in FIG. 1.
Figure 6:
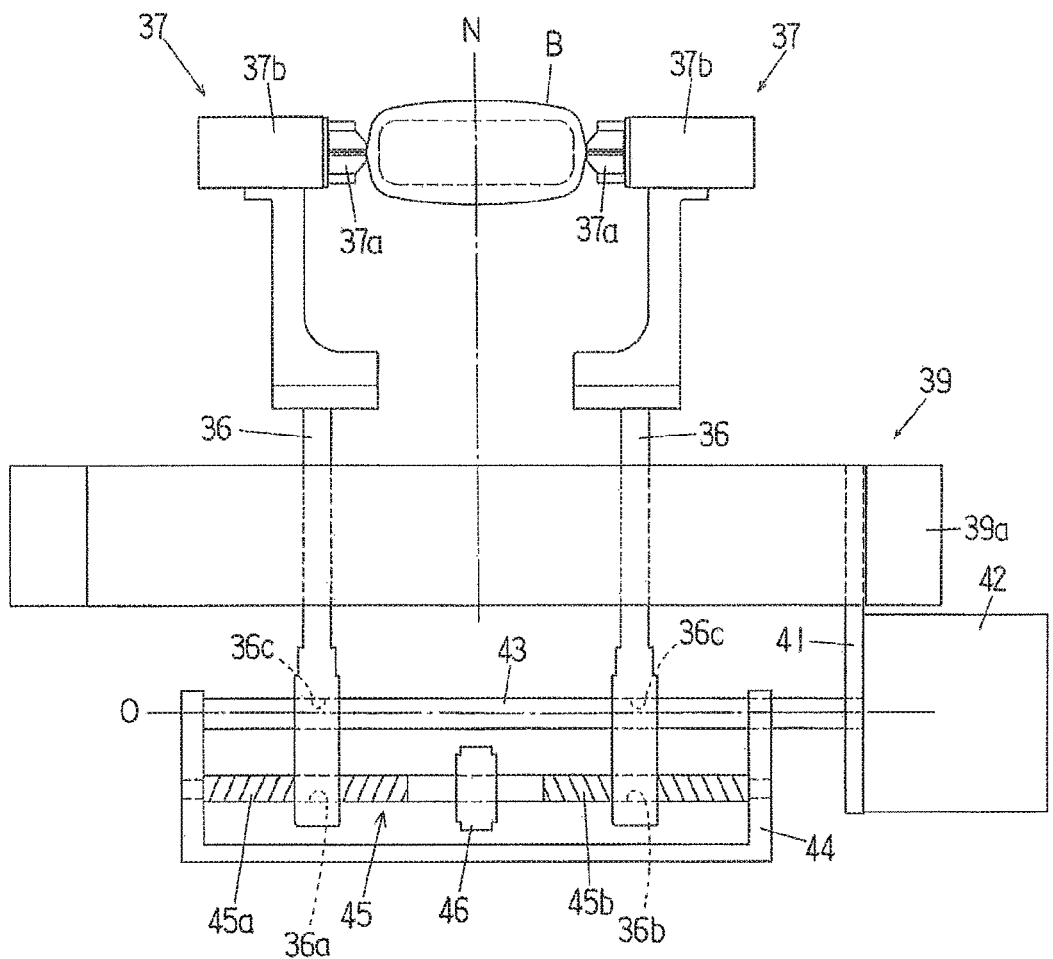
FIG. 6 is a top view of a bag moving means of the supply apparatus shown in FIG. 1 (wherein the distance between grip members forming a pair is small).

The bag transfer unit 23 causes a bag B to move from the takeoff position Pa on the conveyance path to the delivery position Pb (the position at which a bag B is gripped by the chuck 18 of the bag delivery device 16), and comprises: a pair of swing arms 36, 36 swinging in a range of about 90° around the axis O perpendicular to the reference plane N; grip members 37 installed at the tip of the respective swing arms 36; and a second servomotor 38 which widens or narrows the interval between the swing arms 36, 36 forming a pair (grip members 37, 37 forming a pair), as illustrated in FIGS. 5 and 6 in particular. The alignment direction of the pair of grip members 37 is parallel to the conveyance path.

Regarding the concrete structure of the bag transfer unit 23, a gate-type stand 39 is installed on the table 26, and a reciprocating drive motor 42 is fixed to a bracket 41 installed on a leg 39a of the stand 39, a frame 44 is fixed to the rotation shaft 43 (the center of which is the axis O) of the reciprocating drive motor 42, and both ends of a screw shaft 45 are rotatably supported by the frame 44. The screw shaft 45 has screw portions 45a, 45b which are threaded in opposite directions to each other on the left and right, and a pulley 46 is fixed to the central portion of the screw shaft 45. Further, the second servomotor 38 is installed on the frame 44, and a belt 48 is stretched between and wound around a drive pulley 47 fixed to the rotation shaft of the second servomotor 38 and the pulley 46.

Each swing arm 36 has a female screw portion 36a (36b) screwed to the screw portion 45a (45b) of the screw shaft 45 and a hole 36c through which the rotation shaft 43 of the reciprocating drive motor 42 penetrates, and a grip member 37 is installed on the tip portion of each swing arm 36. Each grip member 37 includes a double-opening type grip portion 37a and an air cylinder 37b which opens and closes the grip portion 37a. The grip portions 37a in a closed state is shown by solid lines in FIGS. 6 and 7, and the grip portions 37a in an open state is shown by two-dot chain lines in FIG. 7.

When the second servomotor 38 is activated, the swing arms 36, 36 forming a pair approach or go away from each other symmetrically with respect to the reference plane N, and accordingly, the grip members 37, 37 forming a pair approach or go away from each other symmetrically (parallel to the conveyance path) with respect to the reference plane N (the distance between the grip members 37, 37 forming a pair narrows or widens).

The rotation shaft 43 is reciprocally rotated by the reciprocating drive motor 42 within an angle range of 90°. Coupled with that, the pair of swing arms 36, 36 swings about the axis O in an angle range of 90° between the vertical attitude (see FIG. 5) and the horizontal attitude (see FIG. 2), and the grip member 37 installed at the tip portion of each swing arm 36 also swings about the axis O in an angle range of 90° between the takeoff position Pa and the delivery position Pb. The holding surface of the grip member 37 is horizontal at the takeoff position Pa and is vertical at the delivery position. When the pair of grip members 37, 37 moves from the takeoff position Pa to the delivery position Pb, the locus of the center of the pair of grip members 37, 37 (transfer path of the pair of grip members 37, 37) is located on the reference plane.

The takeoff position Pa corresponds to a position of a bag B on the conveyance path and is also a position of the pair of grip members 37, 37 on the transfer path (a position at which a bag B is gripped). Further, the delivery position Pb is a position of a bag B on the transfer path and is also a position of the pair of grip members 37, 37 on the transfer path.

The control apparatus 15 controls the second servomotor 38 according to the detected bag width of a bag B (the bag width measured in the direction parallel to the conveyance path) to adjust the distance between the grip members 37, 37 forming a pair at the takeoff position Pa in accordance with the detected bag width of the bag B (so that the larger the detected bag width of the bag B, the larger the distance between the grip members 37, 37 forming a pair) in such a manner that proper positions of the side edge portions Ba, Ba of the bag B can be symmetrically held.

Figure 7:
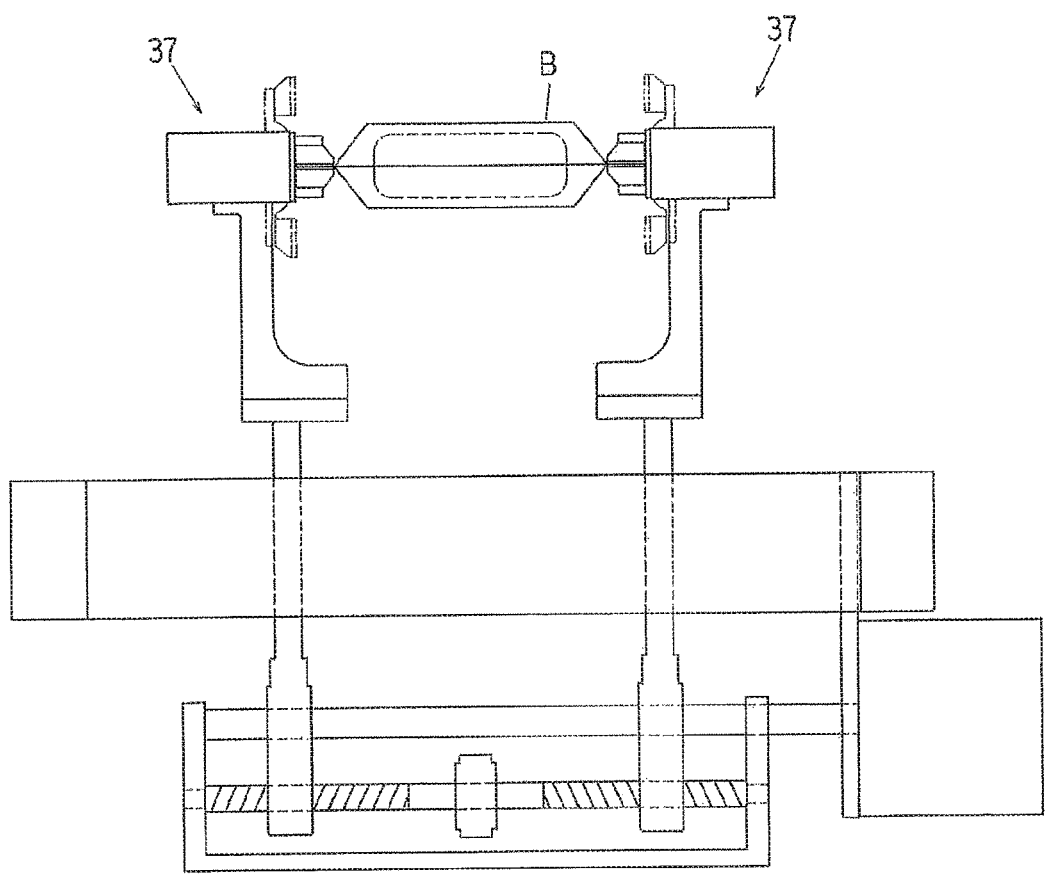
FIG. 7 is a top view of the bag moving means of the supply apparatus shown in FIG. 1 (wherein the distance between grip members forming a pair is large).

Further, while the pair of grip members 37, 37 (a bag B) moves along the transfer path from the takeoff position Pa to the delivery position Pb or after the pair of grip members 37, 37 (a bag B) reaches the delivery position Pb, the control apparatus 15 controls the second servomotor 38 to widen the distance between the grip members 37, 37 forming a pair in accordance with the nominal width of the bag B so as to tighten the bag mouth portion of the bag B. FIG. 7 shows a state in which the distance between the grip members 37, 37 forming a pair is widened at the delivery position Pb and the bag mouth of a bag B is tightened and closed.

The bag guide unit 25 includes a contact member, and the contact member is disposed along the transfer path below the transfer path of the pair of grip members 37, 37 (this transfer path can also be referred to as a transfer path of a bag B) and contacts a bag B. This contact member comprises a plurality of rollers 49 provided so as to be able to rotate about rotational axes perpendicular to the reference plane N as shown in FIGS. 2, 3 and 5. A support stand 51 is installed on the table 26, a frame 52 is installed on the support stand 51, and the plurality of rollers 49 are installed on the frame 52 in a line along the transfer path.

While a bag B moves along the transfer path from the takeoff position Pa on the conveyance path of the belt conveyor 22 toward the delivery position Pb in a state where both side edge portions of the bag B are gripped by the pair of grip members 37, 37, the bag B contacts rollers 49 (see FIG. 9), and thereby shaking of the bag B during the movement is reduced and the bag B can be delivered to the delivery device 16 reliably and stably.

Subsequently, an example of the operation mode of the above-described supply apparatus 1, the delivery device 16, and the vacuum package machine 2 (in particular, the operation mode of the supply apparatus 1) will be described over time with reference to further FIGS. 8 to 11.

(1) As shown in FIGS. 1 and 3, an operator 31 fills bags B with a solid substance 32 and places the bags B on the belt conveyor 22 at substantially equal intervals in such a manner that the width direction of the bags B (a direction along the bag mouth portion edge Be) is directed parallel to the conveyance direction of the belt conveyor 22. In this operation, when one side edge portion Ba of a bag B is brought into contact with a partition plate 29, it is easy to accurately orient the bag B so that the width direction of the bag B coincides with the conveyance direction and to place bags B on the belt conveyor 22 at equal intervals. As shown in FIG. 3, the upper portions of the bags B (near the bag mouth portions) protrude from the end of the belt 28 and are placed on the support plate 35.

(2) The sensor 24 detects the width near the bag mouth portion of a bag B conveyed below the sensor 24 (between the last stop position (takeoff position Pa) and the stop position before that on the conveyance path of the belt conveyor 22) (detected bag width) and the position information of its center.

At substantially the same timing, the pair of swing arms 36, 36 of the bag transfer unit 23 starts swinging downward, and the pair of grip members 37, 37 moves toward the takeoff position on the conveyance path of the belt conveyor 22. In this operation, the grip portions 37a, 37a of the pair of grip members 37, 37 are open.

(3) The control apparatus 15 controls the first servomotor 27 according to the position information of the center of the detected bag width of the bag B to adjust the intermittent conveyance distance of the belt conveyor 22, so that when the belt conveyor 22 stops, the center of the detected bag width of the bag B which stops at the takeoff position Pa is positioned on the reference plane N (see FIG. 3). In other words, when the center of the detected bag width of the bag B is positioned on the reference plane N, the belt conveyor 22 is stopped.

Further, the control apparatus 15 controls the second servomotor 38 according to the detected bag width of the detected bag B to adjust the distance between the grip members 37, 37 forming a pair at the takeoff position to correspond to the detected bag width of the bag B. The adjustment of the distance between the grip members 37, 37 forming a pair is preferably performed while the pair of grip members 37, 37 is moved toward the takeoff position Pa on the transfer path, and has been preferably completed when the pair of grip members 37, 37 reaches the takeoff position Pa.

Figure 8:
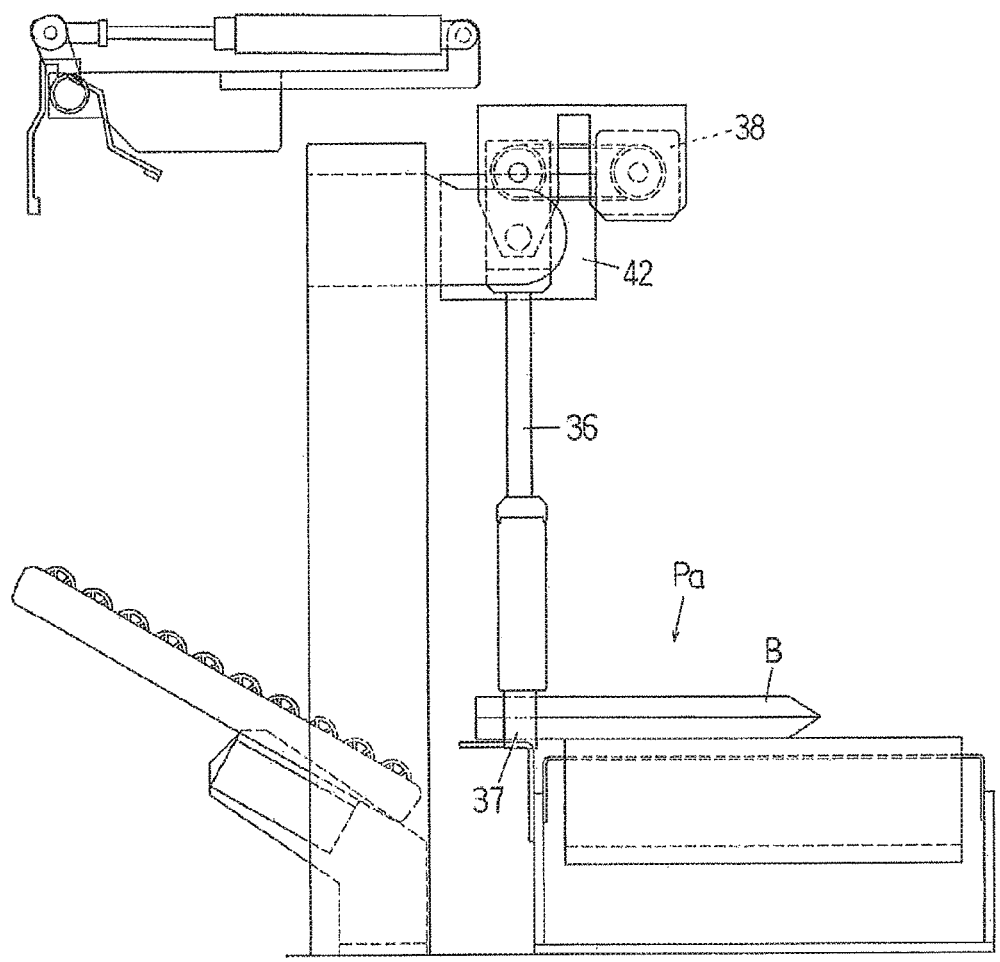
FIG. 8 is a side view showing the operation of the bag moving means of the supply apparatus shown in FIG. 1 with time.
Figure 9:
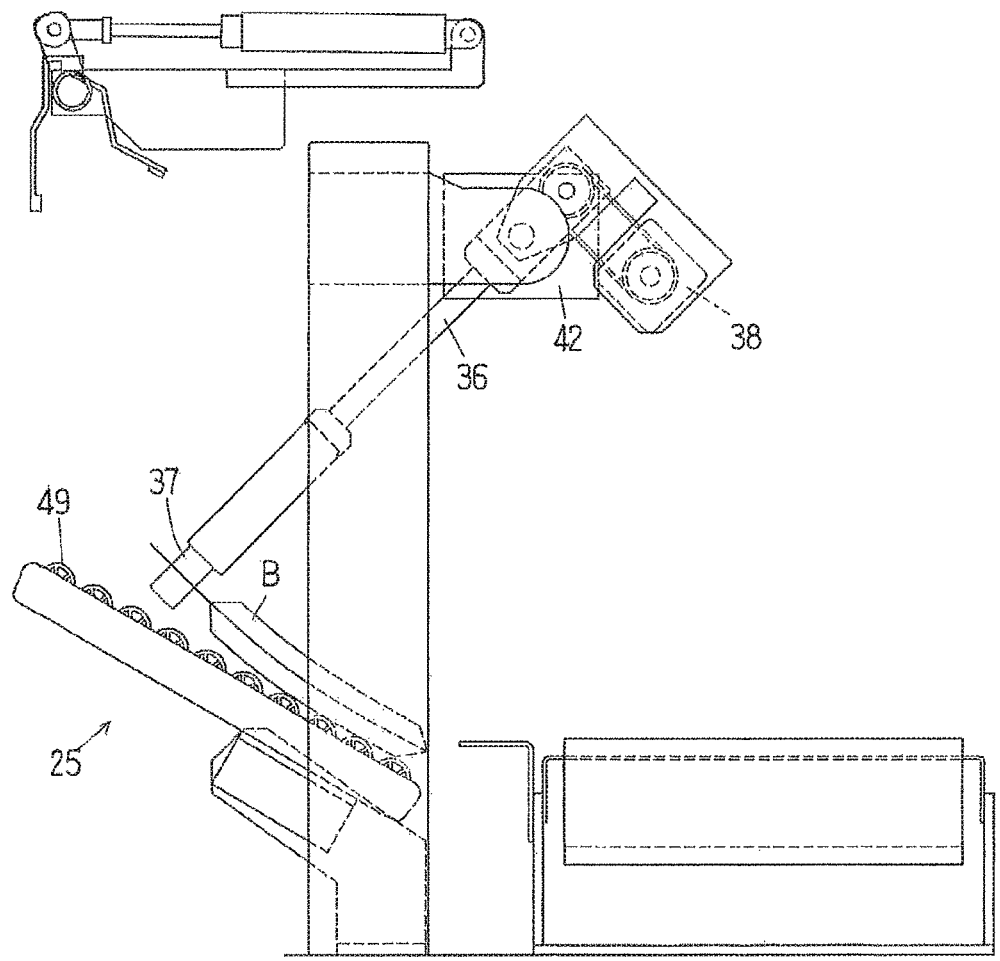
FIG. 9 is a side view showing the operation of the bag moving means of the supply apparatus shown in FIG. 1 with time.

(4) When the pair of grip members 37, 37 reaches the takeoff position Pa, the air cylinders 37b of the pair of grip members 37, 37 operate to close the grip portions 37a, 37a, so that the side edge portions Ba, Ba of a bag B which stops at the takeoff position Pa are gripped (see FIG. 8). Subsequently, the reciprocating drive motor 42 is operated so that the pair of swing arms 36, 36 in the vertical attitude starts swinging upward, and accordingly, the pair of grip members 37, 37 and the bag B move along the transfer path toward the delivery position Pb (see FIG. 9). In the course of this movement, the bag B contacts and is supported by the contact member (rollers 49) of the bag guide unit 25. Further, in the course of this movement, the posture of the bag B held by the pair of grip members 37 is changed from the horizontal attitude to the vertical attitude (in which the bag mouth portion is directed upward).

Figure 10:
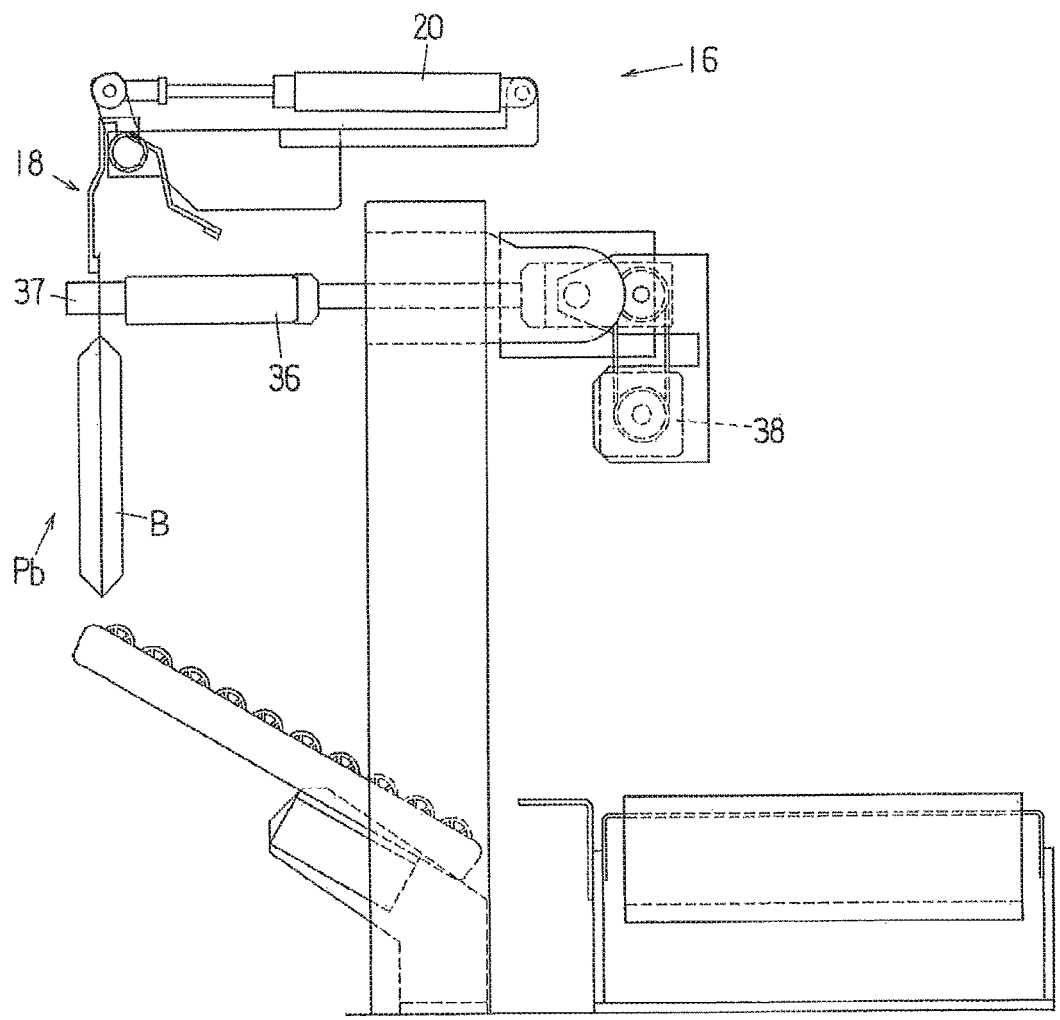
FIG. 10 is a side view showing the operation of the bag moving means of the supply apparatus shown in FIG. 1 with time.

(5) When the pair of swing arms 36, 36 is in the horizontal attitude, the pair of grip members 37, 37 and the bag B reach the end point of the transfer path (the delivery position Pb) and the bag B held by the pair of grip members 37, 37 is in the vertical attitude (see FIG. 10).

(6) Preferably, while the grip members 37, 37 forming a pair (the bag B) are moved along the transfer path from the takeoff position Pa to the delivery position Pb, the control apparatus 15 controls the second servomotor 38 so as to increase the distance between the grip members 37, 37 forming a pair according to the nominal width of the bag B in such a manner that the bag mouth portion of the bag B is tightened. This step may be performed after the grip members 37, 37 forming a pair (bag B) reach the delivery position Pb.

Here, instead of increasing the distance between the grip members 37, 37 forming a pair according to the nominal width of the bag B as described above, it is possible to detect the torque applied to the second servomotor 38 while the distance between the grip members 37, 37 forming a pair is increased and to stop the operation of the second servomotor 38 when the torque reaches a predetermined value.

Figure 11:
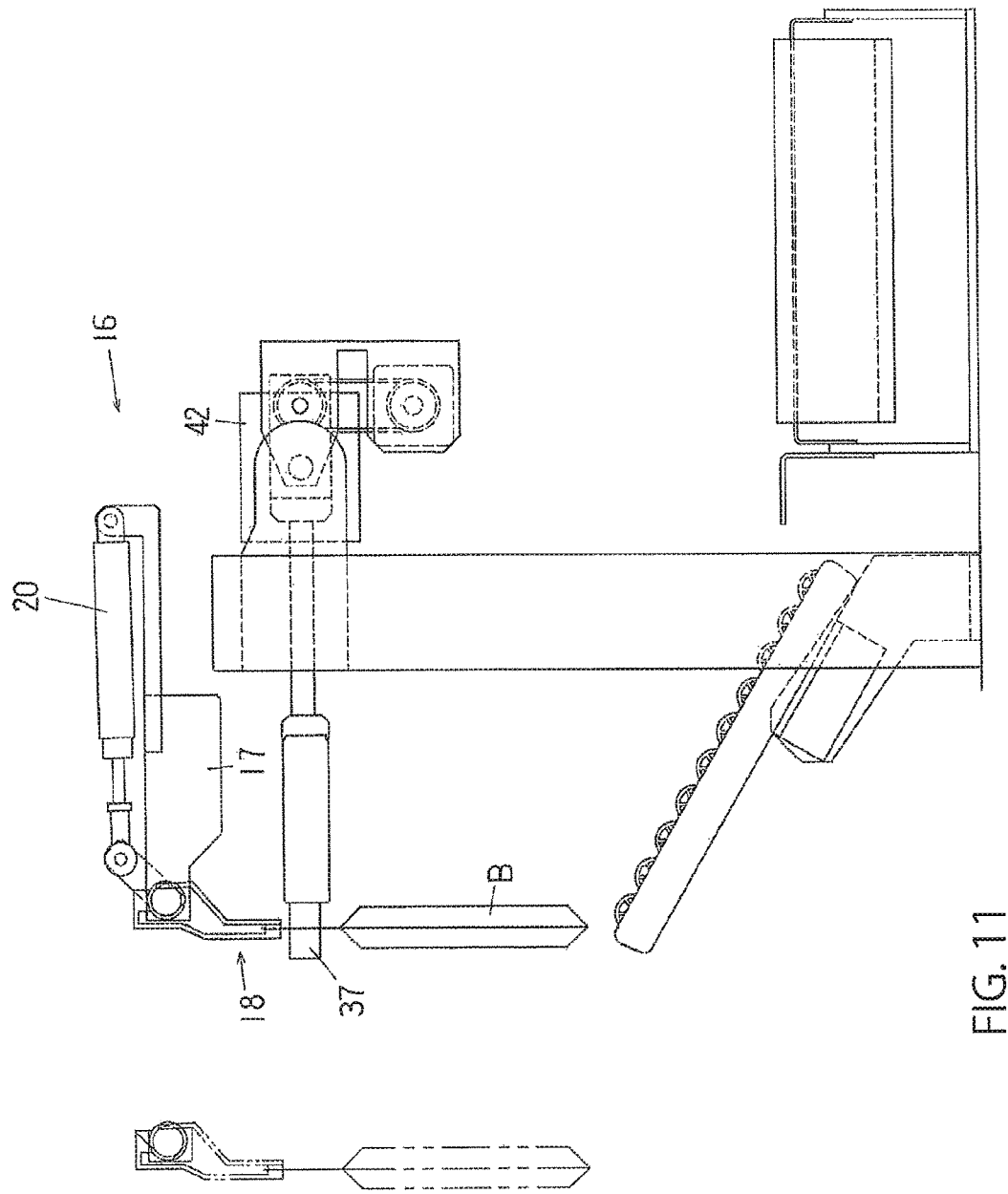
FIG. 11 is a side view showing the operation of the bag moving means of the supply apparatus shown in FIG. 1 with time.

(7) When the grip members 37, 37 forming a pair (the bag B) reach the end point (the delivery position Pb) of the transfer path, the air cylinder 20 of the delivery device 16, which is opened at that position (the standby position), operates in such a manner that the chuck 18 is closed to grip the upper end portion (bag mouth portion) of the bag B (see FIG. 11). Subsequently, the pair of grip members 37, 37, which holds the side edge portions Ba, Ba of the bag B, is opened to release the bag B, the reciprocating drive motor 42 is operated in reverse to cause the pair of swing arms 36, 36 to swing downward so that the pair of grip members 37 moves along the transfer path toward the takeoff position Pa.

(8) As shown by two-dot chain lines in FIG. 11, the slide member 17 of the delivery device 16 advances to move (advance) the chuck 18 and the bag B from the standby position to the forward position.

(9) When the chuck 18 and the bag B reach the forward position, the gripper 8 of a vacuum chamber 4 which is stopped at the stop position S1 (see FIG. 1) is closed to grip the upper end portion of the bag B (right below the part gripped by the chuck 18), and subsequently the chuck 18 is opened to release the bag B. The chuck 18 that has released the bag B moves (retracts) toward the standby position.

(10) The bag B gripped by the gripper 8 of the vacuum chamber 4 is subject to a predetermined decompression processing and a packaging processing, such as seal of the bag mouth portion, in the vacuum chamber 4 as the vacuum chamber 4 is intermittently moved. When the vacuum chamber 4 stops at the stop position 58 and the gripper 8 opens, the bag B (product) falls onto the conveyor 13.

[Example of Conveyance Unit of Continuous Conveyance Type]

Figure 12:
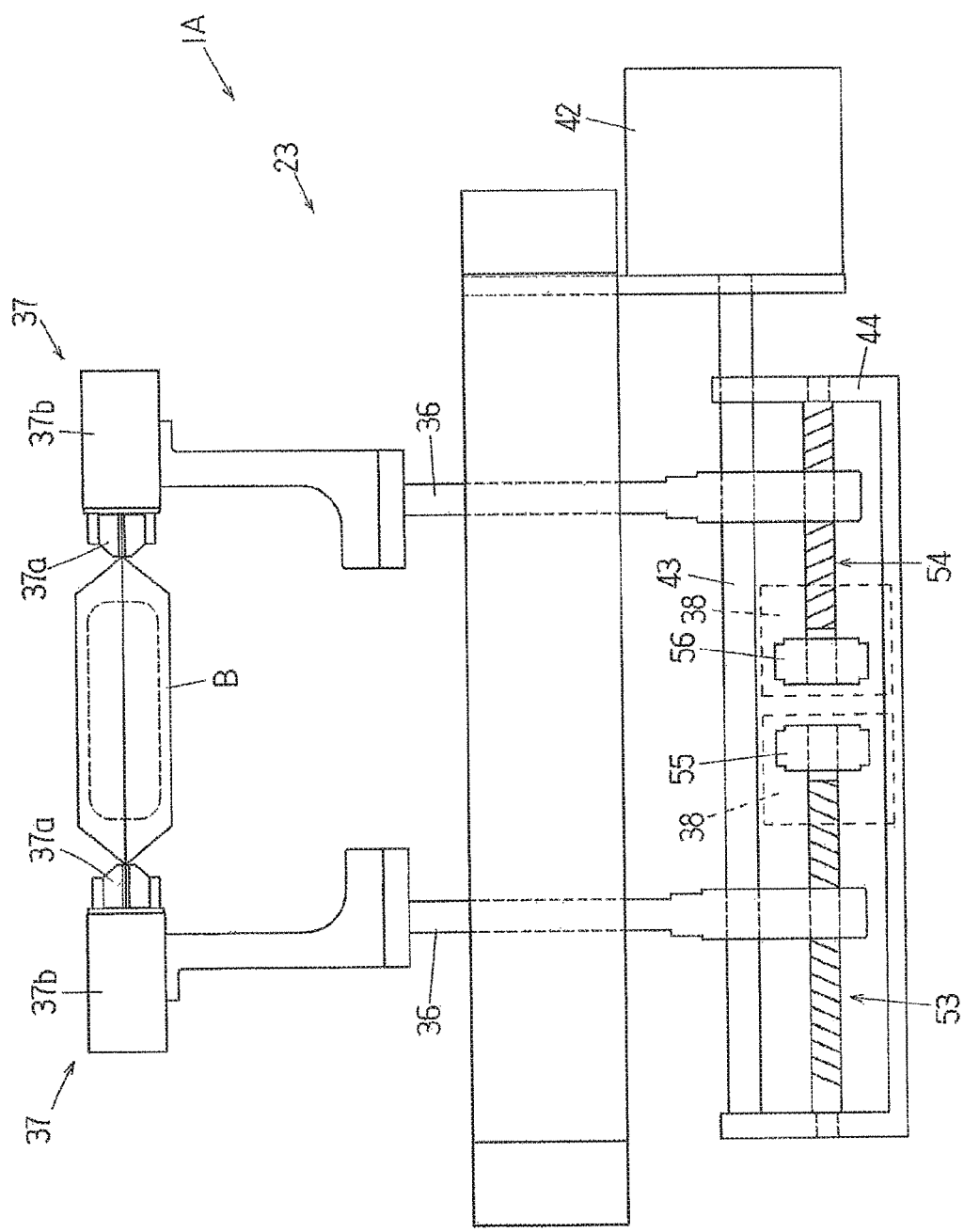
FIG. 12 is a top view of a bag moving means of a supply apparatus according to another embodiment of the present invention.
Figure 13A:
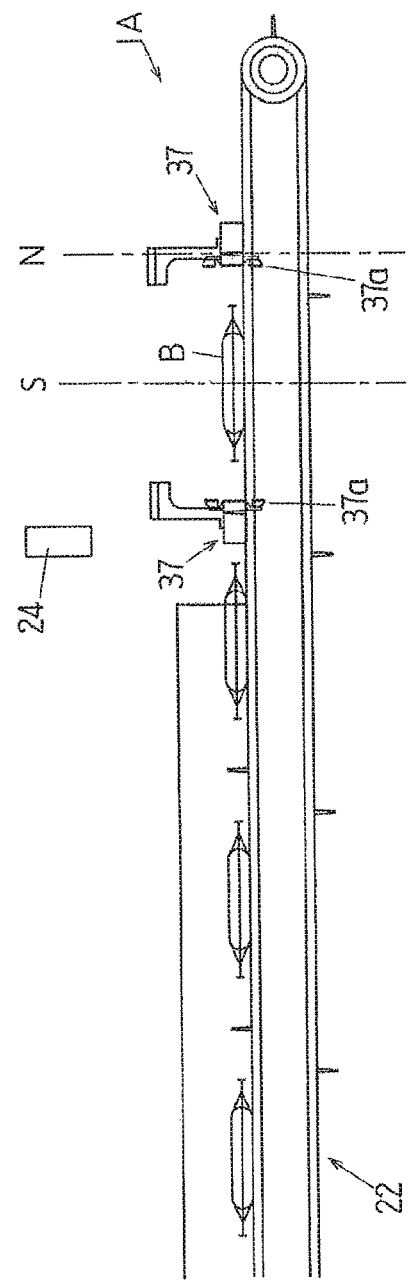
FIG. 13A is a side view showing an example of the operation of the bag moving means shown in FIG. 12 with time.
Figure 13B:
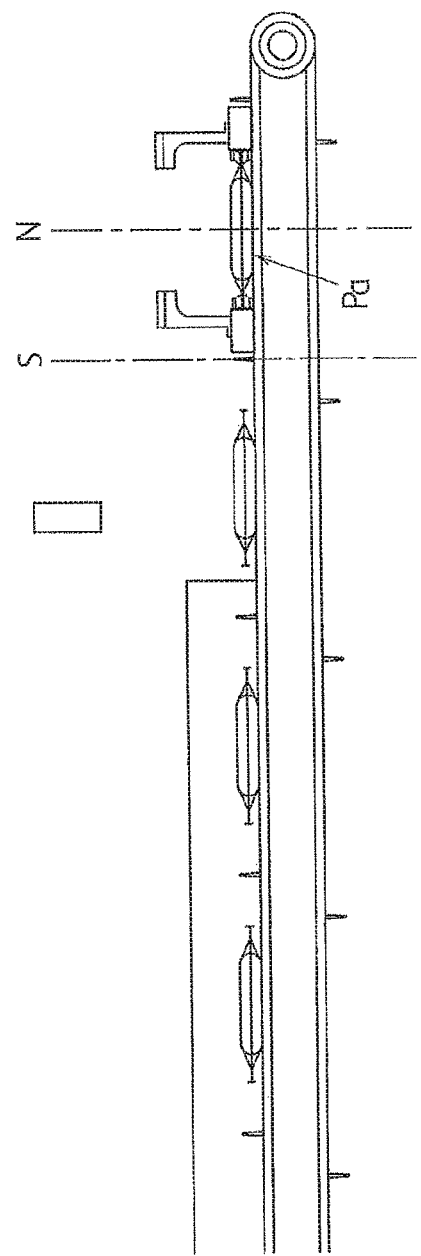
FIG. 13B is a side view showing an example of the operation of the bag moving means shown in FIG. 12 with time.

Next, with reference to FIGS. 12, 13A and 13B, a bag supply method and a bag supply apparatus according to another embodiment (continuous conveyance type) of the present invention will be described. In FIGS. 12, 13A and 13B, substantially the same parts as those in FIGS. 1-11 are given the same reference signs.

The supply apparatus 1A shown in FIGS. 12, 13A and 13B differs from the supply apparatus 1 shown in FIGS. 1 to 11 in that the belt conveyor 22 continuously conveys bags B at a constant speed. In order to deal with the continuous conveyance by the belt conveyor 22, in the supply apparatus 1A, the swing arms 36, 36 forming a pair can be independently moved perpendicularly to the reference plane N by different second servomotors 38, 38 respectively. Specifically, as shown in FIG. 12, two screw shafts 53 and 54 which are threaded in opposite directions are supported by the frame 44, the base portions of the swing arms 36 are screwed onto the screw shafts 53, 54, and pulleys 55, 56 are fixed to the ends of the respective screw shafts 53, 54. Similar to the pulley 46 of the supply apparatus 1, the pulleys 55, 56 are connected to the different second servomotors 38, 38 respectively via belts and drive pulleys (not illustrated). When the second servomotors 38, 38 are operated, the grip members 37 each move parallel to the conveyance path via the pulleys 55, 56, the screw shafts 53, 54 and the swing arms 36, 36.

When bags B are continuously conveyed by the belt conveyor 22, the postures of the bags B (in particular, the opening state of the bag mouth portions) are less likely to change during the conveyance compared to an intermittent conveyance, because the inertia force accompanying acceleration and deceleration of the belt conveyor 22 does not act on the bags B.

Subsequently, an example of the operation mode of the above-described supply apparatus 1A will be described with reference to FIGS. 12, 13A and 13B, focusing mainly on the difference from the supply apparatus 1.

(1) When the pair of swing arms 36, 36 reaches the lower swinging end, the grip members 37, 37 forming a pair are positioned on the upstream and downstream sides of a bag B on the belt conveyor 22 (see FIG. 13A). In this situation, the distance between the grip members 37, 37 forming a pair and the position of each grip member 37 in the conveyance direction of the belt conveyor 22 are set to, for example, a distance and a position which are previously set according to the nominal width of the bag B In this situation, the operation of the two second servomotors 38, 38 is controlled by the control apparatus 15 in such a manner that the distance between the grip members 37, 37 forming a pair and the position of each grip member 37, 37 are the above-described set distance and position.

(2) When the center of the detected bag width of a bag B on the belt conveyor 22 reaches a position (following start position) S which is set on the upstream side with respect to the reference plane N by a predetermined distance, the two second servomotors 38, 38 are operated in such a manner that the grip members 37 forming a pair move on the upstream side and the downstream side with respect to the bag B so as to follow the bag B being conveyed continuously and to gradually narrow the distance between each other. The timing at which the center of the detected bag width of the bag B reaches the above-described following start position S is calculated by the control apparatus 15 based on the position information of the center of the detected bag width of the bag B detected by the sensor 24 and the speed of the belt conveyor 22. Then, when the bag B reaches the takeoff position Pa on the conveyance path of the belt conveyor 22 and the center of the detected bag width of the bag B reaches the position of the reference plane N (see FIG. 13B), the movement of the pair of grip members 37, 37 is stopped. In this situation, the air cylinders 37b and 37b are simultaneously operated to close the grip portions 37a, 37a to grip the side edge portions Ba, Ba of the bag B.

When the center of the detected bag width of the bag B reaches the position of the reference plane N (when the pair of grip members 37, 37 stops), the centers of the pair of grip members 37, 37 are positioned on the reference plane N and the distance between the grip members 37, 37 forming a pair needs to be adjusted to a proper value appropriate to the detected bag width of the bag B. For this reason, based on the detected bag width of the bag B, the position information of the center thereof and the speed of the belt conveyor 22, the control apparatus 15 calculates: the movement speed of the grip members 37, 37 until the center of the detected bag width of the bag B reaches the position of the reference plane N (each grip members 37 stops) since the grip members 37, 37 forming a pair start to move so as to follow the bag B; and the positions of the grip members 37, 37 forming a pair when the center of the detected bag width of the bag reaches the position of the reference plane N (when each grip member 37 stops). The control apparatus 15 controls the two second servomotors 38, 38 based on the calculation result in such a manner that, when the center of the detected bag width of the bag B reaches the position of the reference plane N (when the grip members 37, 37 forming a pair stop), the center of the pair of grip members 37, 37 is positioned on the reference plane N and the distance between the grip members 37, 37 forming a pair is a proper value appropriate to the detected bag width of the bag B, as described above.

(3) When the pair of grip members 37, 37 reaches the takeoff position Pa, the reciprocating drive motor 42 is operated and the pair of swing arms 36, 36, which has been in the vertical attitude, starts to swing upward, and accordingly, the pair of grip members 37, 37 and the bag B move toward the delivery position Pb along the transfer path.

(4) The subsequent operation mode of the supply apparatus 1A is the same as that of the supply apparatus 1.

Next, another example of the operation mode of the above-described supply apparatus 1A will be described with reference to FIGS. 14A to 14C.

The operation mode of this example is different from that of the above-described examples in that, when the center of the detected bag width of a bag B on the belt conveyor 22 reaches the position of the reference plane N, the movement of the pair of grip members 37, 37 is not stopped. This operation mode is partially briefly explained below.

Figure 14A:
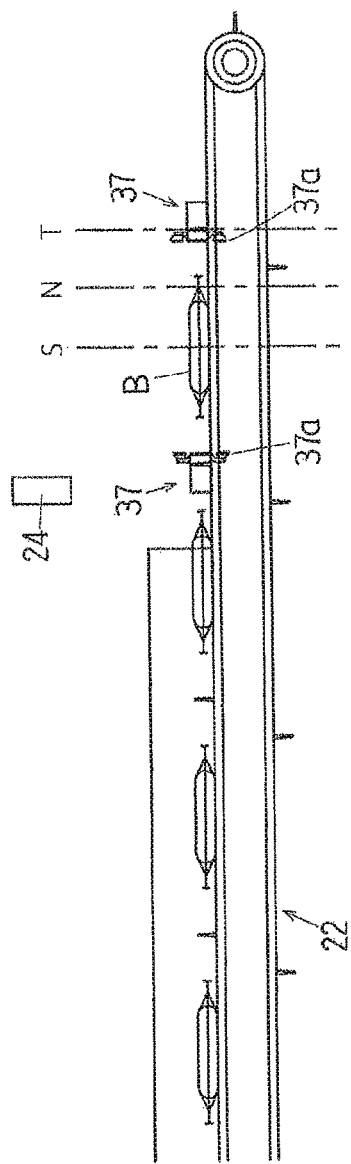
FIG. 14A is a side view showing another example of the operation of the bag moving means shown in FIG. 12 with time.
Figure 14B:
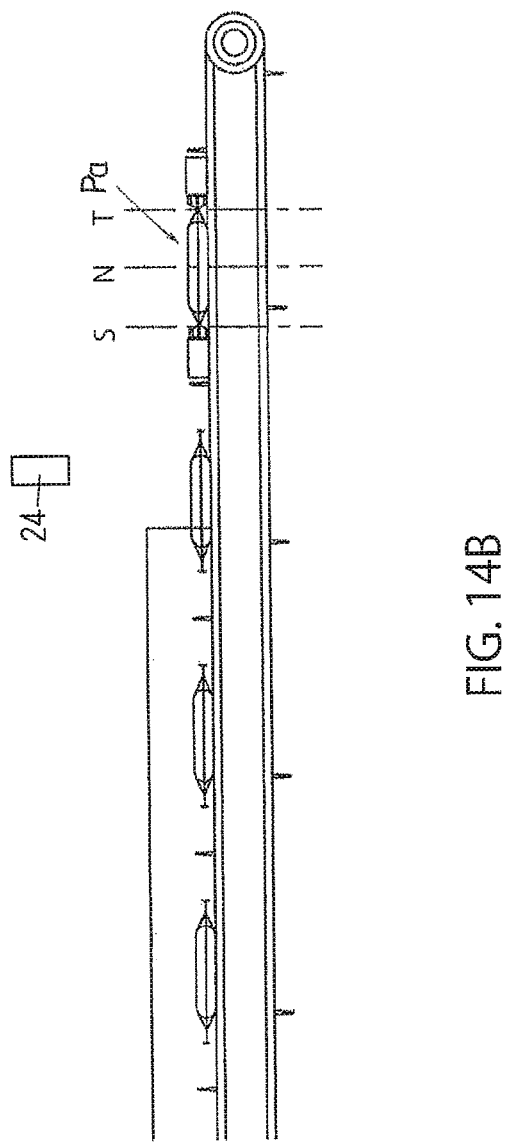
FIG. 14B is a side view showing another example of the operation of the bag moving means shown in FIG. 12 with time.
Figure 14C:
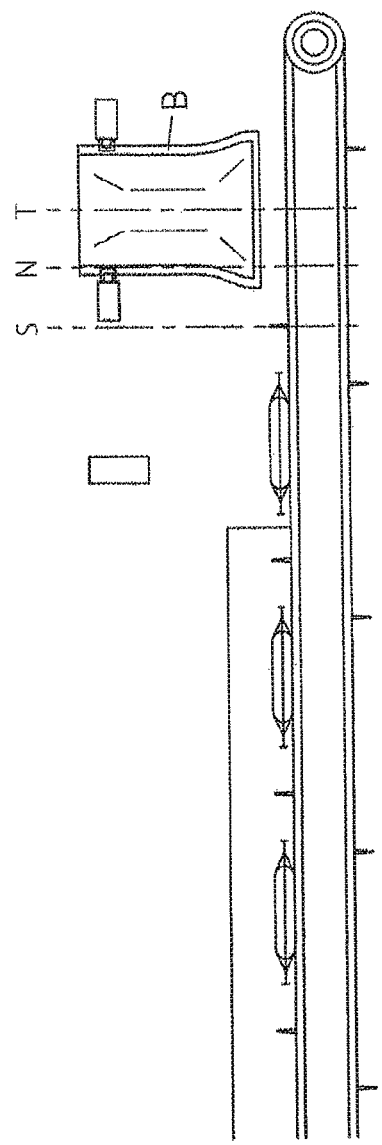
FIG. 14C is a side view showing another example of the operation of the bag moving means shown in FIG. 12 with time.

(1) When the pair of swing arms 36, 36 reaches the lower swing end, the grip members 37, 37 forming a pair are located on the upstream side and the downstream side with respect to a bag B on the belt conveyor 22 (see FIG. 14A).

(2) When the center of the detected bag width of a bag B on the belt conveyor 22 reaches the following start position S, the second servomotors 38 and 38 are operated in such a manner that the grip members 37 and 37 forming a pair move to follow the continuously conveyed bag B on the upstream side and the downstream side with respect to the bag B and the distance between the grip members 37 and 37 is gradually narrowed. Subsequently, when the center of the detected bag width of a bag B reaches the position of the reference plane N (see FIG. 14B), the air cylinders 37b, 37b are operated to close the grip portions 37a, 37a so as to grip the both side edge portions Ba, Ba of the bag B.

(3) When the grip members 37, 37 grip the side edge portions Ba, Ba of a bag B, the reciprocating drive motor 42 is operated and the pair of swing arms 36, 36, which has been in the vertical attitude, start to swing upward along the predetermined transfer path, and accordingly, the pair of grip members 37 move toward the delivery position Pb and the bag B is pulled out from the belt conveyor 22. On the other hand, the second servomotors 38, 38 continue to operate and the pair of grip members 37, 37 follows the bag B on the belt conveyor 22 and moves toward the downstream side at the same speed as the bag B while a constant distance between the grip members 37, 37 is maintained.

(4) When the center of the detected bag width of a bag B on the belt conveyor 22 reaches a position (following end position) T set on the downstream side with respect to the reference plane N by a predetermined distance, the center of the pair of grip members 37, 37 simultaneously reaches the position T (see FIG. 14C) and the second servomotors 38, 38 are stopped. In this situation, preferably, the bag B is completely pulled out of the belt conveyor 22.

According to this operation mode, the movement of the bag B and the movement of the pair of grip members 37, 37 along the conveyance path are performed at the same speed, and thus, when the bag B is pulled out from the belt conveyor 22, the bag B is saved from being dragged in the conveyance direction due to the friction force between the bag B and the belt conveyor 22. Thus, there is no concern that the bag B may be scratched or the bag B may be detached from the pair of grip members 37, 37.

[Example of Conveyance Unit of Continuous Conveyance Type]

Figure 15:
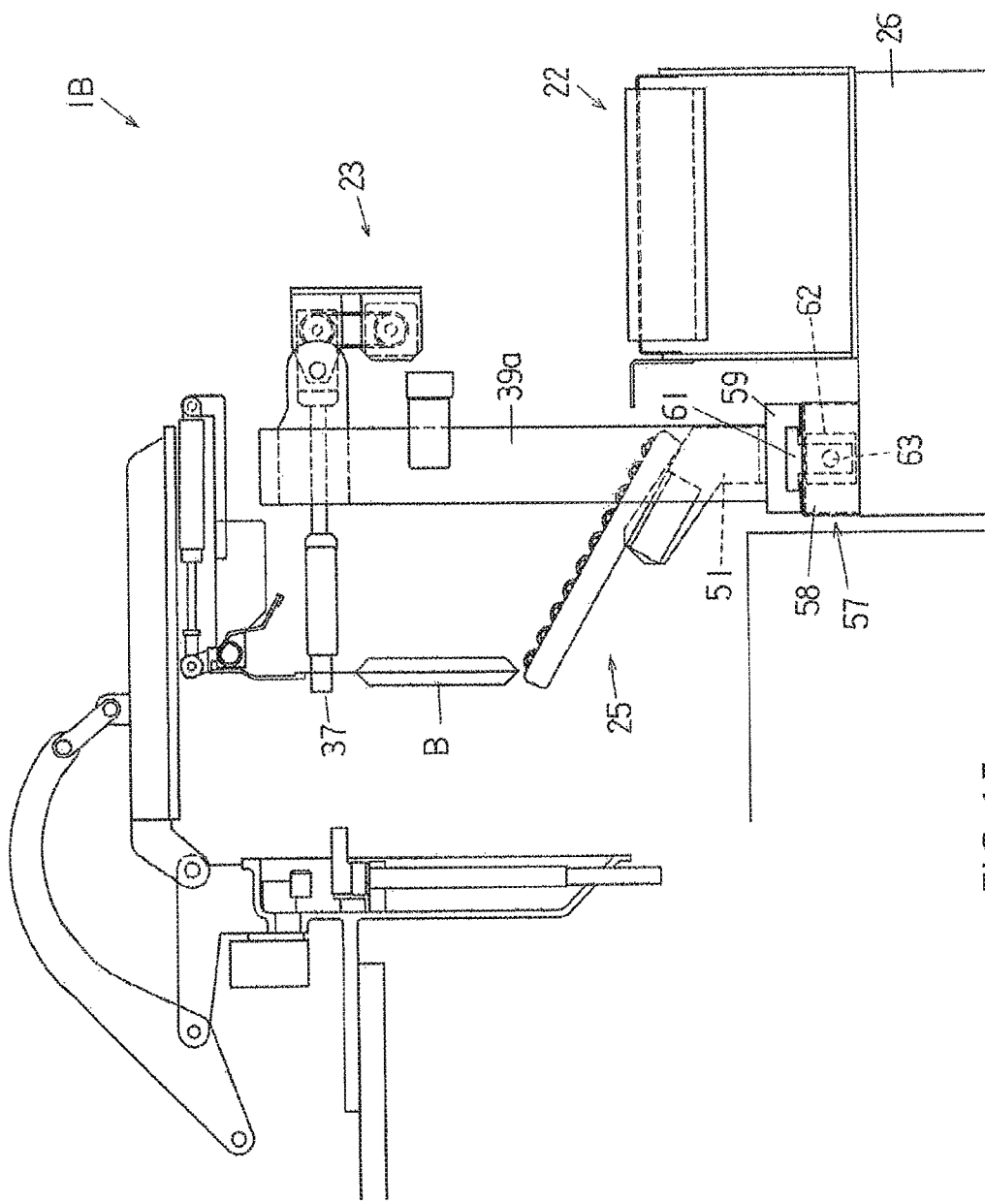
FIG. 15 is a side view of a supply apparatus according to yet another embodiment of the present invention.

Next, a bag supply method and a bag supply apparatus according to still another embodiment (continuous conveyance type) of the present invention will be described with reference to FIG. 15 (and FIGS. 14A to 14C). In FIG. 15, substantially the same parts as those in FIGS. 1 to 11 are given the same reference signs.

Like the supply apparatus 1A described above, the supply apparatus 1B shown in FIG. 15 differs from the supply apparatus 1 shown in FIGS. 1 to 11 in that the belt conveyor 22 continuously conveys bags B at a constant speed. In order to adapt to the continuous conveyance by the belt conveyor 22, in the supply apparatus 1B, the bag transfer unit 23 and the bag guide unit 25 are installed on a following movement mechanism 57 and can be reciprocated along the conveyance path of the belt conveyor 22.

As shown in FIG. 15, the following movement mechanism 57 includes: a box 58 fixed on the table 26; a movable body 59 which is movably installed along the upper surface of the box 58; a screw member 61 which is fixed to the lower part of the movable body 59 and is disposed in the box 58; and a third servomotor 62 fixed in the box 58. The legs 39a of the stand 39 of the bag transfer unit 23 and the support stand 51 of the bag guide unit 25 are fixed onto the movable body 59.

The third servomotor 62 has a rotation shaft 63 disposed in the box 58, a screw portion is formed on the rotation shaft 63, and the screw portion is screwed to a female screw formed on the screw member 61. When the third servomotor 62 is operated to rotate the rotation shaft 63, the bag transfer unit 23 and the bag guide unit 25 move along the conveyance path (in a direction parallel to the conveyance path). In addition, in the supply apparatus 1B, the bag transfer unit 23 and the bag guide unit 25 are substantially the same as those of the supply apparatus 1.

The above-described supply apparatus 1B can have a similar operation mode to that of the supply apparatus 1A (see FIGS. 13A to 13B and 14A to 14C). An example of the operation mode of the supply apparatus 1B will be described with reference to FIG. 15 (and FIG. 14A to 14C) below.

(1) When the pair of swing arms 36, 36 reaches the lower swing end, the bag transfer unit 23 is arranged at a predetermined position (forward movement start position) along the conveyance direction of the belt conveyor 22 and the grip members 37, 37 are located on the upstream side and the downstream side with respect to a bag B on the belt conveyor 22 (see FIG. 14A). In this situation, the distance between the grip members 37, 37 forming a pair and the position of each grip member 37 (the position of the bag transfer unit 23) are set to, for example, a distance and a position previously determined according to the nominal width of the bag B. The control apparatus 15 controls the operation of the second servomotor 38 and the third servomotor 62 so that the distance and positions of the pair of grip members 37, 37 in this situation are the determined distance and positions.

(2) When the center of the detected bag width of a bag B on the belt conveyor 22 reaches the following start position S, the second servomotor 38 and the third servomotor 62 are operated in such a manner that the grip members 37, 37 forming a pair move parallel to the conveyance path to follow the bag B being conveyed continuously on the upstream side and the downstream side with respect to the bag B and the distance between the grip members 37, 37 is gradually narrowed. Subsequently, when the center of the detected bag width of the bag B reaches the position of the reference plane N (see FIG. 14B), the air cylinders 37b, 37b are operated to close the grip portions 37a, 37a so as to grip the both side edge portions Ba, Ba of the bag B and simultaneously the second servomotor 38 is stopped. In this situation, the center of the grip members 37, 37 forming a pair is also required to be positioned on the reference plane N, and the distance between the grip members 37, 37 forming a pair is required to be a proper value appropriate to the detected bag width of the bag B.

(3) When the grip members 37, 37 grip the both the side edge portions Ba, Ba of a bag B, the reciprocating drive motor 42 is operated and the pair of swing arms 36, 36, which has been in the vertical attitude, starts to swing upward along the predetermined transfer path, and accordingly, the pair of grip members 37, 37 moves toward the delivery position Pb and the bag B is pulled out from the belt conveyor 22. On the other hand, the third servomotor 62 continues to operate, and the pair of grip members 37, 37 follows the bag B on the belt conveyor 22 and moves toward the downstream side at the same speed as the bag B while gripping the both side edge portions Ba, Ba of the bag B.

(4) When the center of the detected bag width of a bag B on the belt conveyor 22 reaches a position (following end position) T set on the downstream side with respect to the reference plane N by a predetermined distance, the center of the pair of grip members 37, 37 simultaneously reaches the position T (see FIG. 14C), and the third servomotor 62 is halted to stop the movement of the bag transfer unit 23 (the pair of grip members 37, 37). In this situation, preferably, the bag B is completely pulled out of the belt conveyor 22.

[Example in which the Bag Transfer Unit has a Function of Adjusting the Alignment Direction of a Pair of Grip Members]

Figure 16:
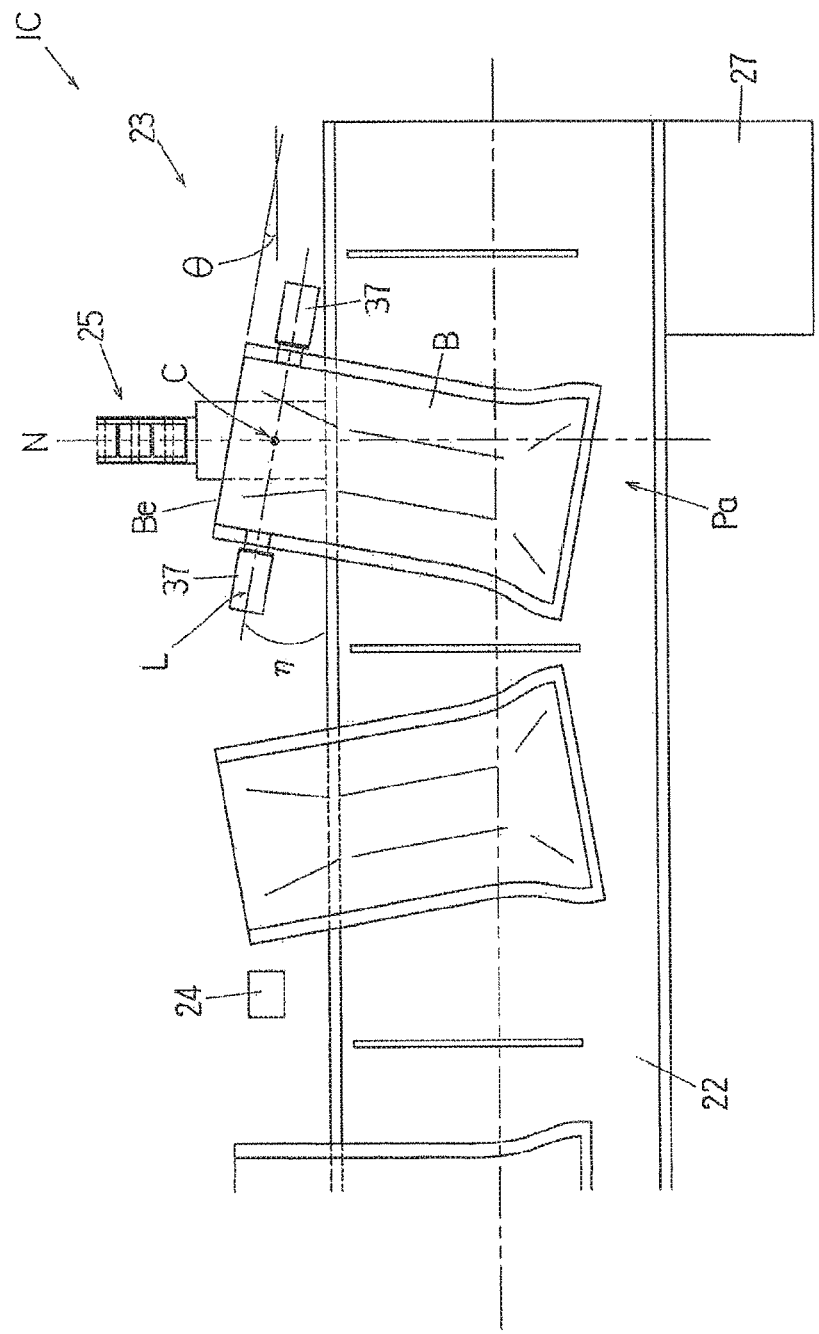
FIG. 16 is a top view for explaining angle adjustment of a pair of grip members of a supply apparatus according to yet another embodiment of the present invention.

Desirably, the width direction of a bag B (the direction along the bag mouth edge Be) placed on the conveyance unit (the belt conveyor 22) is parallel to the conveyance path of the belt conveyor 22, but in some cases, the width direction might be inclined (inclination angle θ) with respect to the conveyance path as shown in FIG. 16. Therefore, when the left and right side edge portions Ba, Ba of a bag B having the inclination angle θ are gripped by the pair of grip members 37, 37 (the grip members 37, 37 of the bag transfer unit 23 in the supply apparatuses 1, 1A, 1B shown in FIGS. 1 to 15) having the alignment direction being parallel to the conveyance path, a vertical gap occurs between the grip positions on the left and right (the distances from the bag mouth edge Be to the grip positions on the left and right are different from each other). Therefore, when the grip members 37, 37 forming a pair and the bag B reach the delivery position Pb (see FIG. 10) along the transfer path and the bag B is changed to the vertical attitude, the bag mouth edge Be of the bag B is inclined to the horizontal surface (inclination angle θ). Even when the bag B is gripped by a gripper 8 of the vacuum package machine 2 via the delivery device 16, the bag mouth edge Be of the bag B remains inclined with respect to the horizontal plane, and since the seal of the bag mouth is performed in a vacuum chamber 4 in that state, the seal of the bag mouth portion becomes an inclined seal and when the inclination angle is large, the appearance of the bag may be marred and the seal strength may be reduced.

Next, a bag supply method and a bag supply apparatus according to still another embodiment (an example of an intermittent conveyance type in which the bag transfer unit has a function of adjusting the alignment direction of the pair of grip members) of the present invention will be described with reference to FIGS. 16 to 19C.

Figure 17:
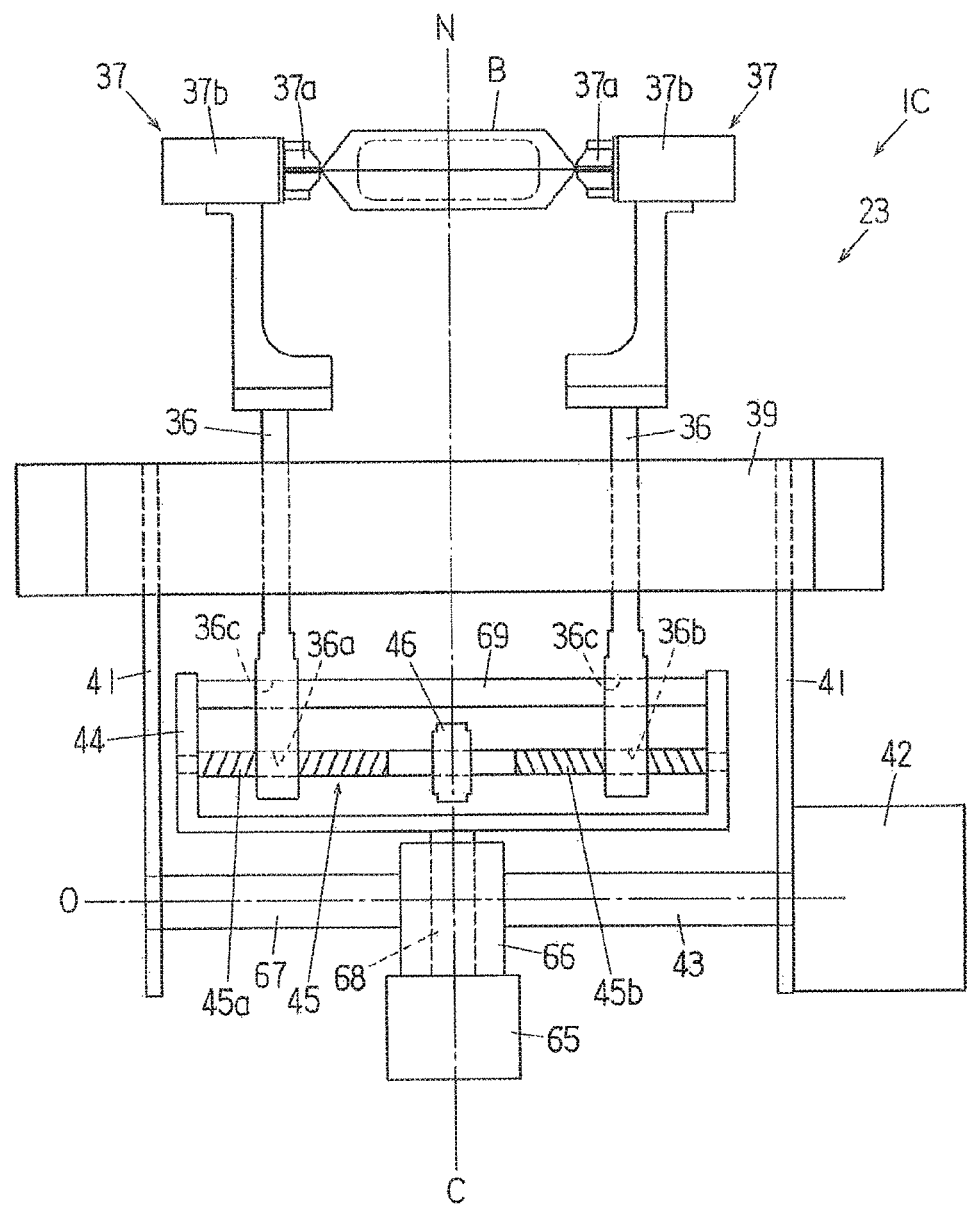
FIG. 17 is a top view of a bag moving means of the supply apparatus shown in FIG. 16.

According to the supply apparatus 1C shown in FIGS. 16 and 17, even when the width direction of a bag B placed on the belt conveyor 22 (the direction along the bag mouth edge Be) is inclined with respect to the conveyance path of the belt conveyor 22, the side edge portions Ba, Ba of the bag B which has reached the takeoff position Pa can be properly held by the grip members 37, 37 forming a pair, and the bag mouth edge Be of the bag B which has been moved to the delivery position Pb and has been changed to be in the vertical attitude can be made substantially horizontal. In FIGS. 16-19C, substantially the same parts as those in FIGS. 1 to 11 are given the same reference signs.

The supply apparatus 1C is different from the supply apparatus 1 shown in FIGS. 1 to 11 mainly in the following four points, and is substantially the same in other points.

(1) In the bag transfer unit 23, the grip members 37, 37 forming a pair are supported so as to be able to swing about the axis C located on the reference plane N.

(2) In the bag transfer unit 23, the fourth servomotor 65 is installed as a drive source for swinging the grip members 37, 37 forming a pair about the axis C.

(3) The sensor 24 measures the inclination angle of a bag B on the belt conveyor 22 (the inclination angle θ of the bag mouth edge Be with respect to the conveyance path).

(4) The control apparatus 15 controls a fourth servomotor 65 described later based on the inclination angle θ detected by the sensor 24 so as to swing the grip members 37, 37 forming a pair about the axis C to adjust the alignment direction of the grip members 37, 37 forming a pair, whereby the grip positions of the both side edge portions Ba, Ba are made appropriate.

The specific structure of the bag transfer unit 23 in the supply apparatus 1C (see FIG. 17) will be described: the gate-type stand 39 is installed on the table 26 (see FIG. 5), the reciprocating drive motor 42 is fixed to one of brackets 41, 41 which form a pair and are installed on the stand 39, and one side of the hold member 66 is fixed to the leading end of the rotation shaft 43 (the center is the axis O) of the reciprocating drive motor 42. One end of a support shaft 67, which is coaxial with the rotation shaft 43, is rotatably supported by the other of the brackets 41, 41 forming a pair, and the other side of the hold member 66 is fixed to the other end of the support shaft 67. The fourth servomotor 65 is fixed to the hold member 66, and its rotation shaft 68 (the center is axis C) penetrates the center of the hold member 66, and its tip is fixed to the frame 44. The axis C is located on the reference plane N, is orthogonal to the axis O, is perpendicular to the holding surfaces of the grip members 37 (the grip portions 37a), and penetrates through the center of the grip members 37, 37 forming a pair.

Both ends of the screw shaft 45 are rotatably supported by the frame 44, and both ends of the support shaft 69 are fixed to the frame 44. The screw shaft 45 has screw portions 45a, 45b which are threaded in opposite directions to each other on the left and right, and a pulley 46 is fixed to a central portion of the screw shaft 45. Like the supply apparatus 1 shown in FIGS. 1 to 11, the second servomotor 38 (see FIG. 5) is installed on the frame 44, and when the second servomotor 38 rotates, its driving force is transmitted to the pulley 46 to rotate the screw shaft 45.

Each swing arm 36 has: a female screw portion 36a (36b) screwed to the screw portion 45a (45b) of the screw shaft 45 at its base; and a hole 36c through which the support shaft 69 penetrates, and the grip members 37 are installed at the tip portions of the respective swing arms 36. The support shaft 69 has a function of preventing co-rotation of the swing arms 36 caused by the rotation of the screw shaft 45. Each grip member 37 includes a double-opening type grip portion 37a and an air cylinder 37b which opens and closes the grip portion 37a.

When the second servomotor 38 (see FIG. 5) is operated, the screw shaft 45 is rotated and the swing arms 36, 36 forming a pair approach or go away from each other, and accordingly the grip members 37, 37 forming a pair approach or go away from each other with the reference plane N interposed therebetween (the interval between the grip members 37, 37 forming a pair is narrowed or enlarged).

The rotation shaft 43 is reciprocally rotated by the reciprocating drive motor 42 within an angle range of 90°. Accordingly, similarly to the supply apparatus 1 shown in FIGS. 1 to 11, the pair of swing arms 36, 36 swings about the axis O within an angle range of 90° between the vertical attitude and the horizontal attitude, and the grip members 37, 37 installed at the tip of the respective swing arms 36, 36 also swing about the axis O within an angle range of 90° between the takeoff position Pa and the delivery position Pb.

When the fourth servomotor 65 is operated, the rotation shaft 68 and the frame 44 are rotated, and accordingly the grip members 37, 37 forming a pair swing about the axis C by a predetermined angle and thereby the alignment direction of the pair of grip members is adjusted.

The sensor 24 has a function of determining the bag width (the detected bag width), in the vicinity of the bag mouth portion of a bag B conveyed by the belt conveyor 22, in a direction parallel to the conveyance direction and the position information of its center, and also has a function of determining the inclination angle of a bag B (the inclination angle θ of the bag mouth edge Be with respect to the conveyance path).

Like the supply apparatus 1 shown in FIGS. 1 to 11, the control apparatus 15 (see FIG. 1) controls the first servomotor 27 based on the position information of the center of the detected bag width of a bag B so as to adjust the intermittent conveyance distance, so that the center of the detected bag width of a bag B stopped at the takeoff position Pa is positioned on the reference plane N. In addition, the control apparatus 15 calculates the bag width of a bag B in the width direction (the direction parallel to the bag mouth edge Be) based on the inclination angle θ and the detected width of the bag B determined by the sensor 24 (the bag width in the width direction can be approximately calculated according to "D×cos θ" in which "D" represents the detected bag width), and controls the second servomotor 38 according to the calculated bag width so as to adjust the distance between the grip members 37, 37.

Furthermore, the control apparatus 15 controls the fourth servomotor 65 based on the inclination angle θ to swing the grip members 37, 37 forming a pair about the axis C from the reference positions by an angle η (=θ) so that the alignment direction of the grip members 37, 37 forming a pair is adjusted. Thus, when the swing arms 36, 36 are in the vertical attitude and the grip members 37, 37 forming a pair come to the takeoff position Pa, the alignment direction of the grip members 37, 37 forming a pair (see the line L connecting the grip portions 37a of the grip members 37, 37 with each other) is inclined with respect to the conveyance path in the horizontal plane and the inclination angle is η as shown in FIG. 16. The reference positions mean the positions of the grip members 37, 37 forming a pair when the alignment direction of the grip members 37, 37 forming a pair is parallel to the conveyance path (η=0).

When η=θ, the line L (the alignment direction of the grip members 37, 37 forming a pair) and the bag mouth edge Be of the bag B are parallel to each other at the takeoff position Pa. Therefore, when the grip members 37, 37 forming a pair grip the both side edge portions Ba, Ba of the bag B at the takeoff position Pa, the grip places can be matched each other (the distances from the bag mouth edge Be to the grip positions are the same as each other on the left and right), as clearly shown in FIG. 16.

Subsequently, while the grip members 37, 37 forming a pair move on the transfer path toward the delivery position Pb (see FIG. 10) or after the grip members 37, 37 forming a pair reach the delivery position Pb, the fourth servomotor 65 is operated in reverse and the grip members 37, 37 forming a pair is pivoted about the axis C in the reverse direction by an angle η (=θ) to return to the reference positions. As a result, in the delivery position Pb, the bag mouth edge Be of the bag B of which the both side edge portions Ba, Ba are held by the grip members 37, 37 forming a pair can be made horizontal.

An example of the reciprocal swinging of the pair of grip members 37, 37 about the axis C on the transfer path caused by the operation of the fourth servomotor 65 will be explained in detail in a time series manner with reference to FIGS. 18A to 19C. FIGS. 18A to 19C are simplified views and a part of the illustration is omitted.

Figure 18A:
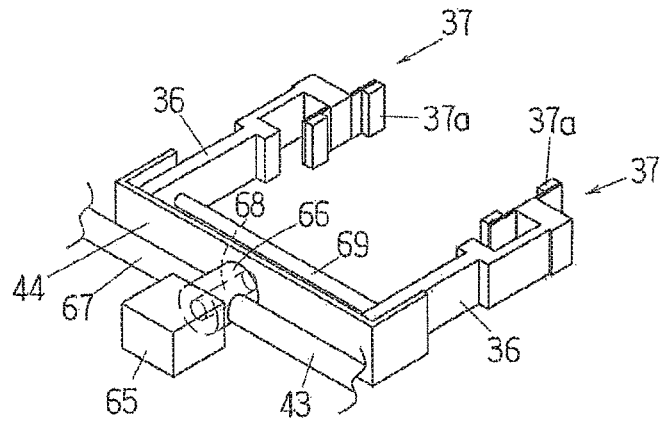
FIG. 18A is a diagram showing, in a time series manner, the angle adjustment of a pair of grip members performed on a conveyance path in the bag moving means of the supply apparatus shown in FIG. 16.

(1) FIG. 18A shows a state of the grip members 37, 37 when the grip members 37, 37 open at the end point (delivery position Pb) on the transfer path and a bag B is released. At this time, the grip members 37 are located at the reference positions. Subsequently, the distance between the pair of grip members 37 is adjusted in accordance with the detected bag width of a bag B detected by the sensor 24 (the bag width measured in the direction parallel to the conveyance path).

Figure 18B:
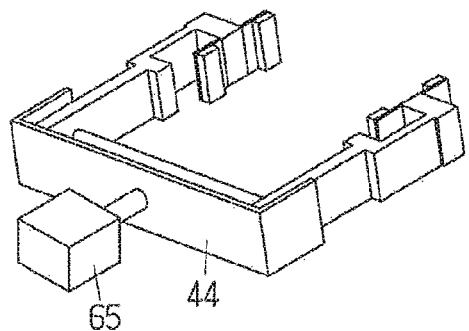
FIG. 18B is a diagram showing, in a time series manner, the angle adjustment of a pair of grip members performed on a conveyance path in the bag moving means of the supply apparatus shown in FIG. 16.

(2) FIG. 18B shows a state in which the fourth servomotor 65 operates according to the inclination angle (θ) of a bag detected by the sensor 24 and the grip members 37, 37 forming a pair swing about the axis C from the reference positions by a predetermined angle (η=θ), along with the frame 44 and the swing arms 36, 36.

Figure 18C:
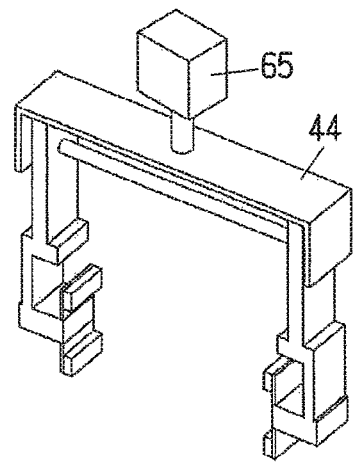
FIG. 18C is a diagram showing, in a time series manner, the angle adjustment of a pair of grip members performed on a conveyance path in the bag moving means of the supply apparatus shown in FIG. 16.

(3) FIG. 18C shows a state of the pair of grip members 37, 37 when the reciprocating drive motor 42 operates to cause the pair of swing arms 36, 36 swings from the horizontal attitude to the vertical attitude and the grip members 37, 37 forming a pair reaches the lower takeoff position Pa. The grip members 37, 37 forming a pair are inclined at an angle η (η=θ) with respect to the conveyance path. At this point, a bag B has stopped at the takeoff position Pa. In this example, the swinging of the pair of grip members 37, 37 with an angle of η is performed at the delivery position Pb, but this swinging may be performed on the transfer path before the pair of grip members 37, 37 reaches the takeoff position Pa or after the pair of grip members 37, 37 reaches the takeoff position Pa.

Figure 19A:
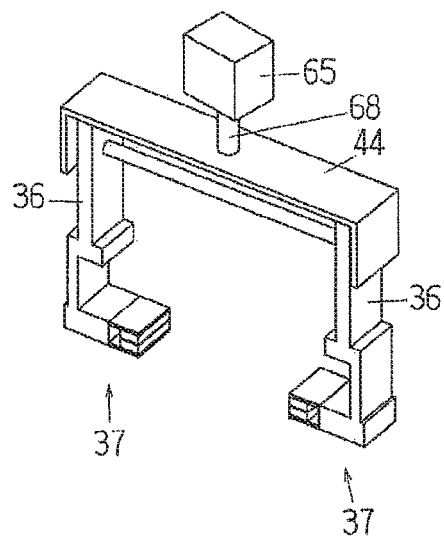
FIG. 19A is a diagram showing, in a time series manner, the angle adjustment of a pair of grip members performed on a conveyance path in the bag moving means of the supply apparatus shown in FIG. 16.

(4) FIG. 19A shows a state of the pair of grip members 37, 37 when the grip members 37, 37 forming a pair are closed at the takeoff position Pa to hold the both side edge portions Ba, Ba of a bag B (not shown). The alignment direction of the grip members 37 forming a pair is inclined at an angle η (=θ) with respect to the conveyance path in the horizontal plane (see FIG. 16). The interval between the grip members 37, 37 forming a pair is adjusted in accordance with the bag width of a bag B in the width direction (the direction parallel to the bag mouth edge Be) before the grip members 37, 37 forming a pair are closed and hold the both side edge portions Ba, Ba of the bag B.

Figure 19B:
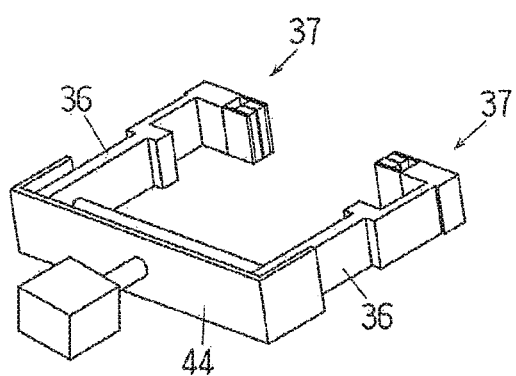
FIG. 19B is a diagram showing, in a time series manner, the angle adjustment of a pair of grip members performed on a conveyance path in the bag moving means of the supply apparatus shown in FIG. 16.

(5) FIG. 19B shows a state of the pair of grip members 37, 37 when the reciprocating drive motor 42 is operated in such a manner that the pair of swing arms 36, 36 swings from the vertical attitude to the horizontal attitude and the pair of grip members 37, 37 reaches the upper delivery position Pb (see FIG. 10). At this point, the pair of grip members 37, 37 retains a state in which the pair of grip members 37, 37 has swung by a predetermined angle η (η=θ).

Figure 19C:
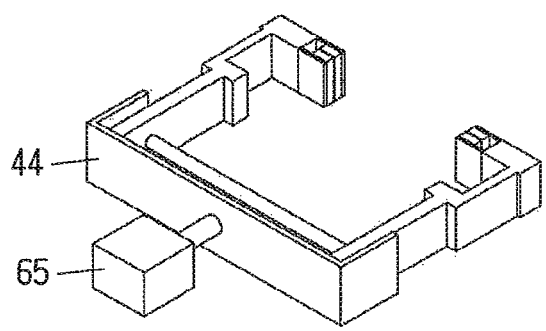
FIG. 19C is a diagram showing, in a time series manner, the angle adjustment of a pair of grip members performed on a conveyance path in the bag moving means of the supply apparatus shown in FIG. 16.

(6) FIG. 19C shows a state in which the fourth servomotor 65 is operated in reverse in such a manner that the pair of grip members 37, 37 swings in reverse about the axis C by a predetermined angle (η) along with the frame 44 and the swing arms 36, 36 and returns to the reference positions. At this point, the bag mouth edge Be of a bag B (not shown) whose both side edge portions are held by the pair of grip members 37, 37 becomes horizontal. In this example, the swinging of the pair of grip members 37, 37 in the reverse direction is performed at the delivery position Pb, but this swinging may be performed on the transfer path before the pair of grip members 37, 37 reaches the delivery position Pb or after the pair of grip members 37, 37 reaches the delivery position Pb.

[Another Example in which the Bag Transfer Unit has a Function of Adjusting the Alignment Direction of the Pair of Grip Members]

Preferably, a bag B placed on the conveyance unit (belt conveyor 22) is located at a fixed position (hereinafter referred to as a longitudinal reference position) in the perpendicular direction with respect to the conveyance path of the belt conveyor 22. In a case where the position at which a bag B is placed is deviated from the longitudinal reference position in the perpendicular direction with respect to the conveyance path, when the pair of grip members 37 grip the both side edge portions Ba, Ba of the bag B at the takeoff position, the grip positions are deviated from the proper positions in the longitudinal direction of the bag B (the perpendicular direction with respect to the bag mouth edge Be). The deviation of the grip positions also exerts influence from the pair of grip members 37 and 37 to a gripper 8 of the vacuum package machine 2 via the delivery device 16. Then, since the seal of the bag mouth portion is performed as it is in a vacuum chamber 4, the seal position of the bag mouth portion deviates from a proper position, and when the deviation amount is large, the appearance of the bag is impaired and the seal strength may be reduced.

Next, a bag supply method and a bag supply apparatus according to still another embodiment (an example of an intermittent conveyance type in which the bag transfer unit has a function of adjusting the alignment direction of the pair of grip members) of the present invention will be described with reference to FIGS. 20 to 26.

Figure 20:
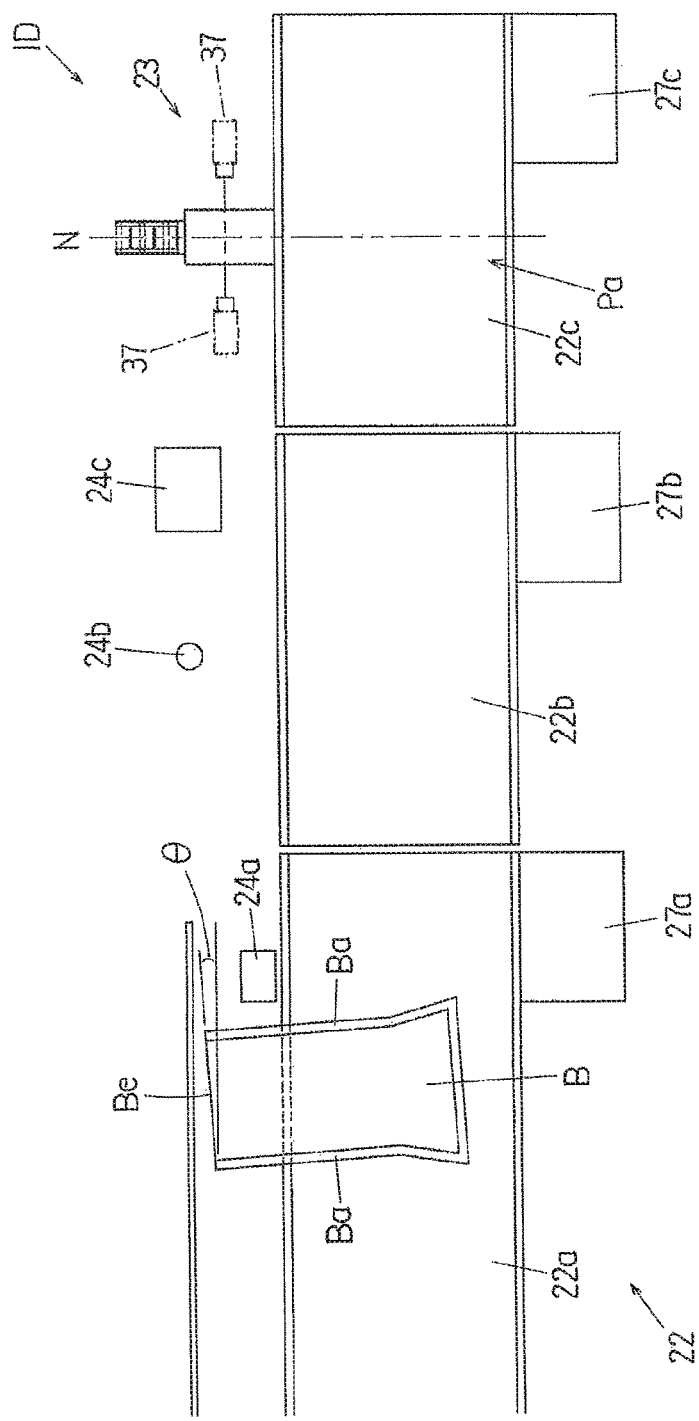
FIG. 20 is a top view for explaining the position adjustment and the angle adjustment of a bag on a conveyance path in a supply apparatus according to yet another embodiment of the present invention.

Like the supply apparatus 1C, the supply apparatus 1D shown in FIG. 20 has a function of adjusting the alignment direction of the pair of grip members 37, 37. Further, even when the position of a bag B placed on the belt conveyor 22 is deviated from the longitudinal reference position in the perpendicular direction with respect to the conveyance path, the supply apparatus 1D corrects the deviation on the belt conveyor 22, and the proper positions of the both side edge portions Ba, Ba of the bag B having reached the takeoff position Pa can be held by the grip members 37, 37 forming a pair.

In the supply apparatus 1D, the bag transfer unit 23 is the same as that of the supply apparatus 1C. The supply apparatus 1D is different from the supply apparatus 1C mainly in the following three points, and is substantially the same as the supply apparatus 1C in other points.

(1) The belt conveyor 22 comprises three sub conveyors 22a, 22b and 22c arranged in series from the upstream side to the downstream side of the conveyance path. The sub conveyors 22a, 22b, 22c are all of the intermittent conveyance type, and are provided with servomotors 27a, 27b, 27c as drive sources, respectively. The sub conveyor 22b can be moved in a direction perpendicular to the conveyance path in the horizontal plane by operating the servomotor 71 (see FIG. 26).

(2) Three sensors 24a, 24b, 24c are disposed, from the upstream side to the downstream side, along the conveyance path of the belt conveyor 22 (22a, 22b, 22c). The sensor 24a detects the bag width in the vicinity of the bag mouth portion of a bag B on the sub conveyor 22a (the bag width measured in a direction parallel to the conveyance path (=detected bag width)) and the position information of its center. The sensor 24b detects the position information of the bag mouth edge Be of a bag B on the sub conveyor 22b (the deviation amount from the longitudinal reference position). The sensor 24c detects the inclination angle of a bag B on the sub conveyor 22b (the inclination angle θ of the bag mouth edge Be with respect to the conveyance path).

(3) The control apparatus 15 controls the servomotor 71 based on the detection result of the sensor 24b to move the sub conveyor 22b in a direction perpendicular to the conveyance path so as to correct the deviation amount (the position of the bag B is move to the longitudinal reference position).

Figure 26:
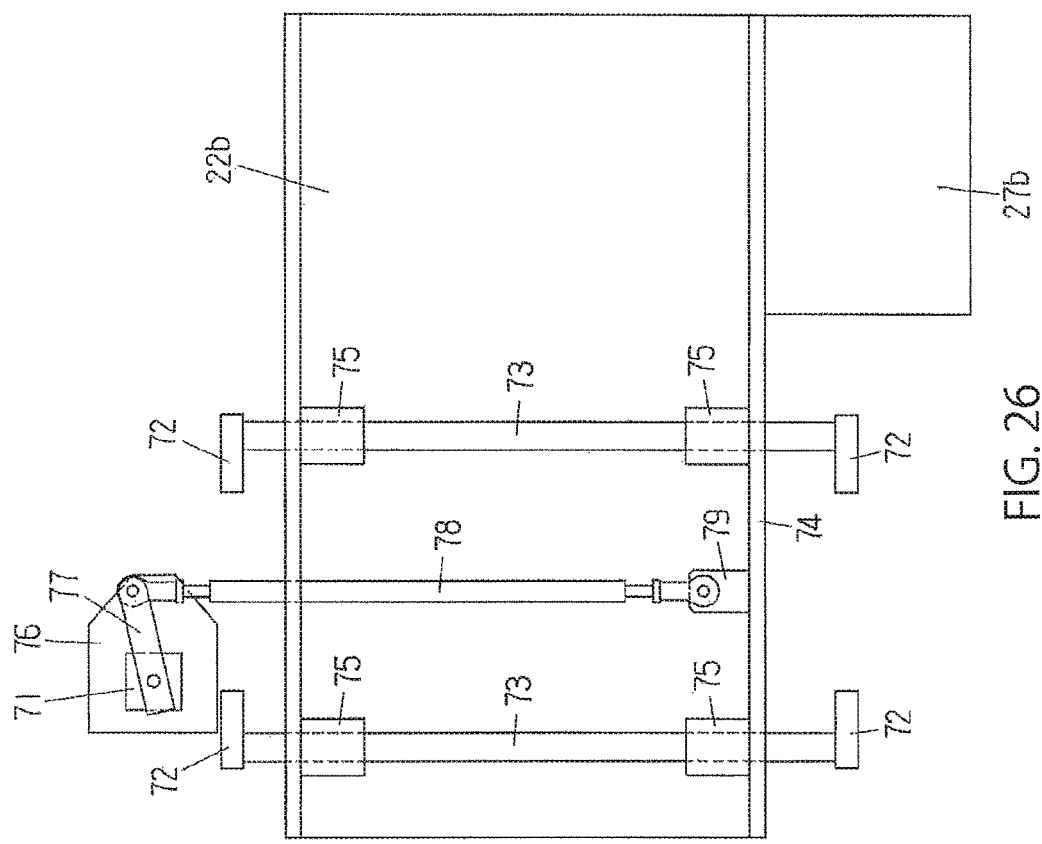
FIG. 26 is a diagram showing an operation mechanism of one belt conveyor which is included in the conveyance means of the supply apparatus shown in FIG. 20.

The specific structure of the sub conveyor 22b will be described with reference to FIG. 26. Two pairs of stands 72, 72 are installed on the table 26 (see FIG. 2) of the supply apparatus 1D, and the stands 72, 72 forming each pair are fixed to the both ends of a guide member 73. Each guide member 73 is in the horizontal plane, and the longitudinal direction of each guide member 73 is perpendicular to the conveyance path of the sub conveyor 22b. Four slide blocks 75 are fixed to frames 74 of the sub conveyor 22b, and two slide blocks 75 are slidably fitted to each guide members 73. Further, the servomotor 71 is installed on a stand 76 on the table 26, one end of a lever 77 is fixed to its rotation shaft, and the other end of the lever 77 is connected to one end of a connecting rod 78. A block 79 is fixed to one frame 74 and the other end of the connecting rod 78 is connected to the block 79.

When the servomotor 71 is activated, the lever 77 is rotated, and the frame 74 (the sub conveyor 22b) moves in the axial direction of the guide member 73 (the direction perpendicular to the conveyance path) via the connecting rod 78.

An example of the operation of the supply apparatus 1D will be explained in detail in a time series manner with reference to FIGS. 20 to 25 below.

(1) In FIG. 20, the belt conveyor 22 (22a, 22b, 22c) is operated and a bag B is conveyed by the sub conveyor 22a. The bag B is inclined with respect to the conveyance path of the belt conveyor 22, and the position of the bag B in the perpendicular direction with respect to the conveyance path is offset from the longitudinal reference position.

Figure 21:
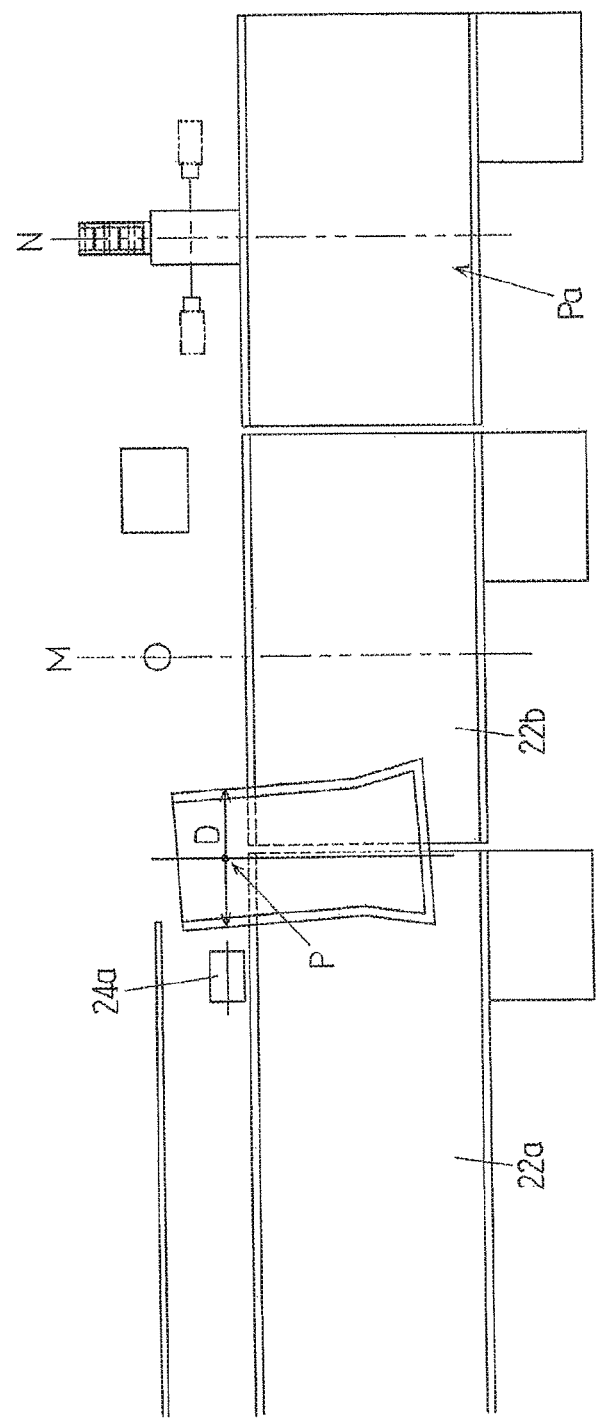
FIG. 21 is a diagram showing, in a time series manner, the position adjustment and the angle adjustment of a bag on the conveyance path in the supply apparatus shown in FIG. 20.

(2) As shown in FIG. 21, regarding the bag B on the sub conveyor 22a, the bag width in a direction parallel to the conveyance path detected bag width D) and the position information of the center thereof are detected by the sensor 24a. Subsequently, the bag B transfers onto the sub conveyor 22b.

(3) The stop position one position before the last stop position (the bag takeoff position Pa) for a bag B is set on the sub conveyor 22b, and one vertical plane parallel to the reference plane N is set as the reference plane M at the stop position. The control apparatus 15 controls the servomotor 27b to adjust the intermittent conveyance distance of the sub conveyor 22b based on the position information of the center P of the detected bag width D of the bag B, and when the sub conveyor 22b stops next, the center P of the bag B which stops at the stop position on the sub conveyor 22b is positioned on the reference plane M (see FIG. 22). In other words, when the center P of the detected bag width D of the bag B is positioned on the reference plane M, the sub conveyor 22b is stopped.

Figure 22:
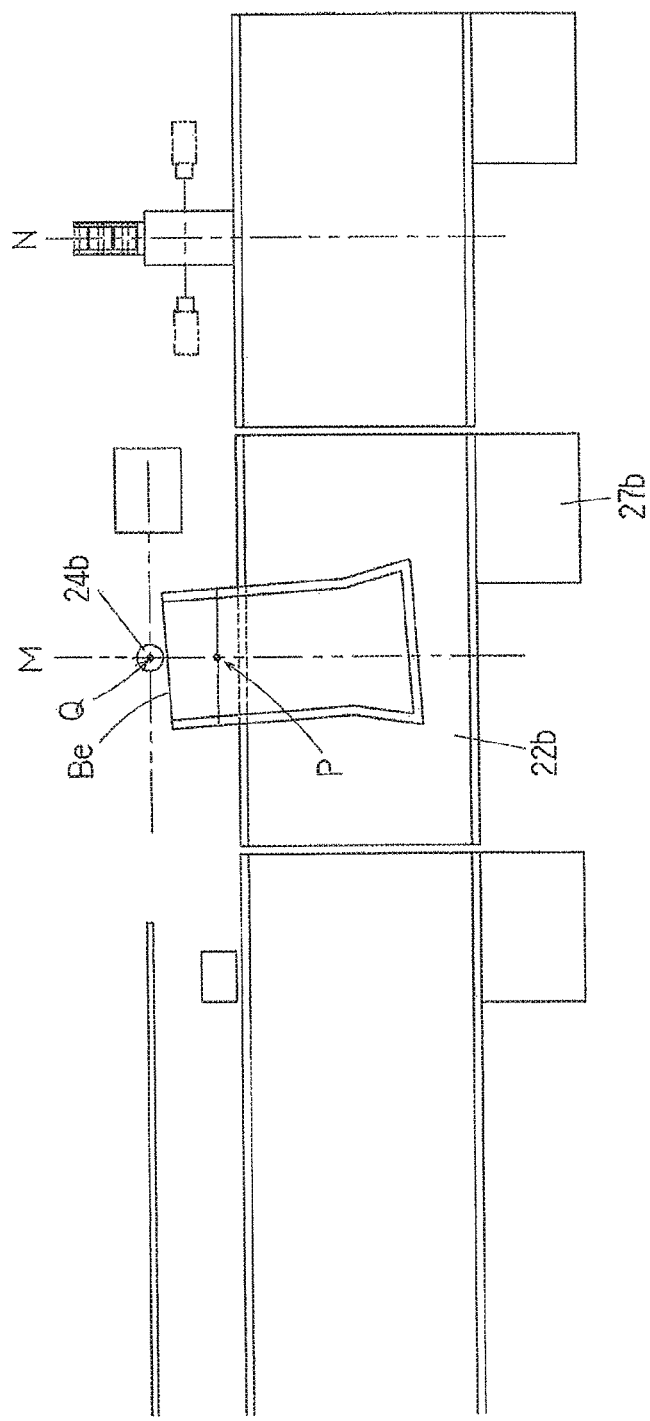
FIG. 22 is a diagram showing, in a time series manner, the position adjustment and the angle adjustment of a bag on the conveyance path in the supply apparatus shown in FIG. 20.

(4) The sensor 24b detects a bag surface of the bag B (including the bag mouth edge Be) at a specific position Q on the reference plane M, and the control apparatus 15 controls the operation of the servomotor 71 based on the detection result. Specifically, when the bag B is stopped at the stop position on the sub conveyor 22b and when the sensor 24b detects the bag mouth edge Be at the specific position Q, the control apparatus 15 determines that the bag B is positioned on the longitudinal reference position and controls the servomotor 71 to not operate. In other cases, the control apparatus 15 determines that the bag B is deviated from the longitudinal reference position and operates the servomotor 71 to move the sub conveyor 22b perpendicularly to the conveyance direction, and when the sensor 24b detects the bag mouth edge Be at the specific position (when the bag B reaches the longitudinal reference position), the servomotor 71 is stopped. In the example of FIG. 22, the sensor 24b does not detect the bag surface at all at the specific position Q. In this case, the control apparatus 15 determines that the bag B is deviated to the bag bottom side from the longitudinal reference position and moves the sub conveyor 22b to the bag mouth portion side (see FIG. 23), and when the sensor 24b detects the bag mouth edge Be at the specific position Q (when the bag B reaches the longitudinal reference position), the servomotor 71 (sub conveyor 22b) is stopped.

Figure 23:
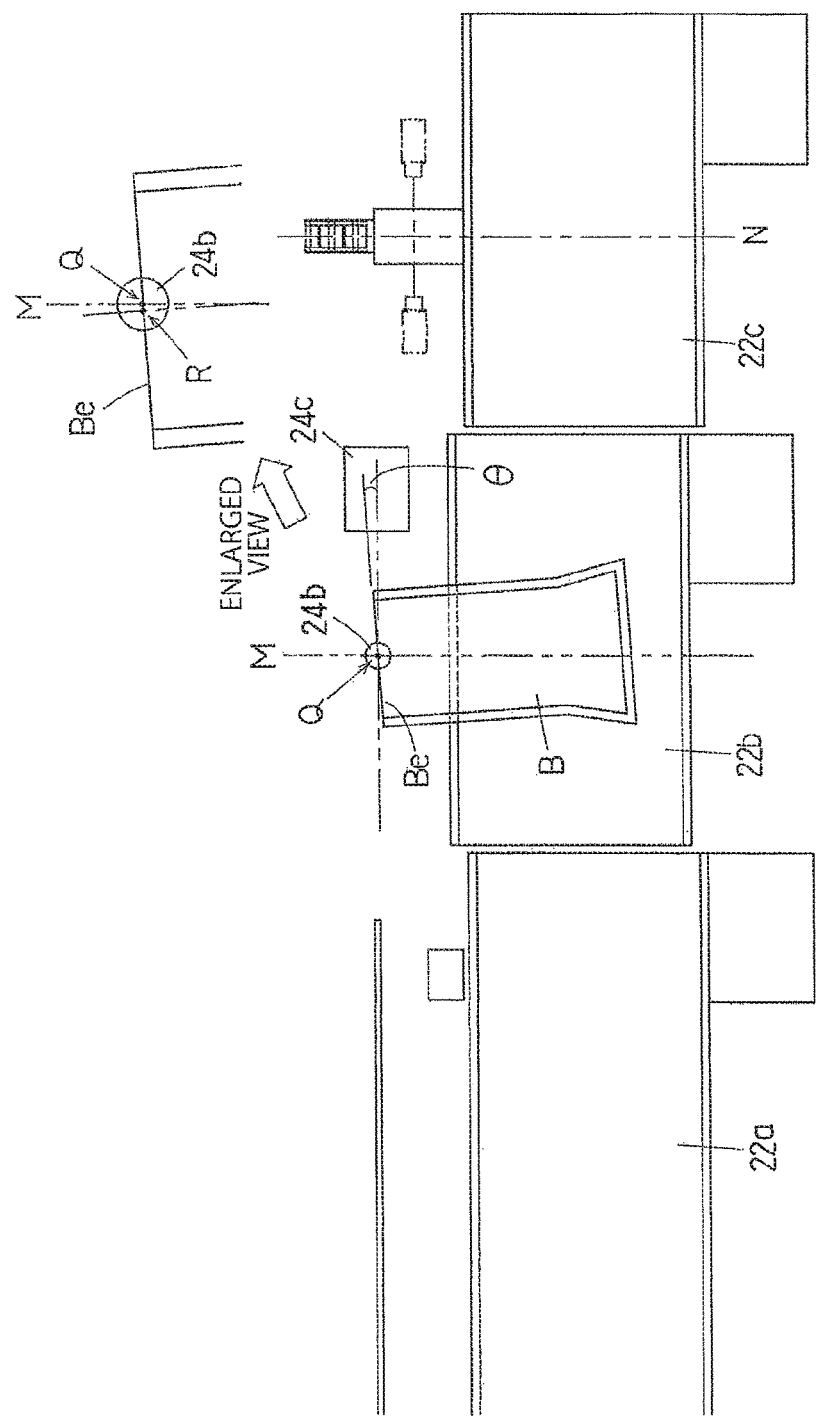
FIG. 23 is a diagram showing, in a time series manner, the position adjustment and the angle adjustment of a bag on the conveyance path in the supply apparatus shown in FIG. 20.
Figure 24:
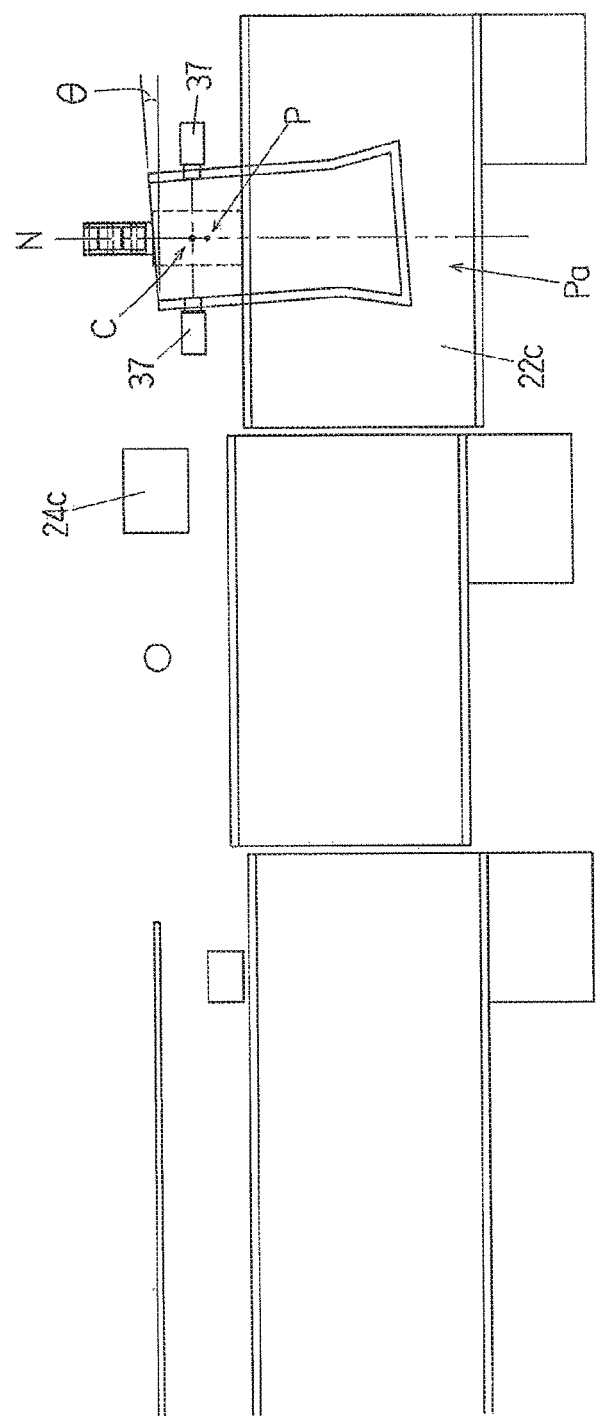
FIG. 24 is a diagram showing, in a time series manner, the position adjustment and the angle adjustment of a bag on the conveyance path in the supply apparatus shown in FIG. 20.

As shown in the enlarged view in FIG. 23, the location (specific position Q) where the reference plane M intersects the bag mouth edge Be is slightly deviated, in the parallel direction and the perpendicular direction with respect to the conveyance path, from the center R of the bag B in the width direction (the center of the bag mouth edge Be). Therefore, when the bag B is inclined, the bag B is not strictly located at the longitudinal reference position, but can be said to be approximately located at the longitudinal reference position.

(5) While the belt conveyor 22 (the sub conveyors 22a, 22b, 22c) is operated and the bag B moves on the sub conveyor 22b, the inclination angle θ of the bag B (the inclination angle of the bag mouth edge Be with respect to the conveyance path) is detected by the sensor 24c. Specifically, the sensor 24c detects the positions of both ends of the bag mouth edge Be of the bag B, and based on the detection result, the control apparatus 15 calculates the inclination angle θ. Subsequently, the bag B is moved from the sub conveyor 22b to the sub conveyor 22c and is conveyed to the next stop position (the takeoff position Pa), and the bag B is stopped there (see FIG. 24). At this point, the control apparatus 15 controls the operation of the sub conveyors 22b, 22c so that the center P of the detected bag width D of the bag B is located on the reference plane N. The center P of the detected bag width D of the bag B which is stopped at the takeoff position Pa is slightly offset from the axis C. The deviation between the axis C and the center P becomes larger as the deviation between the position of the bag B placed on the sub conveyor 22a and the longitudinal reference position becomes larger.

After the bag B stops at the takeoff position Pa, the pair of grip members 37 reaches the takeoff position Pa. At this point, the grip members 37 forming a pair are at the reference positions, and the alignment direction of the grip members 37 is parallel to the conveyance path.

Figure 25:
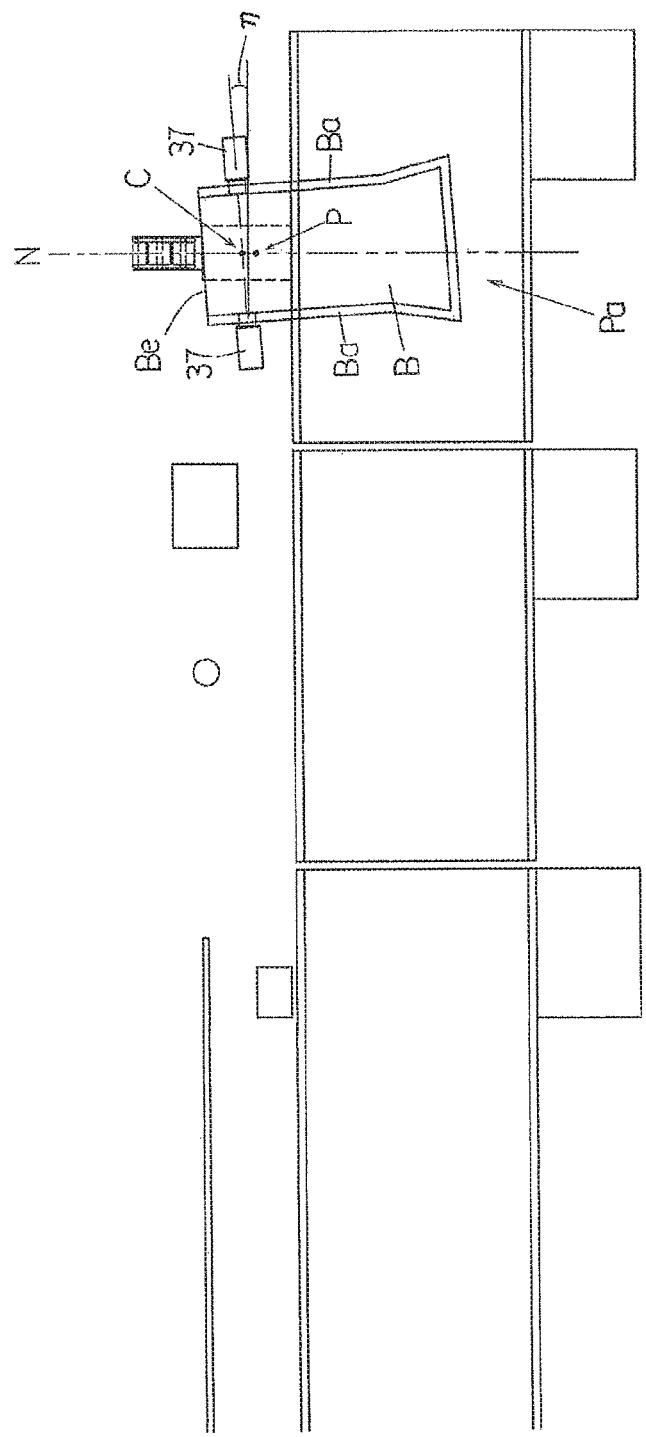
FIG. 25 is a diagram showing, in a time series manner, the position adjustment and the angle adjustment of a bag on the conveyance path in the supply apparatus shown in FIG. 20.

(6) The fourth servomotor 65 (see FIG. 17) is operated according to the inclination angle (θ) of a bag B detected by the sensor 24, the grip members 37, 37 forming a pair are swung about the axis C from the reference positions by an angle η (=θ) and the alignment direction of the grip members 37, 37 becomes parallel to the bag mouth edge Be of the bag B, and subsequently, the grip members 37 and 37 forming a pair are closed to hold the both side edge portions Ba, Ba of the bag B (see FIG. 25). When the center P of the detected bag width D of the bag B is slightly deviated from the axis C of the pair of grip members 37, 37, the center of the bag B in the width direction (the direction of the bag mouth edge Be) does not strictly coincide with the center (the axis C) of the pair of grip members 37, 37 but can be considered to approximately coincide with the center (the axis C) of the pair of grip members 37, 37.

The subsequent movement of the pair of grip members 37, 37 is the same as that of the pair of grip members 37, 37 in the supply apparatus 1C.

[Still Another Example in which the Bag Transfer Unit has a Function of Adjusting the Alignment Direction of the Pair of Grip Members]

Next, another example of an intermittent conveyance type in which the bag transfer unit has a function of adjusting the alignment direction of the pair of grip members will be described with reference to FIG. 27.

The supply apparatus 1E shown in FIG. 27 differs from the supply apparatus 1D mainly in the following two points, and is substantially the same as the supply apparatus 1D in other points.

(1) The sensor 24 comprises one camera (a CCD image sensor, a CMOS image sensor, etc.) installed above the sub conveyor 22a. The sensor 24 (camera) detects the position information of a specific position S on a bag B at the stop position on the sub conveyor 22a (of a spot distanced from the bag mouth edge by a predetermined distance d on a straight line T bisecting the bag mouth edge Be of the bag B) and the inclination angle θ of the bag B (the inclination angle of the bag mouth edge Be with respect to the conveyance path). The distance d is set with respect for each type (size, etc.) of the bag so that seal of the bag mouth portion performed in a vacuum chamber 4 is performed at an appropriate position.

(2) The control apparatus 15 controls the servomotors 27a, 27b, 27c, 71 for the belt conveyor 22 (22a, 22b, 22c) in such a manner that when a bag B is stopped at the stop position (the takeoff position Pa) on the sub conveyor 22c, the specific position S of the bag B on the sub conveyor 22c is made to coincide with the axis C.

An example of the operation of the supply apparatus 1E will be explained in detail in a time series manner with reference to FIG. 27 below.

Figure 27:
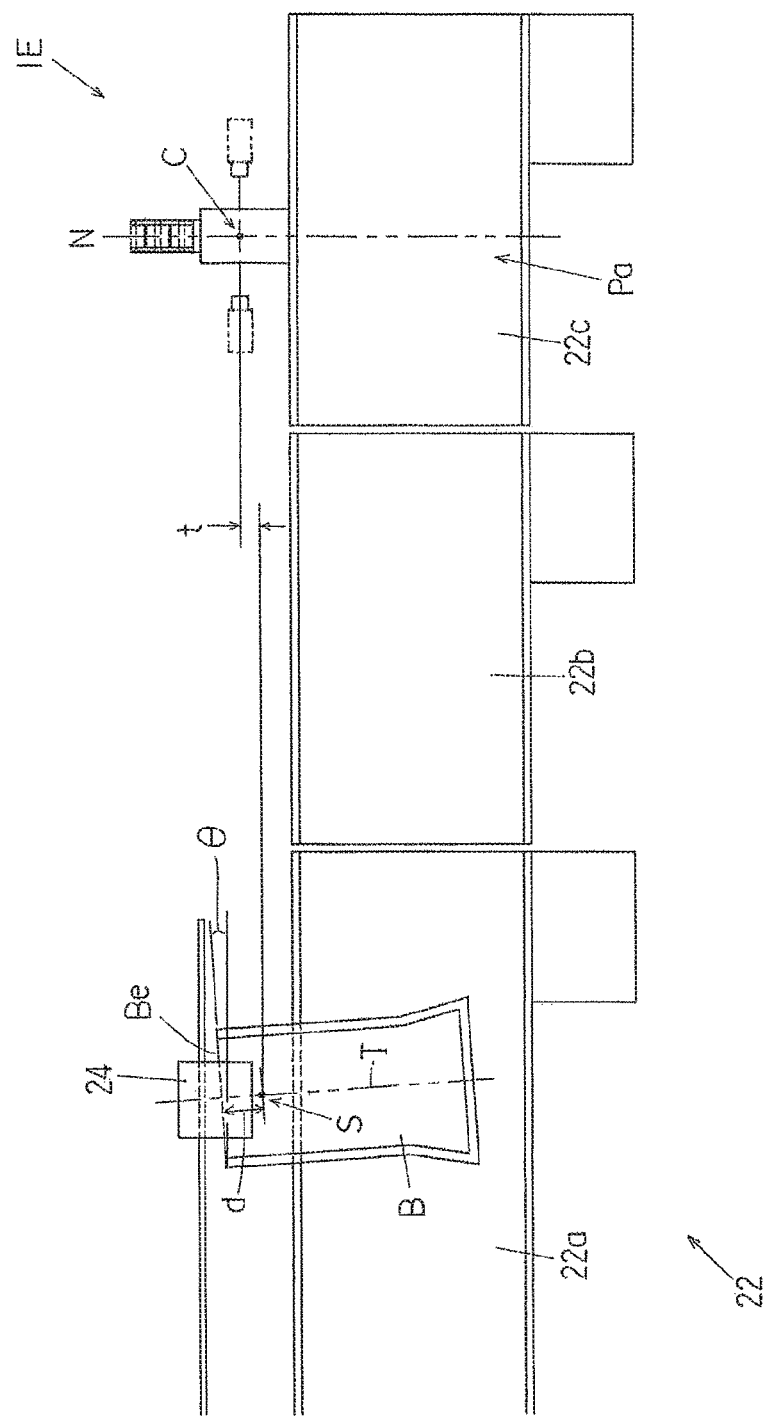
FIG. 27 is a top view for explaining the position adjustment and the angle adjustment of a bag on a conveyance path in a supply apparatus according to yet another embodiment of the present invention.

(1) In FIG. 27, a bag B is stopped at the stop position on the sub conveyor 22a, and at that time, the camera (sensor 24) detects the position information on the specific position S on the bag B and the inclination angle θ. Further, based on the position information of the specific position S, the deviation amount t between the specific position S and the axis C (the amount of deviation in the direction perpendicular to the conveyance path) is calculated.

(2) The belt conveyor 22 (the sub conveyors 22a, 22b, 22c) is operated and the bag B is transferred onto the sub conveyor 22b, and then is stopped at the stop position set on the sub conveyor 22b.

(3) The control apparatus 15 controls the servomotor 71 based on the deviation amount t so as to move the sub conveyor 22b in the perpendicular direction with respect to the conveyance path in such a manner that the deviation amount becomes zero. If t=0 is satisfied from the beginning, it is determined that the bag B is at the longitudinal reference position and the servomotor 71 is not operated.

(4) Subsequently, the belt conveyor 22 (the sub conveyors 22a, 22b, 22c) is operated and the bag B is transferred onto the sub conveyor 22c, is conveyed to the next stop position (the takeoff position Pa) and is stopped there. At this point, the control apparatus 15 controls the servomotors 27*b*, 27*c* for the sub conveyors 22*b*, 22*c* to adjust the intermittent conveyance distance of the sub conveyors 22*b*, 22*c* in such a manner that the specific position S of the bag B is positioned on the reference plane N. The deviation amount t between the specific position S and the axis C becomes zero on the sub conveyor 22*b* (the bag B is located at the longitudinal reference position), and as a result, the specific position S is positioned on the axis C at the takeoff position Pa.

After the bag B stops at the takeoff position Pa, the pair of grip members 37 reaches the takeoff position Pa. At this point, the grip members 37 forming a pair are at the reference positions, and the alignment direction of the grip members 37 is parallel to the conveyance path.

The subsequent movement of the grip members 37, 37 forming a pair is the same as the grip members 37, 37 forming a pair in the supply apparatus 1D.

[How to Determine the Inclination Angle of a Bag]

Next, an example of how to determine the inclination angle θ of a bag B will be described. The method of determining the inclination angle θ is not limited to the following example, and the inclination angle θ can be determined by any method.

Figure 28:
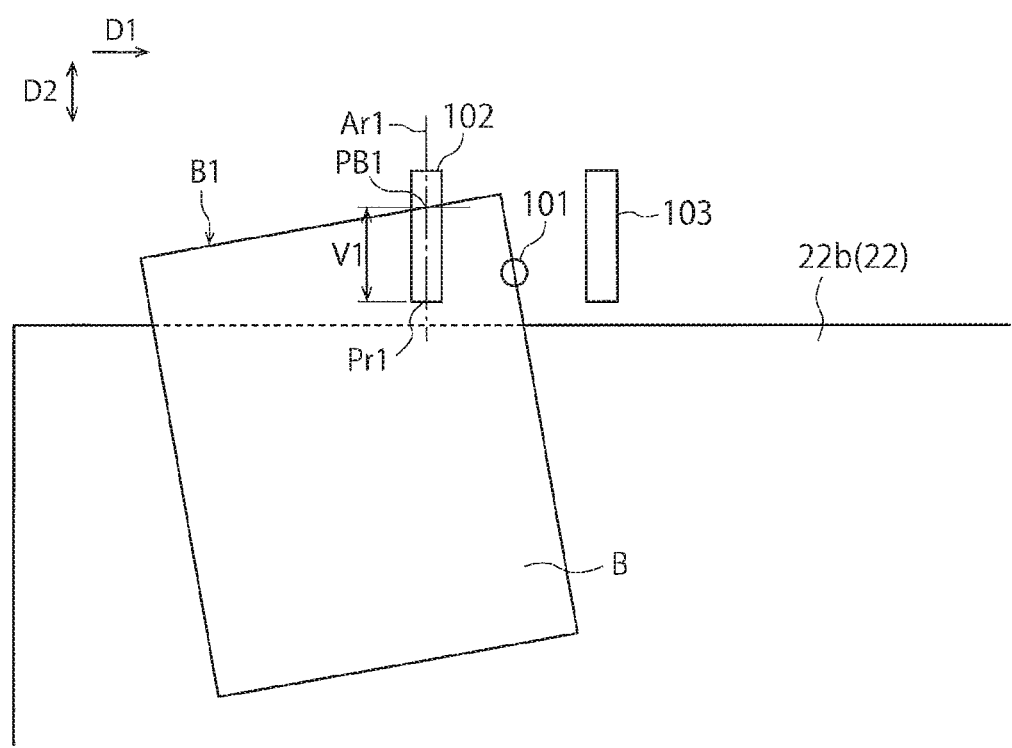
FIG. 28 is a diagram for explaining an example of how to determine the inclination angle of a bag.
Figure 29:
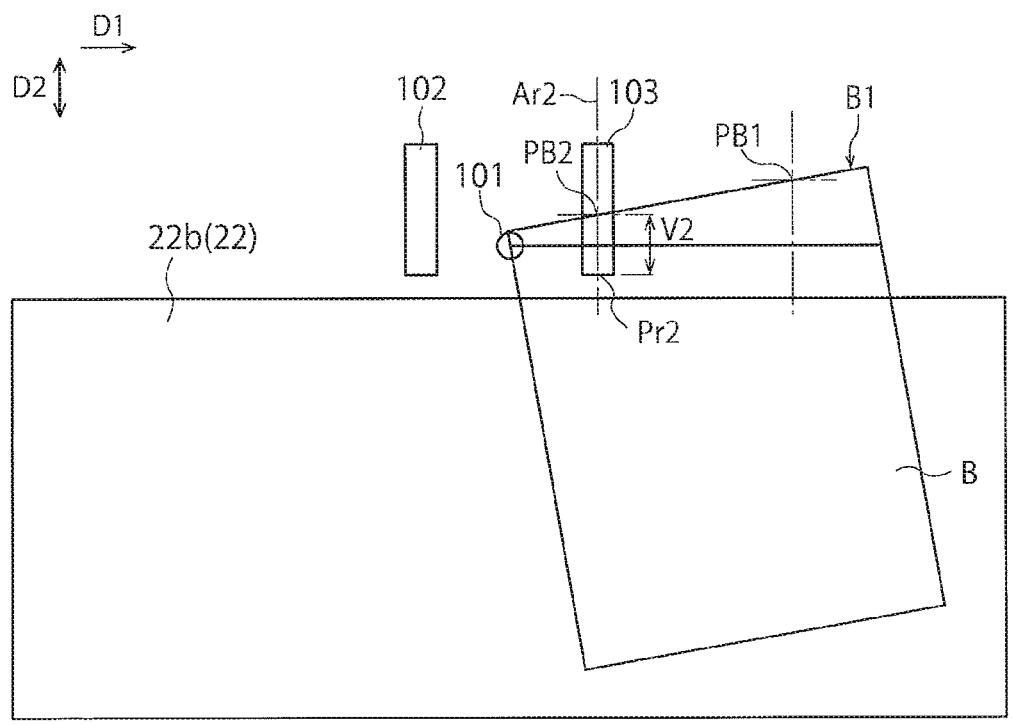
FIG. 29 is a diagram for explaining an example of how to determine the inclination angle of a bag.
Figure 30:
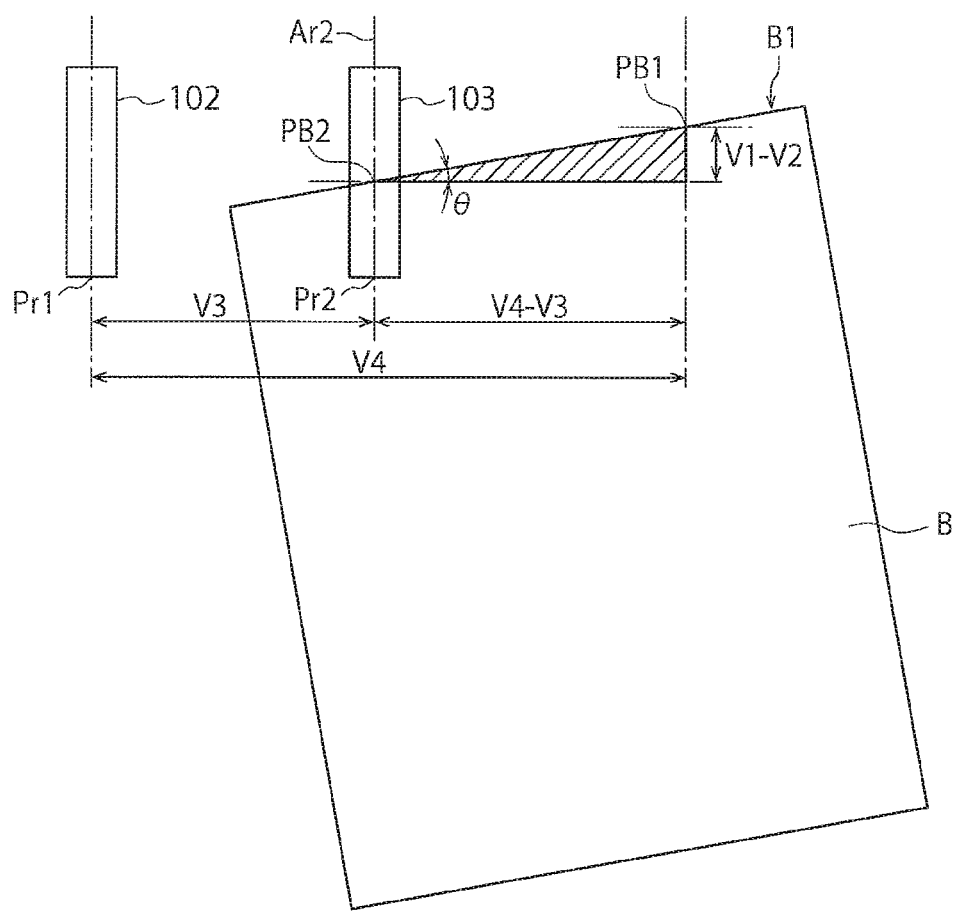
FIG. 30 is a diagram for explaining an example of how to determine the inclination angle of a bag.

FIGS. 28 to 30 are diagrams illustrating an example of how to determine the inclination angle θ of a bag B.

A bag B is conveyed by the belt conveyor 22 in the conveyance direction D1. In the present example, the bag B is conveyed in the conveyance direction D1 at a constant speed without stopping, at least from the start of the process of detecting the inclination of the bag B until the completion of the process of detecting the inclination of the bag B. This inclination detection process is performed before the bag B reaches the takeoff position Pa, but the specific implementation position of the inclination detection process is not particularly limited. In the example shown in FIGS. 28 to 30, while the bag B is conveyed by the sub conveyor 22*b* (see FIG. 20 etc.), the inclination detection process is performed.

As shown in FIG. 28, at the same time as the downstream side end (that is, the end on the advancing direction side) of a bag B is detected by a bag detection sensor 101 during conveyance of the bag B, a first distance V1 up to the end position of the mouth portion B1 of the bag B (i.e., the bag mouth portion B1) is detected by a first mouth portion position detection sensor 102. The first mouth portion position detection sensor 102 is disposed upstream from the bag detection sensor 101 with respect to the conveyance direction D1 of the bag B, and obtains the first distance V1 from a predetermined first reference position Pr1 in a horizontal direction forming a right angle with the conveyance direction D1 (hereinafter also referred to as the "longitudinal horizontal direction D2"), up to the end position of the mouth portion B1 of the bag B (hereinafter also referred to as the "first mouse portion end position PB1") on a first reference axis Ar1 which extends in the longitudinal horizontal direction D2 and penetrates the first reference position Pr1.

Then, the bag B is further conveyed in the conveyance direction D1. Then, as shown in FIG. 29, at the same time as the upstream side end of the bag B is detected by the bag detection sensor 101 during conveyance of the bag B, a second distance V2 up to the end position of the mouth portion B1 of the bag B is detected by a second mouth portion position detection sensor 103. The second mouth portion position detection sensor 103 is disposed downstream from the bag detection sensor 101. with respect to the conveyance direction D1 of the bag B, and obtains the second distance V2 from a predetermined second reference position Pr2 in the longitudinal horizontal direction, up to the end position of the mouth portion B1 of the bag B (hereinafter also referred to as the "second mouse portion end position PB2") on a second reference axis Ar2 which extends in the longitudinal horizontal direction D2 and penetrates the second reference position Pr2. The first reference position Pr1 and the second reference position Pr2 are positions different from each other with respect to the conveyance direction D1, but are the same as each other with respect to the longitudinal horizontal direction D2.

Then, a third distance V3 (see FIG. 30) between the first reference position Pr1 and the second reference position Pr2 in the conveyance direction D1 is obtained. The third distance V3 is basically a fixed value, which corresponds to the distance in the conveyance direction D1 between the first mouth portion position detection sensor 102 and the second mouth portion position detection sensor 103, and is a value set in advance. Moreover, the conveyance speed and time of the bag B from the downstream side end of the bag B being detected by the bag detection sensor 101 until the upstream side end of the bag B being detected by the bag detection sensor 101 are acquired, and a fourth distance V4 which is the movement distance of the bag B is acquired based on the acquired conveyance speed and time.

Then, the distance in the longitudinal horizontal direction D2 between the first mouse portion end position PB1 and the second mouse portion end position PB2 is acquired based on "the first distance V1−the second distance V2". Further, the distance in the conveyance direction D1 between the first mouse portion end position PB1 and the second mouse portion end position PB2 is acquired based on "V4−V3". As apparent from FIG. 30, since the inclination angle θ of the bag B satisfies "tan θ=(V1−V2)/(V4−V3)", the inclination angle θ of the bag can be obtained from "θ=arctan {(V1−V2)/(V4−V3)}" (an inverse trigonometric function).

The bag detection sensor 101, the first mouth portion position detection sensor 102, and the second mouth portion position detection sensor 103 can be realized by any sensors. For example, the bag detection sensor 101 can be realized by a photo sensor in which a light emitting element and a light receiving element are combined. The downstream side end of a bag B may be detected based on the timing when the bag B enters between the light emitting element and the light receiving element and the light from the light emitting element is blocked by the bag B and not detected by the light receiving element (that is, the timing when the detection is switched from detection-on to detection-off). In addition, the upstream side end of a bag B may be detected based on the timing when the bag B is not between the light emitting element and the light receiving element and the light from the light emitting element is not blocked by the bag B and is detected by the light receiving element (that is, the timing when the detection is switched from detection-off to detection-on). Similarly, the first mouth portion position detection sensor 102 and the second mouth portion position detection sensor 103 can also be realized by photosensors, and for example, CCD transmission type digital laser sensors (IG series) manufactured by Keyence Corporation may be suitably used for the first mouth portion position detection sensor 102 and the second mouth portion position detection sensor 103.

The above-mentioned detection of the inclination angle θ can be performed by any device, and therefore, for example, can be performed by a control unit (for example, the control apparatus 15). Such a control unit may acquire detection results of the bag detection sensor 101, the first mouth portion position detection sensor 102 and the second mouth portion position detection sensor 103, and also may acquire the third distance V3 (i.e., a fixed value) between the first reference position Pr1 and the second reference position Pr2 in the conveyance direction D1, and the conveyance speed and conveyance time of a bag B. In this case, the control unit can acquire the inclination angle θ of a bag B based on the above-described relationship.

[Second Mode]

Next, an apparatus and a method according to a second mode of the present invention will be described.

A bag conveyance method according to one embodiment of the present mode includes: a step of placing a bag B on a takeoff area (see the "takeoff position Pa"); a step of holding an expected hold part of the bag B (see the both side edge portions Ba of the bag B) with a hold member (see the "grip members 37"); and a step of transferring the bag B from the takeoff area to a delivery area (see the "delivery position Pb"). A bag B may be conveyed intermittently, may be conveyed continuously, or may be conveyed irregularly. The takeoff area is a specific area in the conveyance path for bags B (in particular, in the path along which the belt conveyor 22 conveys bags B), and is defined as a specific position in a case each bag B is conveyed intermittently. When a bag B is continuously conveyed, the expected hold parts of the bag B are held by the grip members 37 while the bag B is moving in the takeoff area, and the bag B is transferred toward the delivery area.

In the takeoff area, a bag B in which a content (a solid substance 32) is placed and the mouth portion B1 is not sealed, is disposed in a substantially horizontal attitude (in a posture in which the bag is laid sideways). The thickness (that is, the size in the height direction) of a bag B having the horizontal attitude is variable according to the content placed in the bag B. Typically, when a bag B having a horizontal attitude is placed on a support surface, a side surface portion of the bag B extending between the mouth portion B1 and the bottom portion contacts the support surface, and the mouth portion B1 and the bottom portion are arranged in positions distant from each other in a horizontal direction.

In the present embodiment, the height direction position of the expected hold part of a bag B and the height direction position of the hold member correspond to each other. The height direction coincides with the direction parallel to the vertical direction (the gravity direction) and is perpendicular to the horizontal direction. In a state where the height direction position of the expected hold part of a bag B and the height direction position of the hold member correspond to each other, the expected hold part of the bag B arranged in the takeoff area is held by the hold member. Then, by moving the hold member while the expected hold part of the bag B is held by the hold member, the bag B is transferred from the takeoff area to the delivery area. Specifically, by moving the hold member after the expected hold part of a bag B disposed in the takeoff area is held by the hold member (i.e., in a state where the expected hold part of a bag B disposed in the takeoff area is held by the hold member), the bag B can be transferred from the takeoff area to the delivery area.

A supply apparatus 1 (a bag conveyance apparatus) which performs such a bag conveyance method comprises, for example: a first conveyance unit (for example, the above-described belt conveyor 22) which arranges a bag B in a substantially horizontal attitude in the takeoff area, a content being placed in the bag B and the mouth portion B1 of the bag B being not sealed; a hold member (for example, the above-described grip members 37) which holds an expected hold part of the bag B arranged in the takeoff area; a lifting-lowering mechanism which adjusts a relative position in a height direction between the expected hold part and the hold member before the hold member holds the expected hold part of the bag B; and a transfer mechanism (for example, the above-described bag transfer unit 23) which causes the hold member to move after the expected hold part of the bag arranged in the takeoff area is held by the hold member, in such a manner that the bag B is transferred from the takeoff area to the delivery area.

The lifting-lowering mechanism adjusts the relative position in the height direction between the expected hold part of a bag B and the hold member in such a manner that the bag B is arranged in the takeoff area in a state where the height direction position of the expected hold part of the bag B and the height direction position of the hold member correspond to each other. The specific method of adjusting the relative position in the height direction between the expected hold part of a bag B and the hold member is not limited, and the height direction position of the expected hold part of a bag B may be adjusted and the height direction position of the hold member may be adjusted. Below, an example of the method of causing the height direction position of the expected hold part of a bag B and the height direction position of the hold member to correspond to each other by moving the bag B in the height direction is explained.

The bag conveyance method and the bag conveyance apparatus described below are a method and an apparatus based on the supply apparatus 1D (in particular, the belt conveyor 22, etc.) according to the embodiment shown in FIGS. 20 to 26 described above, and the detailed description of the configuration and the operation similar to those of the above-described supply apparatus 1D will be omitted. In the bag conveyance method and the bag conveyance apparatus described below, the "process for correcting the inclination of a bag B (the inclination angle θ)" performed in the supply apparatus 1D shown in FIGS. 20 to 26 may be performed or may not be performed. Therefore, the bag conveyance apparatus described below is not required to comprise all the elements of the supply apparatus 1D shown in FIGS. 20 to 26 described above.

Figure 31:
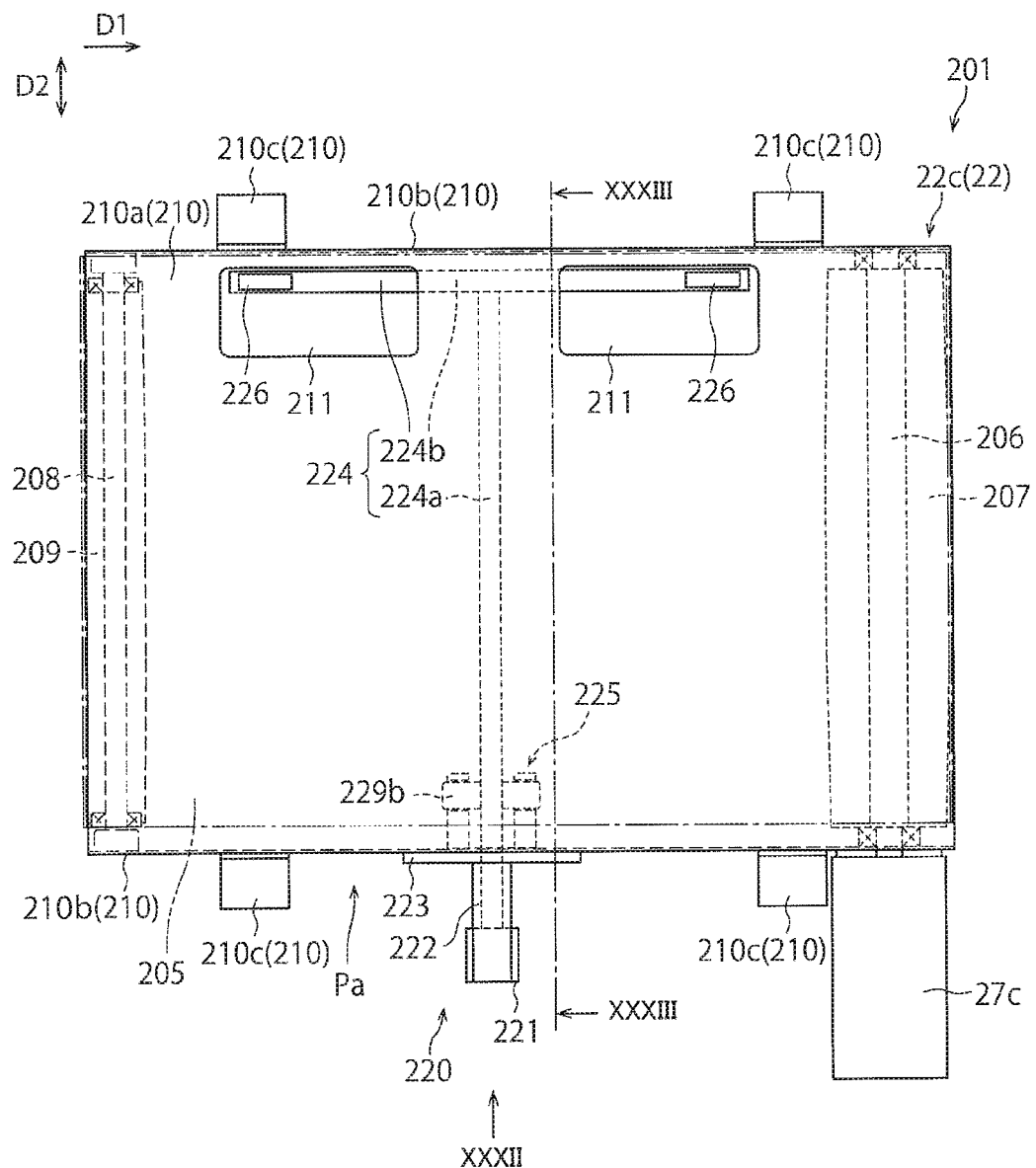
FIG. 31 is a plan view of a sub conveyor (see FIG. 20) of a belt conveyor in a bag conveyance apparatus according to an embodiment of the second mode.
Figure 32:
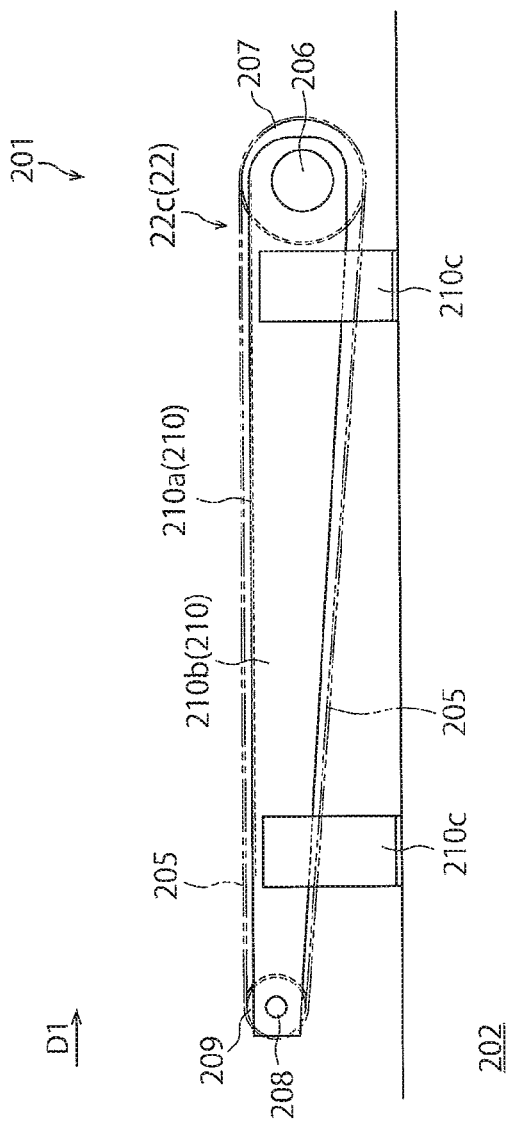
FIG. 32 is a front view of the sub conveyor (see an arrow "XXXII" shown in FIG. 31).
Figure 33:
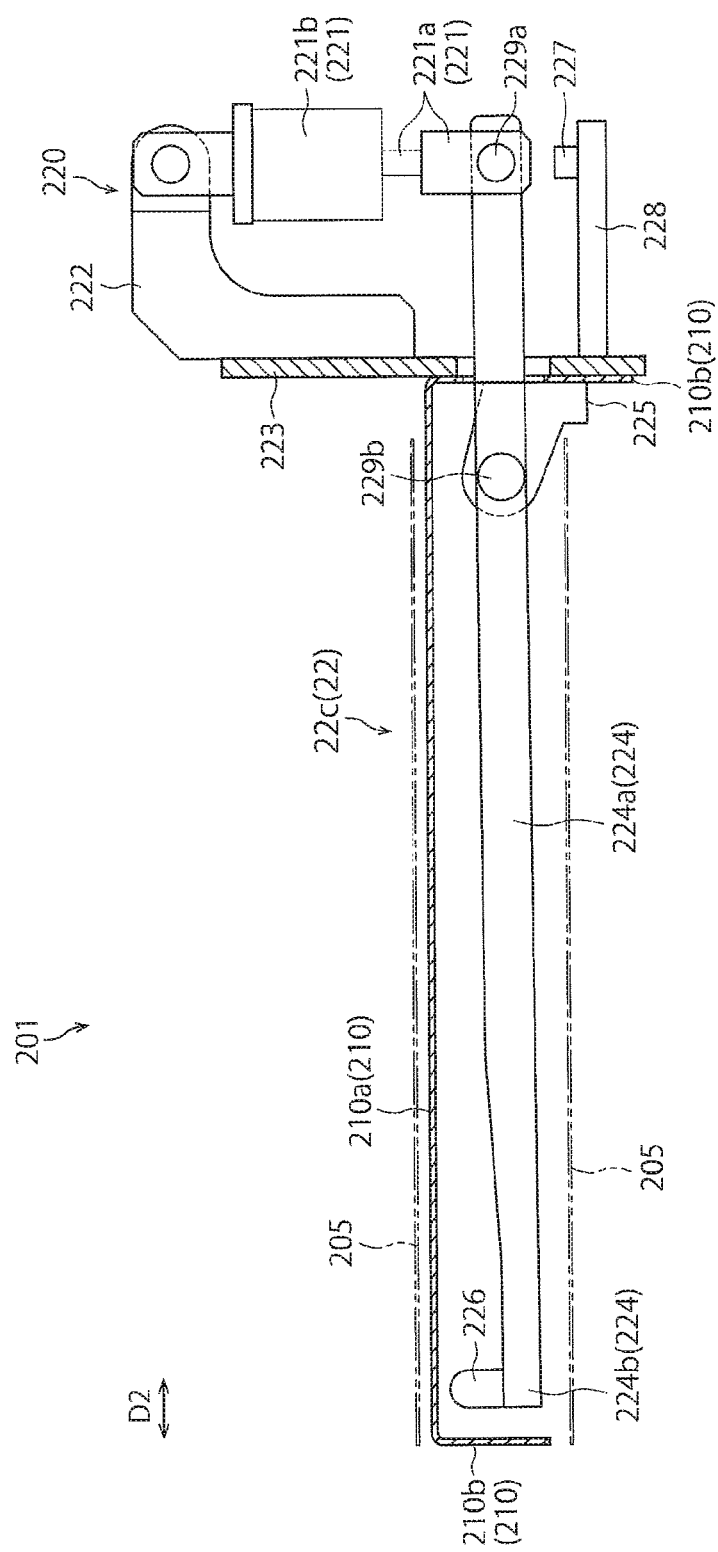
FIG. 33 is a side view of the cross section of the bag conveyance apparatus, taken along a section line XXXIII-XXXIII shown in FIG. 31.

FIG. 31 is a plan view of a sub conveyor 22*c* (see FIG. 20) of a belt conveyor 22 in a bag conveyance apparatus 201 according to an embodiment of the second mode. FIG. 32 is a front view of the sub conveyor 22*c* (see the arrow "XXXII" shown in FIG. 31). In FIG. 32, a lifting-lowering mechanism 220 (a lifting-lowering drive unit 221, a first attachment section 222 and the belt conveyor 22) and a servomotor 27*c* are not shown. FIG. 33 is a side view of the cross section of the bag conveyance apparatus 201 taken along the cross section line XXXIII-XXXIII shown in FIG. 31.

Also in the present embodiment, a bag B (a package bag) being in a state where a solid substance 32, which is the content, is put in the bag B and the mouth portion B1 of the bag B is not sealed yet, is conveyed by the belt conveyor 22 toward the takeoff position Pa. During the conveyance, the both side edge portions Ba of each bag B are spaced apart in the conveyance direction D1, and the mouth portion B1 and the bottom portion are spaced apart in the longitudinal horizontal direction D2. In such conveyance of a bag B, grip regions of a sufficient size are secured in the side edge portions Ba of a bag B arranged at the takeoff position Pa, the both side edge portions Ba of the bag B are properly gripped by the pair of grip members 37 in such a manner that the side edge portions Ba do not bend, and the bag is transferred from the takeoff position Pa to the delivery position Pb.

Like the belt conveyor 22 shown in FIG. 20, etc., the belt conveyor 22 of the present embodiment includes a sub conveyor 22a, a sub conveyor 22b and a sub conveyor 22c, and intermittently conveys a bag B in the conveyance direction D1 towards the takeoff position Pa set on the sub conveyor 22c. The sub conveyor 22c has: a first conveyance belt 205 having an endless shape; and a first rotation body 207 and a second rotation body 209 which the first conveyance belt 205 is wound around and is stretched between. The first conveyance belt 205 may be constituted by an elastic member such as urethane, and has elasticity and/or has play. The first rotation body 207 is provided to rotate integrally with a first support shaft 206, and the second rotation body 209 is rotatably supported by the second support shaft 208 via a bearing. The first support shaft 206 is rotatably supported relative to a frame 210 (in particular, a side surface part 210b) via a bearing, and one end of the first support shaft 206 is fixed to the output shaft of the servomotor 27c. In FIG. 31, a part of the contour of the side surface part 210b of the frame 210 is represented by a dotted line.

The first support shaft 206 and the output shaft of the servomotor 27c have a common central axis extending in the longitudinal horizontal direction D2, and the first support shaft 206 and the first rotation body 207 are rotated around the central axis by the rotation of the output shaft of the servomotor 27c. The second support shaft 208 is fixed to the frame 210 (in particular, the side surface part 210b), and the second rotation body 209 is provided so as to be rotatable about the second support shaft 208. According to the sub conveyor 22c having the configuration described above, when the output shaft of the servomotor 27c is intermittently rotated around its axis, rotative power is transmitted to the first conveyance belt 205 via the first support shaft 206 and the first rotation body 207 and the first conveyance belt 205 intermittently travels in the conveyance direction D1.

The frame 210 includes: a top surface part 210a extending in the horizontal direction (i.e., in the conveyance direction D1 and the longitudinal horizontal direction D2); side surface parts 210b extending from the top surface part 210a in the vertical direction (downward); and leg portions 210c extending further from the side surface parts 210b in the vertical direction (downward). A part of the first conveyance belt 205 on which a bag B is disposed (i.e., a placement surface) is located above the top surface part 210a. Two plate holes 211 are formed in the illustrated top surface part 210a. The respective plate holes 211 are provided at positions corresponding to two lifting-lowering members 226 described later. When these lifting-lowering members 226 move and down, the lifting-lowering members 226 penetrate through the corresponding plate holes 211 and do not collide with the frame 210 (with the top surface part 210a). A part of the first conveyance belt 205 which is to be in contact with a bag B disposed at the takeoff position Pa is disposed so as to cover the two plate holes 211 and the two lifting-lowering members 226. Each leg portion 210c is fixed to a side surface part 210b and a table 202, and the sub conveyor 22c and the lifting-lowering mechanism 220, and the like, are supported by the table 202 via the frame 210.

In the illustrated bag conveyance apparatus 201, the lifting-lowering mechanism 220 is provided together with the sub conveyor 22c, and the lifting-lowering mechanism 220 adjusts the height direction position of the expected hold parts of a bag B on the first conveyance belt 205.

The lifting-lowering mechanism 220, as shown in FIG. 33, comprises: the lifting-lowering drive unit 221 which is attached fixedly to the frame 210 (a side surface part 210b) via the first attachment section 222 and the second attachment section 223; and a lifting-lowering lever 224 which is moved up and down by the lifting-lowering drive unit 221. The illustrated lifting-lowering drive unit 221 is constituted by an air cylinder. The main body of the lifting-lowering drive unit 221 (hereinafter, also referred to as a "drive main body 221b") is rotatably connected to the first attachment section 222. The shaft portion of the lifting-lowering drive unit 221 (hereinafter also referred to as a "drive shaft portion 221a") is rotatably connected to one end of the lifting-lowering lever 224. The first attachment section 222 is fixedly attached to the second attachment section 223, and the second attachment section 223 is fixedly attached to the frame 210 (a side surface part 210b). A lifting-lowering support body 225 and the servomotor 27c are further fixedly attached to the frame 210 (a side surface part 210b). A third attachment section 228 is further fixedly attached to the second attachment section 223, and a stopper 227 is fixed to the third attachment section 228.

The stopper 227 is provided at a position facing the drive shaft portion 221a in the height direction, and the contact between the stopper 227 and the drive shaft portion 221a limits the amount of projection of the drive shaft portion 221a from the drive main body 221b. Specifically, the stopper 227 determines the maximum projection amount of the drive shaft portion 221a from the drive main body 221b. The height direction position of the stopper 227 is variable. In the illustrated example, the stopper 227 is constituted by a bolt, and the stopper 227 is attached to the third attachment section 228 via a screw engagement. It is possible to change the height direction position of the stopper 227 (in particular, the head part) in accordance with the amount of screw rotation of the stopper 227 with respect to the third attachment section 228. The height direction position of the stopper 227 can be appropriately changed by an operator. It is possible for an operator to adjust the height direction position of the stopper 227 according to the size of a bag B, the features (for example, the number, the volume and/or the shape) of the content (the solid substance 32) contained in a bag B and the height direction position of the first conveyance belt 205, etc. The method of adjusting the height direction position of the stopper 227 is not limited, and for example, the height direction position of the stopper 227 may be adjusted by changing the attachment position of the third attachment section 228 with respect to the second attachment section 223.

As shown in FIG. 31, the lifting-lowering lever 224 includes: a first lever portion 224a extending in the longitudinal horizontal direction D2; and a second lever portion 224b extending in the conveyance direction D1. The second lever portion 224b is located on one end of the first lever portion 224a, and is provided integrally with the first lever portion 224a. Further, a lifting-lowering member 226 is fixed to each of the both end portions of the second lever portion 224b. The illustrated first lever portion 224a is connected to the central portion of the second lever portion 224b, and one lifting-lowering member 226 is disposed on one side of the second lever portion 224b in the conveyance direction D1 while the other lifting-lowering member 226 is disposed on the other side of the second lever portion 224b. The first lever portion 224a extends and penetrates through the second attachment section 223 and the frame 210 (a side surface part 210b).

As described above, the lifting-lowering members 226 are provided on one side of the lifting-lowering lever 224 (that is, the second lever portion 224b). On the other hand, as shown in FIG. 33, the drive shaft portion 221a is rotatably connected to the other side portion of the lifting-lowering lever 224 (that is, the first lever portion 224a) via a first connection shaft 229a. Further, an intermediate portion of the lifting-lowering lever 224 (i.e., a portion of the first lever portion 224a positioned between the drive shaft portion 221a and the lifting-lowering members 226) is rotatably supported by the lifting-lowering support body 225 via the second connection shaft 229b. Therefore, the lifting-lowering lever 224 has a leverage structure, the part to which the drive shaft portion 221a is connected acts as the point of effort, the part supported by the lifting-lowering support body 225 acts as the fulcrum, and the part provided with the lifting-lowering member 226 acts as the point of load. Thus, the lifting-lowering lever 224 swings about the second connection shaft 229b in accordance with the amount of protrusion of the drive shaft portion 221a. For example, when the amount of projection of the drive shaft portion 221a from the drive main body 221b is relatively small, the drive shaft portion 221a is separated from the stopper 227, and the lifting-lowering members 226 are disposed at relatively lower positions. On the other hand, when the protrusion amount of the drive shaft portion 221a from the drive main body 221b is relatively large, the drive shaft portion 221a approaches the stopper 227, and the lifting-lowering members 226 are disposed at relatively upper positions.

More specifically, when the amount of protrusion of the drive shaft portion 221a from the drive main body 221b is the smallest (see FIG. 33), the lifting-lowering members 226 are disposed below the top surface part 210a and the lifting-lowering members 226 are disposed at positions away from the first conveyance belt 205. In this situation, the first conveyance belt 205 extends in the horizontal direction uniformly without being pressed by the lifting-lowering members 226. On the other hand, when the amount of protrusion of the drive shaft portion 221a from the drive main body 221b is the largest (that is, when the drive shaft portion 221a contacts the stopper 227), each lifting-lowering member 226 penetrates the corresponding plate hole 211 and the tip portion of each lifting-lowering member 226 contacts the lower surface of the first conveyance belt 205, and each lifting-lowering member 226 locally pushes the first conveyance belt 205 upward and supports the first conveyance belt 205. Since the first conveyance belt 205 has elasticity and/or has play, when a force in the height direction is locally applied to the first conveyance belt 205, only the place where the force is applied and the vicinity thereof can be varied in the height direction.

In the present embodiment, the above-described servomotor 27c and the lifting-lowering drive unit 221 are controlled by a control unit (for example, the control apparatus 15).

As described above, the sub conveyor 22c of the belt conveyor 22 (the first conveyance unit) has the first conveyance belt 205 on which a bag B disposed at the takeoff position Pa (in the takeoff area) is placed horizontally. The first conveyance belt 205 has a placement surface on which a bag B disposed at the takeoff position Pa (in the takeoff area) is placed. The lifting-lowering mechanism 220 adjusts the height direction position of the placement surface of the belt conveyor 22 (the first conveyance belt 205). Specifically, the lifting-lowering mechanism 220 according to the present embodiment includes the lifting-lowering drive unit 221, the lifting-lowering lever 224 and the lifting-lowering members 226, which form a belt drive unit and apply a force directly and locally to the first conveyance belt 205 to move the first conveyance belt 205 in the height direction.

Figure 34:
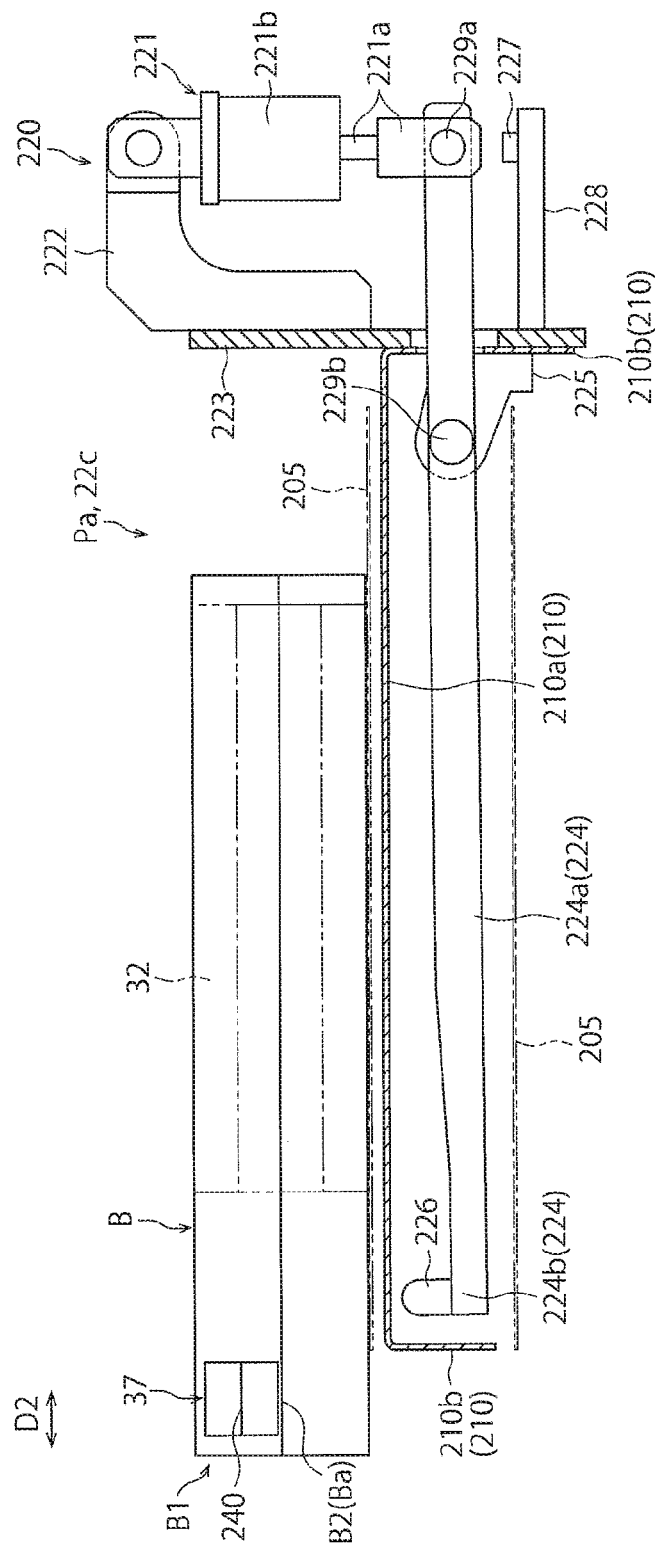
FIG. 34 is a side view of the cross section of the sub conveyor before the height direction position of the expected hold parts of a bag is adjusted.
Figure 35:
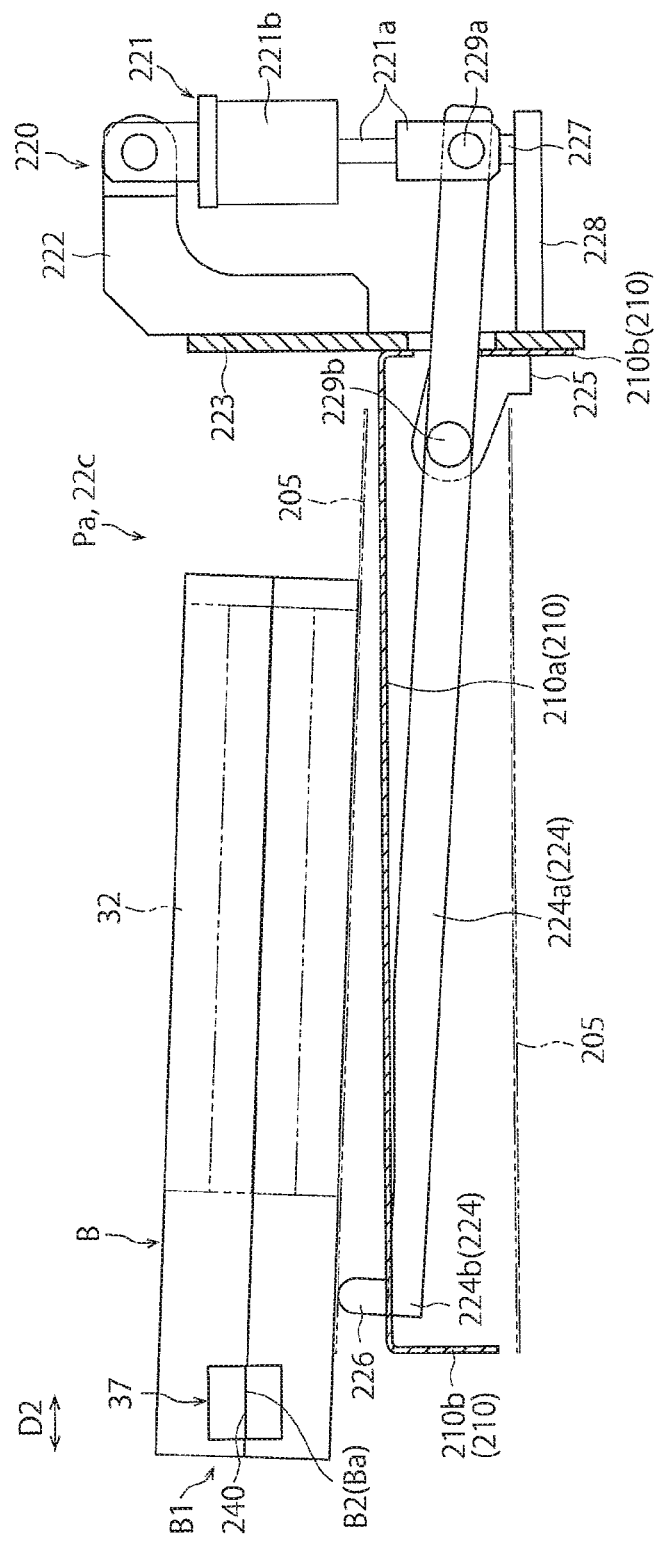
FIG. 35 is a side view of the cross section of the sub conveyor after the height direction position of the expected hold parts of a bag is adjusted.
Figure 36:
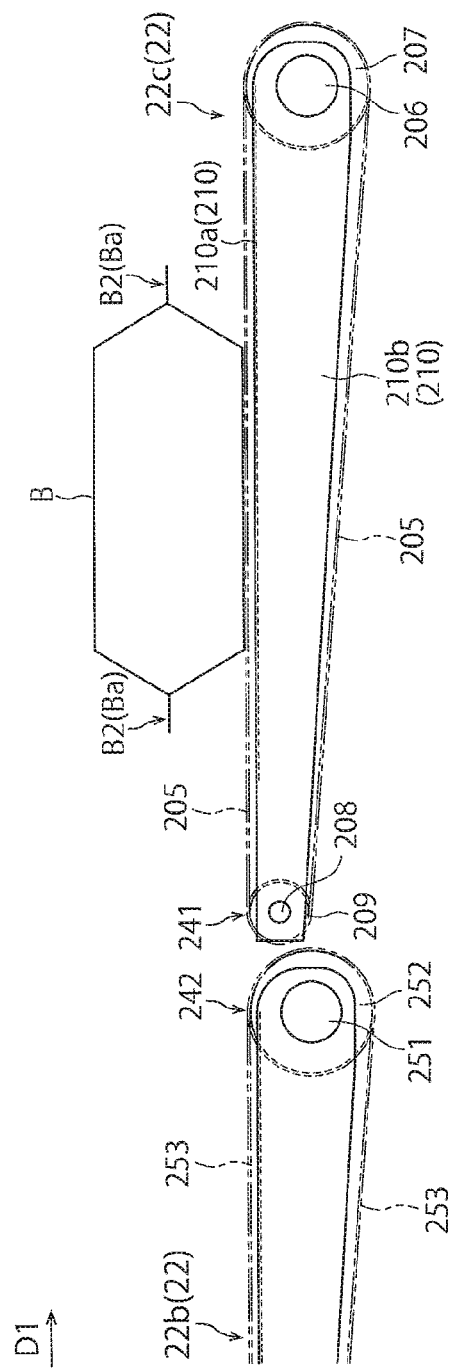
FIG. 36 is a front view of the sub conveyor before the height direction position of the expected hold parts of a bag is adjusted.
Figure 37:
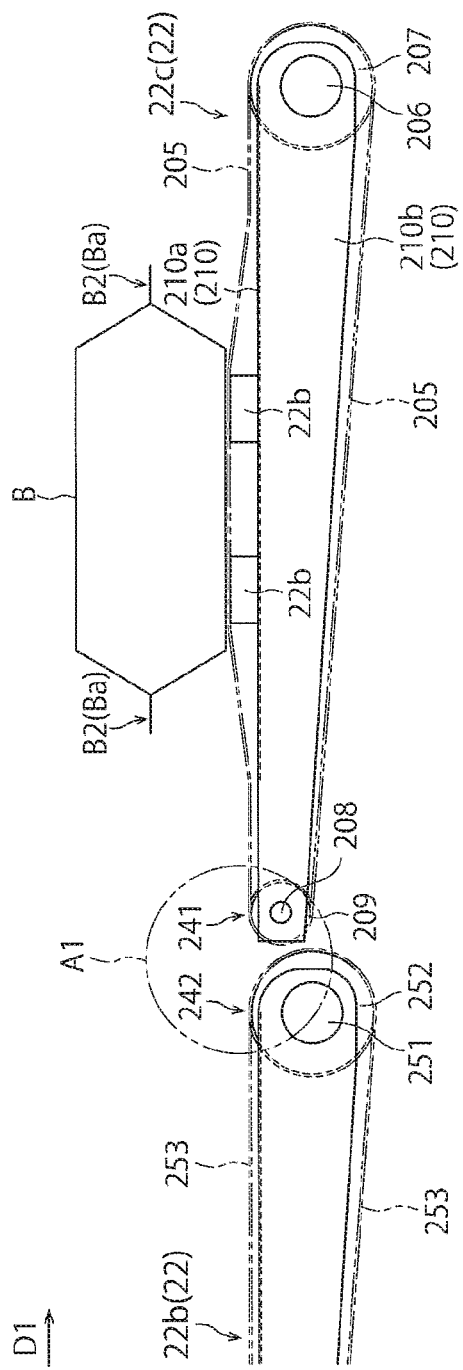
FIG. 37 is a front view of the sub conveyor after the height direction position of the expected hold parts of a bag is adjusted.

FIG. 34 is a side view of a cross section of the sub conveyor 22c before the height direction positions of the expected hold parts B2 of a bag B are adjusted. FIG. 35 is a side view of a cross section of the sub conveyor 22c after the height direction positions of the expected hold parts B2 of a bag B are adjusted. FIG. 36 is a front view of the sub conveyor 22c before the height direction positions of the expected hold parts B2 of a bag B are adjusted. FIG. 37 is a front view of the sub conveyor 22c after the height direction positions of the expected hold parts B2 of a bag B are adjusted. In FIGS. 36 and 37, a part of the sub conveyor 22b is not shown.

The sub conveyor 22b of the present embodiment is configured in a similar manner to the above-described embodiment shown in FIG. 20, etc. Specifically, the sub conveyor 22b (second conveyance unit) is disposed upstream from the sub conveyor 22c (first conveyance unit), has a second conveyance belt 253 onto which a bag B is to be placed, and conveys the bag B in a horizontal attitude in the conveyance direction D1. The second conveyance belt 253 is formed in an endless shape, and is wound around a third rotation body 252 that rotates integrally with a third support shaft 251. The third support shaft 251 is rotated around its axis by the servomotor 27b (see FIG. 20, etc.). A bag B conveyed by the sub conveyor 22b is delivered from the outlet side end 242 of the second conveyance belt 253 to the inlet side end 241 of the first conveyance belt 205. The third support shaft 251, the third rotation body 252, the second support shaft 208, and the second rotation body 209 are fixedly provided in the height direction and do not move up and down in the height direction. The outlet side end 242 of the second conveyance belt 253 and the inlet side end 241 of the first conveyance belt 205 are disposed at positions which correspond to each other in the height direction (for example, the same height direction positions), a bag B is smoothly delivered onto the first conveyance belt 205 from the second conveyance belt 253.

When the amount of projection of the drive shaft portion 221a from the drive main body 221b is the minimum amount of projection, the lifting-lowering members 226 do not contact the first conveyance belt 205 and are positioned below the top surface part 210aas shown in FIGS. 34 and 36. Therefore, the first conveyance belt 205 of the sub conveyor 22c extends in a substantially horizontal direction substantially parallel to the top surface part 210a, and a bag B is placed on the first conveyance belt 205 in a horizontal attitude. In this situation, the height direction positions of the expected hold parts B2 (in the present embodiment, the side edge portions Ba at positions near the mouth portion B1) of the bag B in which a solid substance 32 (the content) is accommodated are not adjusted, and as shown in FIG. 34, the height direction positions of the expected hold parts B2 do not coincide with the height direction positions of the grip members 37 (in particular, the holding surfaces 240).

On the other hand, when the amount of projection of the drive shaft portion 221a from the drive main body 221b is the maximum amount of projection, the lifting-lowering members 226 push the first conveyance belt 205 from below so as to push up the first conveyance belt 205 and the bag B upwards as shown in FIGS. 35 and 37. In this way, the height direction position of the expected hold parts B2 of the bag B can be made to correspond to the height direction position of the holding surfaces 240 of the grip members 37. Thus, the grip members 37 can stably hold the expected hold parts B2 whose positions in the height direction have been adjusted. In this situation, preferably, that the height direction position of the expected hold parts B2 coincides with the height direction position of the holding surfaces 240 but does not have to completely coincide with the height direction position of the holding surfaces 240, and the height direction position of the expected hold parts B2 may be close to the height direction position of the holding surfaces 240 in such a manner that the grip members 37 can accurately grip the expected hold parts B2. In particular, when the entire bag B is inclined in order to adjust the height direction positions of the expected hold parts B2, the expected hold parts B2 (the side edge portions Ba) of the bag B extends obliquely with respect to the height direction and therefore it is difficult to make the height direction position of the entire expected hold parts B2 completely coincide with the height direction position of the holding surfaces 240. Even in such a case, by causing the height direction position of the expected hold parts B2 to approximately coincide with the height direction position of the holding surfaces 240, the grip members 37 can stably grip the bag B.

In the present embodiment, when the lifting-lowering members 226 push up the first conveyance belt 205, the first conveyance belt 205 is pushed up locally. Thus, the height direction position of the inlet side end 241 of the first conveyance belt 205 and the height direction position of the outlet side end 242 of the second conveyance belt 253 do not substantially change at all or is nearly unchanged (see reference sign "A1" in FIG. 37). As a result, it is possible to prevent the occurrence of a step between the outlet side end 242 of the second conveyance belt 253 and the inlet side end 241 of the first conveyance belt 205. Thus, even when the first conveyance belt 205 is pushed up by the lifting-lowering members 226, the outlet side end 242 of the second conveyance belt 253 and the inlet side end 241 of the first conveyance belt 205 are positioned to correspond to each other in the height direction. Therefore, even in a state where the first conveyance belt 205 is pushed up by the lifting-lowering members 226, it is possible to appropriately transfer a new bag B from the second conveyance belt 253 to the inlet side end 241.

When the relative position in the height direction between the expected hold parts B2 of a bag B and the grip members 37 is adjusted, the inlet side end 241 of the first conveyance belt 205 and the outlet side end 242 of the second conveyance belt 253 may be arranged at positions which do not correspond to each other in the height direction. However, in this case, preferably, the outlet side end 242 of the second conveyance belt 253 and the inlet side end 241 of the first conveyance belt 205 are arranged at positions corresponding to each other in the height direction at least while a bag B is delivered from the outlet side end 242 of the second conveyance belt 253 to the inlet side end 241 of the first conveyance belt 205.

Moreover, the timing which the relative position in the height direction between the expected hold parts B2 of a bag B and the grip members 37 is adjusted, is not limited. Typically, it is possible to adjust the relative position in the height direction in a state where a bag B is disposed at the takeoff position Pa (in the takeoff area), but the relative position in the height direction may be performed before a bag B is disposed at the takeoff position Pa (in the takeoff area). For example, while a bag B is conveyed by the belt conveyor 22 (in the present embodiment, the sub conveyor 22c), the height direction positions of the expected hold parts B2 of the bag B may be adjusted. The timing when the relative position in the height direction is adjusted can be adjusted by a control unit (for example, the control apparatus 15) that controls the lifting-lowering mechanism 220 (the lifting-lowering drive unit 221).

According to the present embodiment, as described above, when the expected hold parts B2 of a bag B are gripped by the grip members 37, the positional deviation amount in the height direction between the grip members 37 and the expected hold parts B2 can be reduced. As a result, it is possible to secure, in a bag B disposed at the takeoff position Pa, expected hold parts B2 having a size such that the grip members 37 can appropriately grip the expected hold parts B2. Therefore, the grip members 37 can grip the expected hold parts B2 reliably and stably, and it is possible to prevent the expected hold parts B2 from being folded and to prevent the bag B from being wrinkled.

Further, by changing the height direction position of a bag B in order to adjust the relative position in the height direction between the expected hold parts B2 of the bag B and the grip members 37, it is not required to change the height direction positions of the grip members 37 and a special mechanism for raising and lowering the grip members 37 in the height direction is also unnecessary. The mechanism for raising and lowering the grip members 37 in the height direction tends to make the apparatus configuration complicated and large. Further, as described above, the grip members 37 are members that reciprocate to cause a bag B to move from the takeoff position Pa to the delivery position Pb. If the grip members 37 operating in such a way are further raised and lowered in the height direction by a lifting-lowering mechanism, an additional load is applied to the grip members 37. On the other hand, according to the apparatus and the method of the present embodiment in which the grip members 37 are not moved up and down, the increase in size and complexity of the apparatus can be prevented and the load applied to the grip members 37 can be reduced.

Further, according to the present embodiment, even when the first conveyance belt 205 and a bag B (the expected hold parts B2) are moved up and down, a height difference which hinders delivery of a bag B does not occur between the sub conveyor 22b (the second conveyance belt 253) and the sub conveyor 22c (the first conveyance belt 205). Specifically, the belt drive unit (the lifting-lowering drive unit 221, the lifting-lowering lever 224, and the lifting-lowering members 226) locally moves the first conveyance belt 205 in the height direction, and while the outlet side end 242 of the second conveyance belt 253 and the inlet side end 241 of the first conveyance belt 205 are arranged at positions corresponding to each other in the height direction, the height direction positions of the expected hold parts B2 and the height direction positions of the grip members 37 are made to correspond to each other. Thus, even while the first conveyance belt 205 and a bag B are lifted by the lifting-lowering mechanism 220, the sub conveyor 22c (first conveyance belt 205) can receive a new bag B from the sub conveyor 22b (second conveyance belt 253). Therefore, the belt conveyor 22 (the sub conveyors 22a, 22b, 22c) can send bags B one after another toward the takeoff position Pa without stagnating the bags B on the upstream side even before the relative position in the height direction is adjusted between the expected hold parts B2 of the bags B and the grip members 37, even while such adjustment is being performed, and even after such adjustment is performed. As a result, it is possible to curb a reduction in the conveyance number (processing capacity) of bags B per unit time in the bag conveyance apparatus 201.

[Variations]

The present invention is not limited to the above-mentioned embodiments and modifications, and various modifications may be made.

For example, in order to adjust the relative position in the height direction between the expected hold parts B2 of a bag B and the grip members 37, the bag B (in particular, the expected hold parts B2) is moved in the height direction in the embodiment shown in FIGS. 31 to 37 described above, but the grip members 37 may be moved in the height direction.

Figure 38:
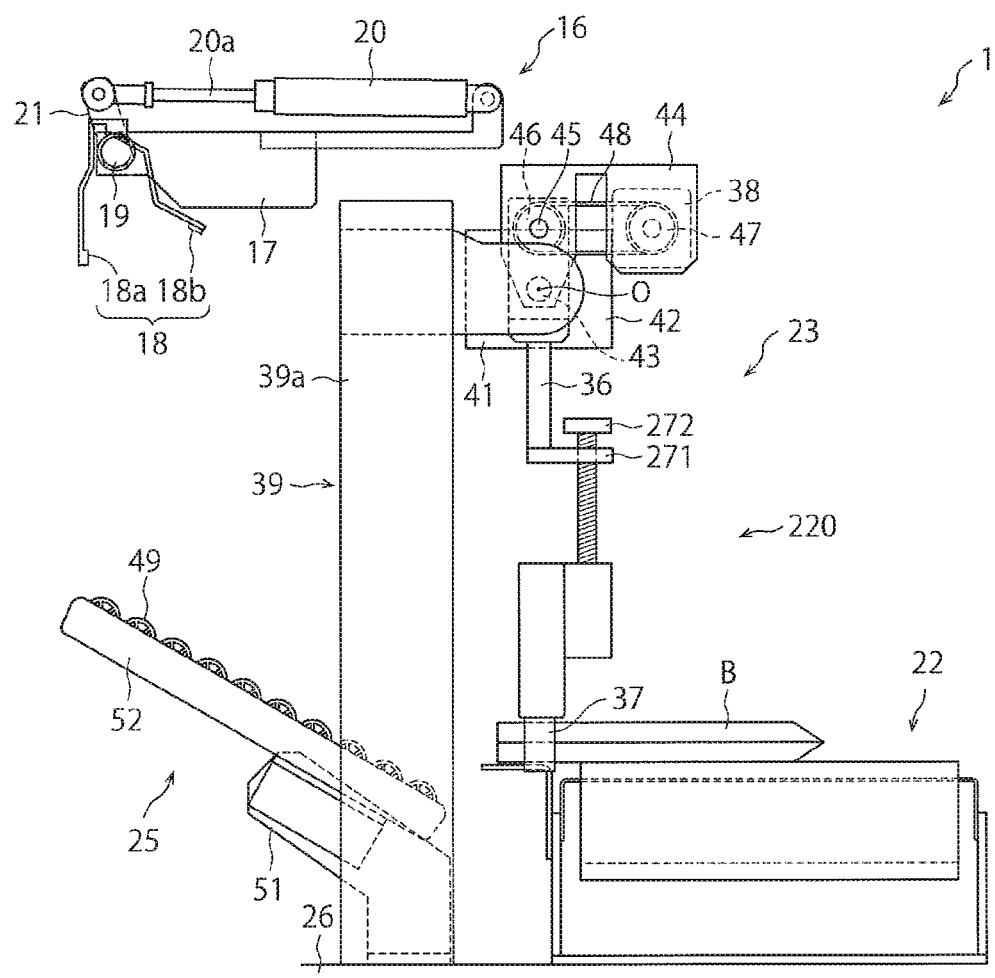
FIG. 38 is a side view of the supply apparatus showing a variation of a lifting-lowering mechanism.

FIG. 38 is a side view of a supply apparatus 1 showing a modification of the lifting-lowering mechanism 220. In FIG. 38, elements which are the same as or similar to those of the above-described supply apparatus 1 shown in FIG. 5 are accompanied with the same reference signs, and their detailed description are omitted below. In the supply apparatus 1 shown in FIG. 38, the relative position in the height direction between the expected hold parts B2 of a bag B and the grip members 37 is adjusted by changing the height direction positions of the grip members 37. Specifically, each swing arm 36 supporting a grip member 37 includes a bolt support 271 and an adjustment bolt 272 engaged with a through hole formed in the bolt support 271 via a screw engagement. A grip member 37 is fixedly connected to one end side of each adjustment bolt 272 via another member, and the distance between the axis O and each grip member 37 is variable in accordance with the amount of projection of the adjustment bolt 272 from the bolt support 271.

As described above, each swing arm 36 including a bolt support 271 and an adjustment bolt 272 swings within an angle range of 90° around the axis O to take a vertical attitude and a horizontal attitude. When each swing arm 36 takes a vertical attitude as shown in FIG. 38, the bolt support 271 extends in the horizontal direction, the adjustment bolt 272 extends in the vertical direction while penetrating the through hole of the bolt support 271, and the height direction position of each grip member 37 is determined according to the amount of projection of the adjustment bolt 272 from the bolt support 271. In this vertical attitude, the length of the adjustment bolt 272 projecting downward (in the vertical direction) from the bolt support 271 can be adjusted according to the amount of rotation of the threaded portion of the adjustment bolt 272 with respect to the through hole of the bolt support 271. Thus, the relative position in the height direction between the expected hold parts B2 of a bag B and the grip members 37 can be adjusted by rotating the adjustment bolts 272 with respect to the bolt supports 271 by an operator to adjust the distance between the axis O and the grip members 37 (that is, the height direction position of the grip members 37 in a vertical attitude).

Further, in order to adjust the relative position in the height direction between the expected hold parts B2 of a bag B and the grip members 37, a bag B and the first conveyance belt 205 are locally moved in the height direction in the embodiment shown in FIGS. 31 to 37 described above, but the whole of a bag B and the first conveyance belt 205 may be moved in the height direction. In this case, the expected hold parts B2 of a bag B can be disposed at a desired height direction positions while the horizontal attitude of the bag B is maintained, and the expected hold parts B2 can be gripped more reliably and stably by the grip members 37. The method for moving the whole of a bag B and the whole of the first conveyance belt 205 is not limited. For example, the height position of the whole of the sub conveyor 22c may be adjusted by adjusting the length in the height direction of the leg portions 210c of the frame 210. In that case, not only the sub conveyor 22c but also the whole of the belt conveyor 22 (the sub conveyors 22a, 22b, 22c) may be moved in the height direction.

Further, in the embodiment shown in FIGS. 31 to 37, the belt conveyor 22 conveys bags B intermittently, but may continuously convey bags B without stopping them intermittently. In that case, while a bag B is being conveyed, the relative position in the height direction between the expected hold parts B2 of the bag B and the grip members 37 is adjusted.

Further, the belt conveyor 22 conveys bags B in the width direction of the bags B (that is, the direction in which the side edge portions Ba of the bags B are aligned) in the embodiment shown in FIGS. 31 to 37, but the direction and the posture of bags B conveyed by the belt conveyor 22 are not limited. For example, the belt conveyor 22 may convey bags B in the longitudinal direction of the bags B (that is, the direction in which the mouth portions B1 and the bottom portions of the bags B are aligned), and the mouth portions B1 of the bags B may be directed in the conveyance direction D1 (oriented toward the takeoff position Pa) or the bottom portions of the bags B may be directed in the conveyance direction D1 (oriented toward the takeoff position Pa). In this case, the expected hold parts 132 of a bag B, gripped by the grip member 37, may be the side edge portions Ba of the bag B or other portions of the bag B (for example, the mouth portion B1 and the bottom portion).

Moreover, the content accommodated in a bag B is not limited to a solid substance 32. For example, a bag B may contain one or more flexible packages (for example, pouches) filled with a liquid or the like.

Figure 39:
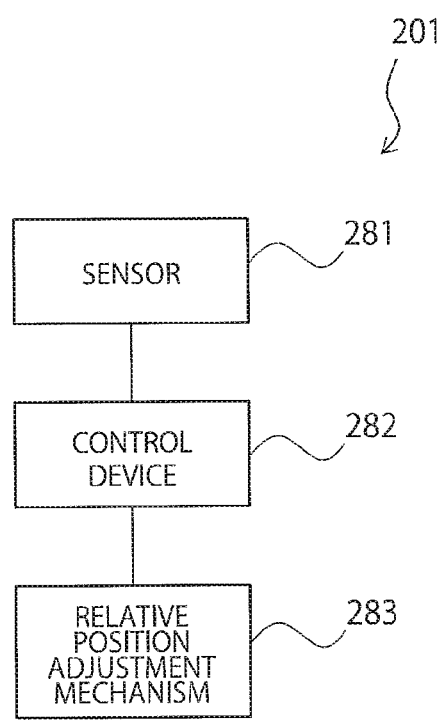
FIG. 39 is a functional block diagram according to a variation of the bag conveyance apparatus.

Further, an operator manually adjusts the relative position in the height direction between the expected hold parts B2 of a bag B and the grip members 37 in the embodiment shown in FIGS. 31 to 37 described above, but such adjustments may be automated. For example, as shown in FIG. 39, the bag conveyance apparatus 201 may include a sensor 281, a control device 282, and a relative position adjustment mechanism 283.

The sensor 281 directly or indirectly detects the amount of deviation between the height direction position of the expected hold parts B2 of a bag B and the height direction position of the grip members 37. For example, a photosensor or an image sensor (camera) capable of detecting the height direction position of the expected hold parts B2 of a bag B arranged at the takeoff position Pa and the height direction position of the grip members 37 may be used as the sensor 281. In order to detect the height direction positions of the expected hold parts B2 of a bag B, the sensor 281 may perform detection in a state where the bag B is disposed at the takeoff position Pa or in a state where the bag is arranged at a position upstream from the takeoff position Pa (for example, on the sub conveyor 22a, 22b), but preferably, the detection is performed at a position close to the takeoff position Pa. Therefore, the sensor 281 can be installed, for example, at a position corresponding to the sub conveyor 22c or a position corresponding to the sub conveyor 22b.

The control device 282 can be configured by, for example, the control apparatus 15, and transmits a drive signal to the relative position adjustment mechanism 283 in response to a detection signal from the sensor 281. The control device 282 obtains the amount of displacement in the height direction of the expected hold parts B2 of a bag B and/or the grip members 37 based on the "deviation amount between the height direction position of the expected hold parts B2 of the bag B and the height direction position of the grip members 37" derived from detection signals of the sensor 281. The deviation amount may be derived by the control device 282 or a detection signal directly indicating the deviation amount may be input to the control device 282. For example, when an image sensor is used as the sensor 281, the control device 282 may perform the image processing of the image data acquired by the sensor 281 to obtain the deviation amount between the height direction position of the expected hold parts B2 of a bag B and the height direction position of the grip members 37.

The relative position adjustment mechanism 283 moves the expected hold parts B2 of a bag B and/or the grip members 37 based on a drive signal from the control device 282. For example, in a case of adjusting the height direction position of the stopper 227 (in particular, of the head) to adjust the height direction position of the expected hold parts B2 of a bag B as in the lifting-lowering mechanism 220 shown in FIG. 33, the relative position adjustment mechanism 283 is configured by a device which adjusts the height direction position of the stopper 227. The relative position adjustment mechanism 283 can be configured by, for example, a device capable of adjusting the screw rotation amount of the stopper 227 with respect to the third attachment section 228, or a device capable of adjusting the attachment position (in particular, the height direction position) of the third attachment section 228 with respect to the second attachment section 223. Further, in a case where the height direction position of the grip members 37 is adjusted by adjusting the length in the height direction of the swing arms 36 as in the lifting-lowering mechanism 220 shown in FIG. 38, the relative position adjustment mechanism 283 is configured by a device (not shown) which adjusts the longitudinal length of the swing arms 36 (for example, the amount of screw rotation of the adjustment bolts 272 with respect to the through holes of the bolt supports 271).

Further, the effects exhibited by the present invention are not limited to the above-described effects, and specific effects corresponding to the specific configuration of each embodiment may be exhibited. Thus, various additions, modifications and partial deletions can be made to each element described in the claims, the specification, the abstract and the drawings without departing from the technical concept and spirit of the present invention.

The invention claimed is:

1. A bag conveyance method comprising the steps of:
disposing a bag in a substantially horizontal attitude in a takeoff area, a content being put in the bag, a mouth portion of the bag being not sealed;
causing a height direction position of an expected hold part of the bag and a height direction position of a hold member to correspond to each other in the takeoff area before the hold member holds the expected hold part of the bag;
causing the hold member to hold the expected hold part of the bag disposed in the takeoff area in a state where the height direction position of the expected hold part of the bag and the height direction position of the hold member correspond to each other; and
moving the hold member to transfer the bag from the takeoff area to a delivery area after the hold member holds the expected hold part of the bag disposed in the takeoff area.

2. The bag conveyance method as defined in claim 1, wherein, by moving the bag in the height direction, the height direction position of the expected hold part of the bag and the height direction position of the hold member are caused to correspond to each other.

3. The bag conveyance method as defined in claim 1, wherein the hold member is configured to grip the expected hold part of the bag so as to hold the expected hold part of the bag.

4. The bag conveyance method as defined in claim 1, wherein, in the takeoff area, the hold member changes from a state where the hold member does not hold the expected hold part of the bag to a state where the hold member holds the expected hold part of the bag while the height direction position of the expected hold part of the bag and the height direction position of the hold member correspond to each other.

5. A bag conveyance apparatus comprising:
a first conveyance unit configured to dispose a bag in a substantially horizontal attitude in a takeoff area, a content being put in the bag, a mouth portion of the bag being not sealed;
a hold member configured to hold an expected hold part of the bag arranged in the takeoff area;
a lifting-lowering mechanism configured to adjust a relative position in a height direction between the expected hold part of the bag and the hold member in the takeoff area before the hold member holds the expected hold part of the bag; and
a transfer mechanism configured to move the hold member to transfer the bag from the takeoff area to a delivery area after the hold member holds the expected hold part of the bag disposed in the takeoff area,
wherein the lifting-lowering mechanism is configured to adjust the relative position in such a manner that the bag is positioned in the takeoff area in a state where a height direction position of the expected hold part of the bag and a height direction position of the hold member correspond to each other.

6. The bag conveyance apparatus as defined in claim 5, wherein the first conveyance unit has a placement surface on which the bag disposed in the takeoff area is to be placed; and
wherein the lifting-lowering mechanism is configured to adjust a height direction position of the placement surface.

7. The bag conveyance apparatus as defined in claim 5, wherein, in the takeoff area, the hold member is configured to change from a state where the hold member does not hold the expected hold part of the bag to a state where the hold member holds the expected hold part of the bag while the height direction position of the expected hold part of the bag and the height direction position of the hold member correspond to each other.

8. The bag conveyance apparatus as defined in claim 5, wherein the hold member is configured to grip the expected hold part of the bag, with the content placed in the bag, so as to hold the expected hold part of the bag.

9. A bag conveyance apparatus comprising:
a first conveyance unit configured to dispose a bag in a substantially horizontal attitude in a takeoff area, a content being put in the bag, a mouth portion of the bag being not sealed;
a hold member configured to hold an expected hold part of the bag arranged in the takeoff area;
a lifting-lowering mechanism configured to adjust a relative position in a height direction between the expected hold part of the bag and the hold member before the hold member holds the expected hold part of the bag; and
a transfer mechanism configured to move the hold member to transfer the bag from the takeoff area to a delivery area after the hold member holds the expected hold part of the bag disposed in the takeoff area, wherein the lifting-lowering mechanism is configured to adjust the relative position in such a manner that the bag is positioned in the takeoff area in a state where a height direction position of the expected hold part of the bag and a height direction position of the hold member correspond to each other;

wherein the first conveyance unit has a placement surface on which the bag disposed in the takeoff area is to be placed;

wherein the lifting-lowering mechanism adjusts a height direction position of the placement surface;

wherein the first conveyance unit includes a first conveyance belt having the placement surface; and wherein the lifting-lowering mechanism is configured to locally apply a force to the first conveyance belt to move the first conveyance belt in the height direction.

10. The bag conveyance apparatus as defined in claim 9, further comprising a second conveyance unit provided on an upstream side from the first conveyance unit and configured to convey the bag, wherein the second conveyance unit includes a second conveyance belt on which the bag is to be placed;

wherein the bag is delivered from an outlet side end of the second conveyance belt to an inlet side end of the first conveyance belt; and wherein the lifting-lowering mechanism is configured to locally move the first conveyance belt in the height direction in such a manner that, while the outlet side end of the second conveyance belt and the inlet side end of the first conveyance belt are arranged in positions which correspond to each other in the height direction, the height direction position of the expected hold part of the bag and the height direction position of the hold member correspond to each other.

11. The bag conveyance apparatus as defined in claim 9, wherein the hold member is configured to grip the expected hold part of the bag, with the content placed in the bag, so as to hold the expected hold part of the bag.

12. The bag conveyance apparatus as defined in claim 9, wherein, in the takeoff area, the hold member is configured to change from a state where the hold member does not hold the expected hold part of the bag to a state where the hold member holds the expected hold part of the bag while the height direction position of the expected hold part of the bag and the height direction position of the hold member correspond to each other.

* * * * *